(12) United States Patent
Takano et al.

(10) Patent No.: US 12,066,672 B2
(45) Date of Patent: Aug. 20, 2024

(54) FIBER OPTIC NETWORK SYSTEMS

(71) Applicant: SENKO Advanced Components, Inc., Hudson, MA (US)

(72) Inventors: Kazuyoshi Takano, Tokyo (JP); Kenji Iizumi, Tokyo (JP); Siu Kei Ma, Kowloon (HK); Takuya Ninomiya, Natick, MA (US); Tyler Royer, York, PA (US); Heng Loong Lee, Puchong (MY)

(73) Assignee: Senko Advanced Components, Inc., Hudson, MA (US)

( * ) Notice: Subject to any disclaimer, the term of this patent is extended or adjusted under 35 U.S.C. 154(b) by 137 days.

(21) Appl. No.: 17/937,006

(22) Filed: Sep. 30, 2022

(65) Prior Publication Data
US 2023/0099201 A1     Mar. 30, 2023

Related U.S. Application Data

(60) Provisional application No. 63/280,317, filed on Nov. 17, 2021, provisional application No. 63/274,467, (Continued)

(51) Int. Cl.
*H04B 10/00* (2013.01)
*G02B 6/38* (2006.01)
(Continued)

(52) U.S. Cl.
CPC ......... *G02B 6/4292* (2013.01); *G02B 6/3825* (2013.01); *G02B 6/38875* (2021.05);
(Continued)

(58) Field of Classification Search
CPC ................ G02B 6/4292; G02B 6/3825; G02B 6/38875; G02B 6/403; G02B 6/406; G02B 6/4246; G02B 6/3885
See application file for complete search history.

(56) References Cited

U.S. PATENT DOCUMENTS 6,634,796 B2 * 10/2003 de Jong ............... G02B 6/3831
                                                    385/139
9,229,175 B2 *  1/2016 Barnes ................. G02B 6/3895
(Continued)

OTHER PUBLICATIONS

International Search Report and Written Opinion of the International Searching Authority, dated Feb. 16, 2023, in related International Application No. PCT/US/22/045363, 8 pages.

*Primary Examiner* — Agustin Bello

(57) ABSTRACT

Fiber optic network systems are implemented, at least in part, using very small form factor (VSFF) interconnect components such as VSFF duplex connector; VSFF mechanical transfer ferrule (MT) connector; VSFF duplex uniboot connector; VSFF MT uniboot connector; VSFF duplex adapter; VSFF MT adapter; VSFF duplex pluggable transceiver; VSFF MT pluggable transceiver; VSFF patch cable assembly; VSFF trunk cable; and/or VSFF breakout cable. The VSFF fiber optic network systems can define fiber breakout cabling that connects large trunk cables to many peripheral network locations. The network systems can define branches and sub-branches from a trunk cable. The network systems can define cross-connect sub-networks between sets of transceivers or adapters. The network systems can define a trunk-to-transceiver cabling assembly for connecting a trunk cable to at least 32 transceiver ports.

24 Claims, 59 Drawing Sheets

Related U.S. Application Data filed on Nov. 1, 2021, provisional application No. 63/256,555, filed on Oct. 16, 2021, provisional application No. 63/250,581, filed on Sep. 30, 2021.

(51) Int. Cl.
*G02B 6/40* (2006.01)
*G02B 6/42* (2006.01)

(52) U.S. Cl.
CPC .............. *G02B 6/403* (2013.01); *G02B 6/406* (2013.01); *G02B 6/4246* (2013.01)

(56) References Cited

U.S. PATENT DOCUMENTS

| | | | |
|---|---|---|---|
| 9,793,667 B1* | 10/2017 | Park | H04Q 1/02 |
| 9,829,651 B2* | 11/2017 | Hall | G02B 6/40 |
| 10,107,972 B1* | 10/2018 | Gniadek | G02B 6/3825 |
| 10,281,668 B2* | 5/2019 | Takano | G02B 6/3893 |
| 10,281,669 B2* | 5/2019 | Takano | G02B 6/3893 |
| 10,451,803 B2* | 10/2019 | Chen | G02B 6/268 |
| 10,623,838 B1* | 4/2020 | Mahdi Hayder | H04L 12/4604 |
| 10,656,360 B2* | 5/2020 | Sedor | G02B 6/4471 |
| 10,678,012 B1* | 6/2020 | Wu | G02B 6/4471 |
| 10,715,271 B1* | 7/2020 | Cox | G02B 6/29364 |
| 10,718,911 B2* | 7/2020 | Chang | G02B 6/403 |
| 10,809,480 B1* | 10/2020 | Cox | G02B 6/44526 |
| 10,816,734 B2* | 10/2020 | Chen | G02B 6/3825 |
| 10,838,152 B2* | 11/2020 | Chang | G02B 6/3825 |
| 10,859,772 B1* | 12/2020 | Bradley | G02B 6/3885 |
| 10,877,233 B1* | 12/2020 | Dai | G02B 6/387 |
| 10,905,025 B1* | 1/2021 | Thomas | H05K 7/1487 |
| 10,944,584 B1* | 3/2021 | Cheng | H04L 12/2801 |
| 11,073,664 B2* | 7/2021 | Chang | G02B 6/3881 |
| 11,131,822 B2* | 9/2021 | Lockhart | G02B 6/4472 |
| 11,137,564 B2* | 10/2021 | Diepstraten | G02B 6/4472 |
| 11,187,857 B2* | 11/2021 | Chang | G02B 6/3879 |
| 11,374,655 B1* | 6/2022 | Mazzini | H04B 10/40 |
| 11,675,137 B2* | 6/2023 | Takano | G02B 6/3825 385/71 |
| 11,686,912 B1* | 6/2023 | Woodward | G02B 6/4455 385/135 |
| 11,809,001 B2* | 11/2023 | Rokach | G02B 6/421 |
| 11,822,133 B2* | 11/2023 | Chang | G02B 6/3885 |
| 11,852,873 B2* | 12/2023 | Higley | G02B 6/3888 |
| 11,924,591 B2* | 3/2024 | Raza | G02B 6/428 |
| 11,940,660 B2* | 3/2024 | Ger | G02B 6/3853 |
| 2003/0215171 A1 | 11/2003 | Lampert et al. | |
| 2004/0109646 A1* | 6/2004 | Anderson | G02B 6/3885 385/71 |
| 2005/0254821 A1* | 11/2005 | Theodoras, II | H04B 10/40 398/135 |
| 2008/0232743 A1 | 9/2008 | Gronvall et al. | |
| 2009/0208177 A1 | 8/2009 | Smith | |
| 2009/0245732 A1 | 10/2009 | Murano | |
| 2010/0092136 A1* | 4/2010 | Nhep | G02B 6/4472 385/136 |
| 2012/0189260 A1* | 7/2012 | Kowalczyk | G02B 6/44 385/135 |
| 2013/0051733 A1* | 2/2013 | Gallegos | G02B 6/3879 385/76 |
| 2013/0259429 A1* | 10/2013 | Czosnowski | G02B 6/3879 385/78 |
| 2013/0308915 A1* | 11/2013 | Buff | G02B 6/4452 385/134 |
| 2013/0322825 A1* | 12/2013 | Cooke | G02B 6/3851 385/59 |
| 2014/0219621 A1* | 8/2014 | Barnette, Jr. | G02B 6/4472 385/135 |
| 2014/0226946 A1* | 8/2014 | Cooke | G02B 6/4455 385/135 |
| 2014/0341509 A1* | 11/2014 | Coleman | G02B 6/4472 385/54 |
| 2015/0323742 A1* | 11/2015 | Baker | G02B 6/28 385/24 |
| 2016/0131854 A1 | 5/2016 | de Jong | |
| 2016/0216458 A1 | 7/2016 | Shih | |
| 2016/0349458 A1 | 12/2016 | Murray et al. | |
| 2016/0372236 A1* | 12/2016 | Yoshikawa | G02B 6/4472 |
| 2017/0012373 A1* | 1/2017 | Nonen | H01B 3/30 |
| 2017/0212316 A1* | 7/2017 | Takano | G02B 6/3825 |
| 2018/0156988 A1* | 6/2018 | Gniadek | H01R 13/743 |
| 2018/0172923 A1* | 6/2018 | Bauco | G02B 6/262 |
| 2018/0259722 A1* | 9/2018 | Raza | H04Q 1/13 |
| 2019/0018201 A1* | 1/2019 | Takano | G02B 6/387 |
| 2019/0018209 A1* | 1/2019 | Takano | G02B 6/4292 |
| 2019/0064447 A1* | 2/2019 | Chang | G02B 6/4292 |
| 2019/0146167 A1* | 5/2019 | Leigh | G02B 6/4261 361/715 |
| 2019/0154924 A1* | 5/2019 | Chang | G02B 6/3825 |
| 2019/0154930 A1* | 5/2019 | Ho | G02B 6/4256 |
| 2019/0229809 A1* | 7/2019 | Leigh | H04J 14/02 |
| 2019/0243084 A1* | 8/2019 | Billman | G02B 6/4471 |
| 2019/0312389 A1* | 10/2019 | Little | H01R 13/6594 |
| 2020/0018909 A1* | 1/2020 | Chang | G02B 6/421 |
| 2020/0142132 A9* | 5/2020 | Chang | G02B 6/3825 |
| 2020/0166716 A1* | 5/2020 | Chang | G02B 6/4292 |
| 2020/0183093 A1* | 6/2020 | Chang | G02B 6/3825 |
| 2020/0183097 A1* | 6/2020 | Chang | G02B 6/3885 |
| 2020/0264394 A1* | 8/2020 | Chase | H04B 10/801 |
| 2020/0278504 A1 | 9/2020 | Chang et al. | |
| 2020/0285000 A1 | 9/2020 | Chang et al. | |
| 2020/0310048 A1* | 10/2020 | Chang | G02B 6/3893 |
| 2020/0333537 A1* | 10/2020 | Gniadek | G02B 6/3893 |
| 2020/0379193 A1* | 12/2020 | Kim | G02B 6/322 |
| 2020/0403897 A1* | 12/2020 | Dai | G06F 11/3636 |
| 2021/0011224 A1* | 1/2021 | Chen | G02B 6/3817 |
| 2021/0044356 A1* | 2/2021 | Aboagye | G02B 6/423 |
| 2021/0051099 A1* | 2/2021 | Iwasaki | H04L 49/109 |
| 2021/0080663 A1 | 3/2021 | Takano et al. | |
| 2021/0080671 A1* | 3/2021 | Bell | G02B 6/4471 |
| 2021/0088729 A1* | 3/2021 | Bradley | G02B 6/3885 |
| 2021/0124139 A1 | 4/2021 | Meier et al. | |
| 2021/0141177 A1* | 5/2021 | Berridge | G02B 6/4453 |
| 2021/0231885 A1* | 7/2021 | Ger | G02B 6/4221 |
| 2021/0263247 A1* | 8/2021 | Bechtolsheim | G02B 6/4284 |
| 2021/0373255 A1* | 12/2021 | Xu | G02B 6/3898 |
| 2022/0075126 A1* | 3/2022 | Chang | G02B 6/3825 |
| 2022/0260799 A1* | 8/2022 | Van Baelen | G02B 6/44526 |
| 2022/0283390 A1* | 9/2022 | Cheng | G02B 6/4209 |
| 2022/0357524 A1* | 11/2022 | Higley | G02B 6/40 |
| 2022/0365292 A1* | 11/2022 | Hendrick | G02B 6/406 |
| 2023/0010285 A1* | 1/2023 | Rivaud | H01R 25/006 |
| 2023/0012292 A1* | 1/2023 | Cloud | G02B 6/38875 |
| 2023/0042715 A1* | 2/2023 | Brun | H04W 4/024 |
| 2023/0099201 A1* | 3/2023 | Takano | G02B 6/403 385/89 |
| 2023/0101187 A1* | 3/2023 | Prevratil | G02B 6/4452 385/135 |
| 2023/0135807 A1* | 5/2023 | Takano | G02B 6/3849 385/78 |
| 2023/0145265 A1* | 5/2023 | Wong | G02B 6/403 385/87 |
| 2023/0161116 A1* | 5/2023 | Higley | G02B 6/3857 385/87 |
| 2023/0228949 A1* | 7/2023 | Childers | G02B 6/3831 385/59 |
| 2023/0288650 A1* | 9/2023 | Childers | G02B 6/3898 |
| 2023/0358984 A1* | 11/2023 | Carlson | G02B 6/44524 |
| 2023/0367059 A1* | 11/2023 | Koike | G02B 6/02033 |
| 2024/0036266 A1* | 2/2024 | Takano | G02B 6/3885 |
| 2024/0036279 A1* | 2/2024 | Chen | G02B 6/3825 |
| 2024/0053548 A1* | 2/2024 | Higley | G02B 6/406 |
| 2024/0085636 A1* | 3/2024 | Higley | G02B 6/3825 |
| 2024/0103232 A1* | 3/2024 | Higley | G02B 6/40 |

* cited by examiner

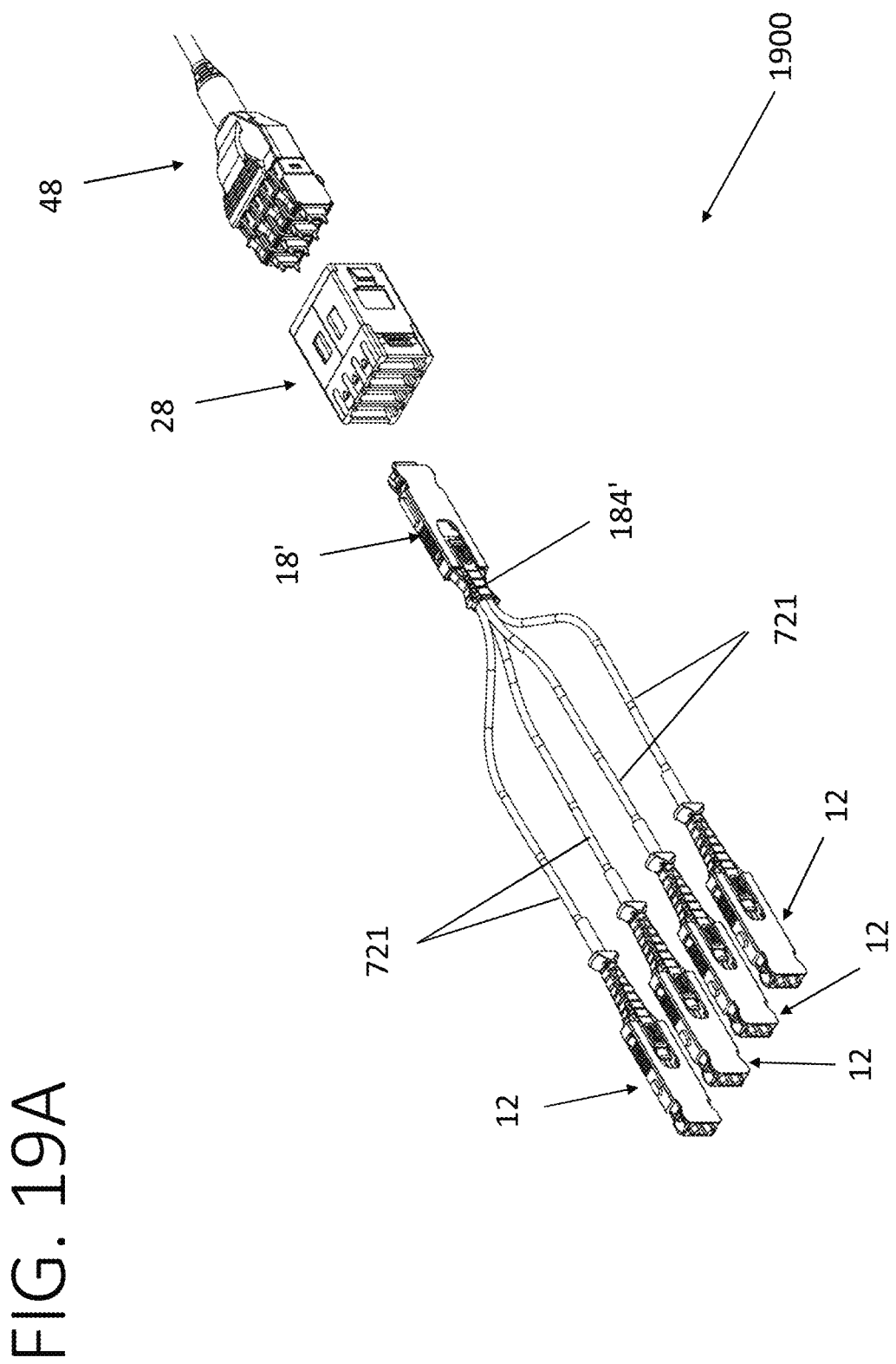

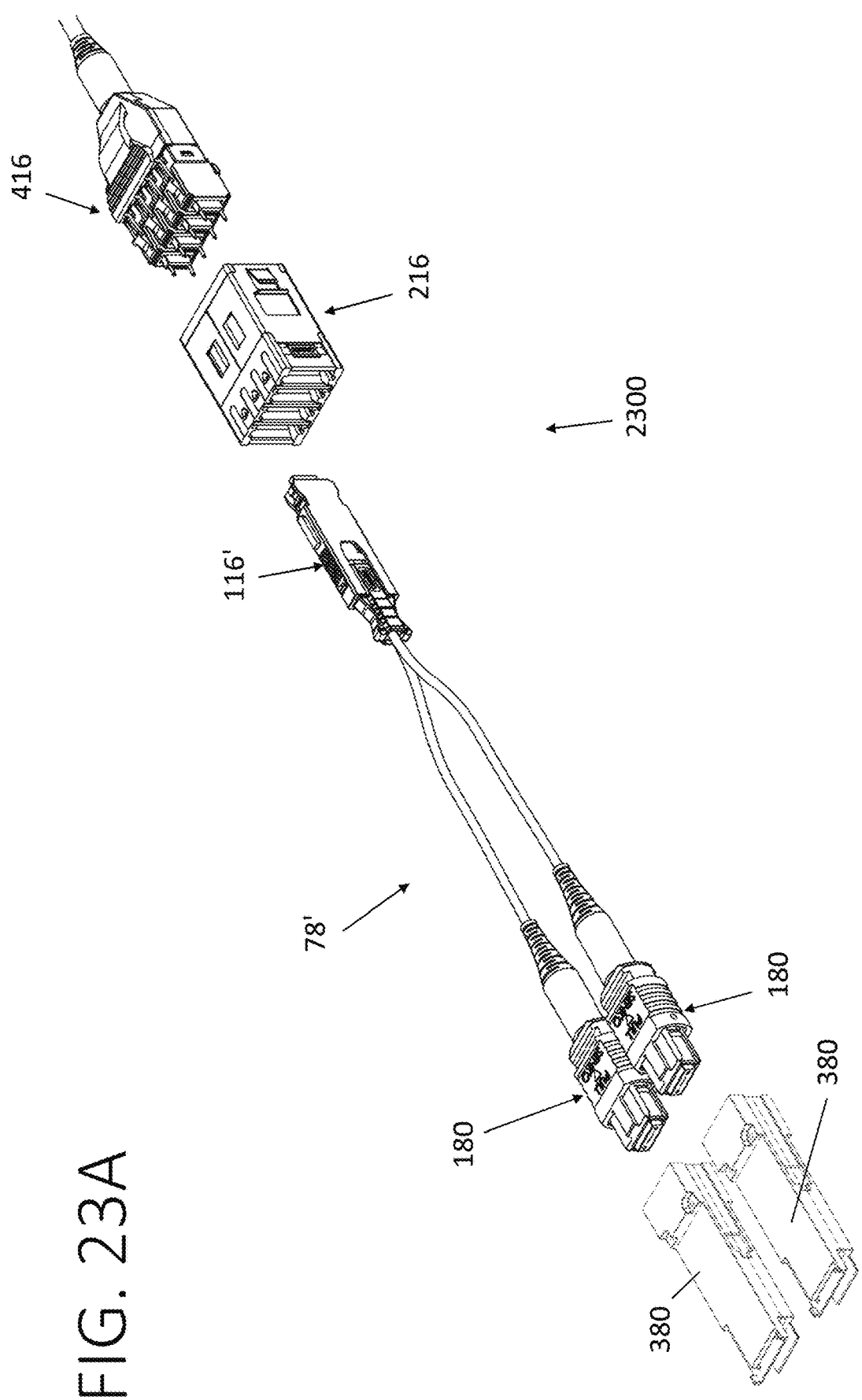

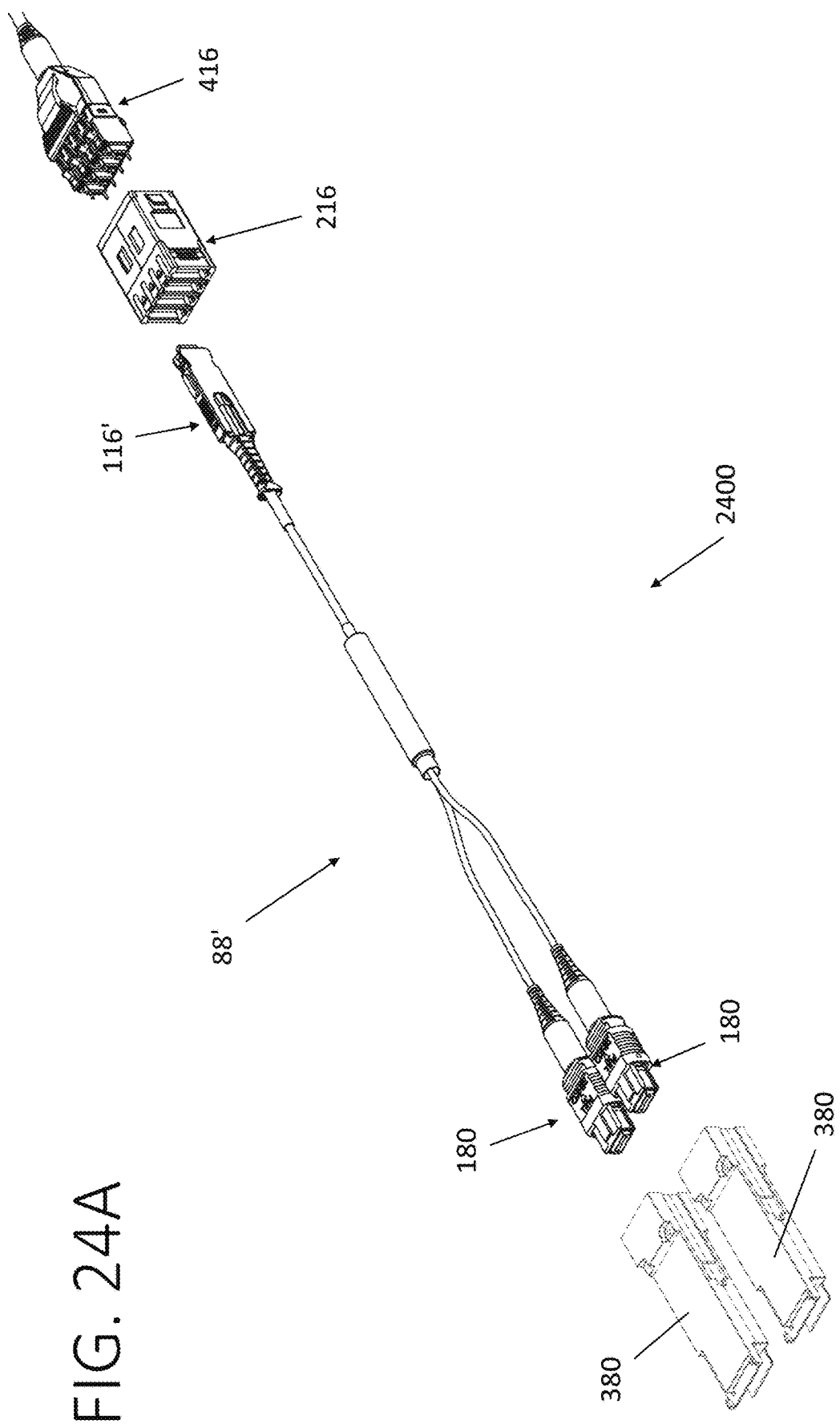

FIBER OPTIC NETWORK SYSTEMS

CROSS-REFERENCE TO RELATED APPLICATION

This application claims priority to U.S. Provisional Patent Application Nos. 63/250,581, 63/256,555, 63/274,467, and 63/280,317, each of which is hereby incorporated by reference in its entirety.

FIELD

This disclosure generally pertains to fiber optic network systems, and more particularly, to fiber optic network systems employing very small form factor interconnect components.

BACKGROUND

The Internet has led to unprecedented growth in communication networks. Network providers require evermore advanced network systems to advance reliability, speed, and data throughput. Fiber optic network systems are preferred for certain applications. Network providers want fiber optic network systems to be easy to install at high densities.

SUMMARY

In one aspect, a fiber optic network system comprises first fiber optic network equipment including a multifiber cable and a VSFF uniboot connector terminating the multifiber cable and a plurality of transceivers. A VSFF adapter has a first end portion and a second end portion. The first end portion defines a first receptacle mated with the VSFF uniboot connector and the second end portion defines a plurality of second receptacles. Fiber breakout cabling comprises a plurality of fiber optic cables and VSFF connectors terminating the plurality of fiber optic cables. The VSFF connectors of the fiber breakout cabling include a plurality of first VSFF connectors plugged into the plurality of second receptacles and a plurality of second VSFF connectors plugged into the plurality of transceivers, whereby the fiber breakout cabling connects the first fiber optic network equipment to the plurality of transceivers without any prefabricated shuffle component or mid span breakout component along any of the plurality of fiber optic cables.

In another aspect, a fiber optic network system comprises a fiber optic trunk cable having at least 64 trunk optical fibers. A trunk VSFF uniboot connector terminates the trunk cable. A trunk VSFF adapter has a first end portion and a second end portion. The first end portion defines a first trunk adapter receptacle and the second end portion defines a plurality of second trunk adapter receptacles. The trunk VSFF uniboot connector is mated with the first trunk adapter receptacle. A plurality of fiber optic subnetworks connected to the trunk cable via the trunk VSFF adapter. Each fiber optic subnetwork comprises a branch cable having a first end and a second end, a plurality of peripheral cables, a first subnetwork VSFF connector for terminating the first end of the branch cable, a branch VSFF uniboot connector for terminating the second end of the respective branch cable, a plurality of peripheral VSFF connectors for terminating the plurality of peripheral cables, and a branch VSFF adapter having a first end portion and a second end portion. The first end portion of the branch VSFF adapter defines a first branch adapter receptacle and the second end portion defines a plurality of second branch adapter receptacles. The first subnetwork VSFF connector is plugged into one of the second trunk adapter receptacles, the branch VSFF uniboot connector is plugged into the first branch adapter receptacle, and a subset of the plurality of peripheral VSFF connectors are plugged into the second branch adapter receptacles whereby others of the plurality of peripheral VSFF connectors are connectable to individual network nodes such that the plurality of peripheral cables define sub-branches of the fiber optic subnetwork.

In another aspect, a fiber optic network system comprises a fiber optic trunk cable. A plurality of fiber optic subnetworks connects to the fiber optic trunk cable. At least one of the plurality of the subnetworks comprises a VSFF cross-connect subnetwork. Each VSFF cross-connect subnetwork comprises a plurality of cross-connect VSFF adapters. Each cross-connect VSFF adapter has a first receptacle and a plurality of second receptacles in communication with the first receptacle. A plurality of cross-connect VSFF uniboot connectors mates with the first receptacles of the plurality of cross-connect VSFF adapters. Each cross-connect VSFF uniboot connector is in optical communication with the fiber optic trunk cable. Each cross-connect subnetwork further comprising a plurality of cross-connect transceivers. Each cross-connect transceiver comprises an optical interface having a plurality of transceiver receptacles. Each cross-connect subnetwork further comprising a plurality of cross-connect cable assemblies. Each cross-connect cable assembly comprises an optical fiber cable having a first end and a second end, a first VSFF connector terminating the first end of the optical fiber cable, and a second VSFF connector terminating the second end of the optical fiber cable. The first VSFF connector of each cross-connect cable assembly is mated with one of the second receptacles of one of the cross-connect VSFF adapters. The second VSFF connector is mated with one of the transceiver receptacles of one of the cross-connect transceivers. For each cross-connect transceiver, each of the cross-connect cable assemblies connected to said cross-connect transceiver is connected to a different one of the cross-connect VSFF adapters.

In another aspect, a fiber optic network system comprises a fiber optic trunk cable. A trunk VSFF uniboot connector terminates the trunk cable. The trunk VSFF uniboot connector comprises a plurality of multifiber ferrules. A trunk VSFF adapter has a first end portion and a second end portion. The first end portion defines a first trunk adapter receptacle, and the second end portion defines a plurality of second trunk adapter receptacles. The trunk VSFF uniboot connector is mated with the first trunk adapter receptacle. A branch cable assembly comprises a branch cable including at least eight optical fibers and having a first end and a second end. A branch VSFF connector comprises a single multifiber ferrule terminating the first end of the branch cable and a branch VSFF uniboot connector comprising a plurality of ferrules terminating the second end of the branch cable. The branch VSFF connector is mated with one of the plurality of second trunk adapter receptacles. A branch VSFF adapter has a first end portion and a second end portion. The first end portion defines a first branch adapter receptacle, and the second end portion defining a plurality of second branch adapter receptacles. The branch VSFF uniboot connector is mated with the first branch adapter receptacle. The fiber optic network system further comprises a plurality of peripheral cable assemblies. Each peripheral cable assembly comprises a first peripheral VSFF connector mated with a respective one of the second branch adapter receptacles and at least one second peripheral VSFF connector.

In another aspect, a fiber optic network system comprises a trunk-to-transceiver cabling assembly for connecting a trunk cable to at least 32 transceiver ports. The trunk-to-transceiver cabling assembly consists of only: a trunk VSFF uniboot connector for terminating the trunk cable, one or more VSFF adapters, one or more branch cable assemblies, and a plurality of peripheral cable assemblies comprising of fiber optic cables and VSFF connectors. Each branch cable assembly comprises a multifiber optical cable having at least one first end section and exactly one second end section. A branch VSFF connector terminates each first end section of the multifiber optical cable, and a branch VSFF uniboot connector terminating the second end of the multifiber optical cable. The VSFF connectors of the plurality of peripheral cable assemblies collectively include VSFF connectors for all of the at least 32 transceiver ports.

Other aspects will be in part apparent and in part pointed out hereinafter.

BRIEF DESCRIPTION OF THE DRAWINGS

FIG. 19A is perspective of another VSFF network system in a disconnected configuration.

FIG. 23A is a perspective of another VSFF network system in a disconnected configuration;
FIG. 24A is a perspective of another VSFF network system in a disconnected configuration.

Corresponding parts are given corresponding reference characters throughout the drawings.

DETAILED DESCRIPTION

This disclosure generally pertains to fiber optic networks, particularly, fiber optic network systems that may be used in data centers and the like. In one aspect, this disclosure contemplates fiber optic networks that are implemented, at least in part, using very small form factor (VSFF) interconnect components. For example, fiber optic networks in accordance with the present disclosure may include one or more of the following VSFF interconnect components: VSFF duplex connector; VSFF mechanical transfer ferrule (MT) connector; VSFF duplex uniboot connector; VSFF MT uniboot connector; VSFF duplex adapter; VSFF MT adapter; VSFF duplex pluggable transceiver; VSFF MT pluggable transceiver; VSFF patch cable assembly; VSFF trunk cable; and/or VSFF breakout cable. Various VSFF embodiments of the present disclosure are also sized and shaped to hold four groupings of fibers in an industry standard QSFP footprint.

The following table provides a list of the reference numbers and characteristics of certain exemplary VSFF and MPO-style components used to make the fiber optic network systems illustrated and described in further detail below. It will be appreciated that VSFF network systems in the scope of this disclosure can also utilize other fiber optic interconnect components besides the below-listed components without departing from the scope of the disclosure.

Figure 1:
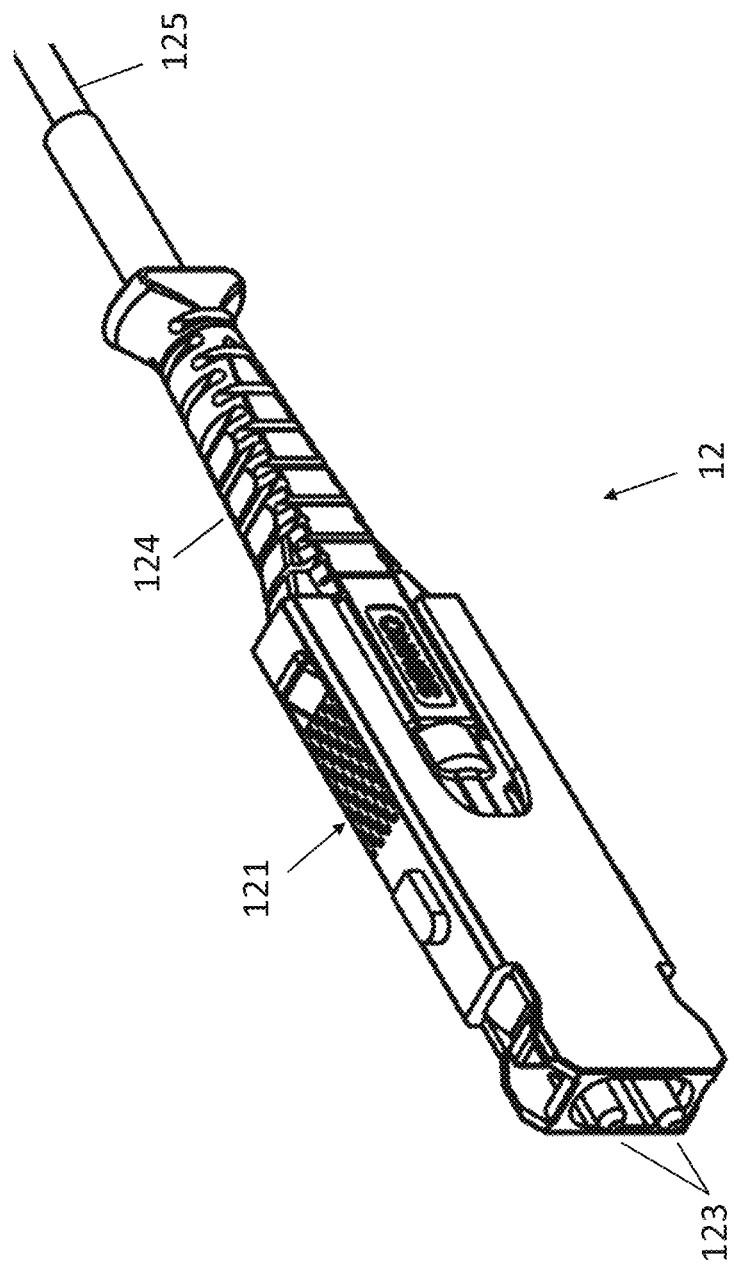
FIG. 1 is a perspective of VSFF duplex connector.

| Component Type | | Ref # | Fiber Count | Ferrule Type | Plug Body Count | Receptacle Count | Connection Type |
|---|---|---|---|---|---|---|---|
| Connector | | 12 | 2 | LC | 1 | NA | VSFF |
| | | 18 | 8 | MT | 1 | NA | VSFF |
| | | 180 | 8 | MT | 1 | NA | MPO |
| | | 116 | 16 | MT | 1 | NA | VSFF |
| | | 1160 | 16 | MT | 1 | NA | MPO |
| | | 132 | 32 | MT | 1 | NA | MPO |
| | | 164 | 64 | MT | 1 | NA | MPO |
| Adapter | | 22 | 8 | LC | NA | 4 | VSFF/VSFF |
| | | 28 | 32 | MT | NA | 4 | VSFF/VSFF |
| | | 216 | 64 | MT | NA | 4 | VSFF/VSFF |
| Transceiver | | 32 | 8 | LC | NA | 4 | VSFF |
| | | 380 | 8 | MT | NA | 1 | MPO |
| | | 380' | 16 | MT | NA | 2 | MPO |
| | | 38 | 32 | MT | NA | 4 | VSFF |
| | | 38' | 8 | MT | NA | 1 | VSFF |
| | | 38" | 16 | MT | NA | 2 | VSFF |
| | | 316 | 64 | MT | NA | 4 | VSFF |
| | | 3160 | 16 | MT | NA | 1 | MPO |
| | | 316' | 16 | MT | NA | 1 | VSFF |
| | | 316" | 32 | MT | NA | 2 | VSFF |
| | | 332 | 32 | MT | NA | 1 | MPO |
| | | 364 | 64 | MT | NA | 1 | MPO |
| | | 34 | 4 | LC | NA | 2 | VSFF |
| Uniboot Connector | | 42 | 8 | LC | 4 | NA | VSFF |
| | | 48 | 32 | MT | 4 | NA | VSFF |
| | | 416 | 64 | MT | 4 | NA | VSFF |
| Patch Cable | | 52 | 2 | LC/LC | 1/1 | NA | VSFF/VSFF |
| | | 58 | 8 | LC/LC | 1/1 | NA | VSFF/VSFF |
| | | 580 | 8 | MT/LC | 1/1 | NA | MPO/VSFF |
| | | 532 | 32 | MT/MT | 1/4 | NA | MPO/VSFF |
| | | 532' | 32 | MT/MT | 4/4 | NA | VSFF/VSFF |
| | | 5160 | 16 | MT/MT | 1/1 | NA | MPO/VSFF |
| | | 516 | 16 | MT/MT | 1/1 | NA | VSFF/VSFF |
| | | 564 | 64 | MT/MT | 1/4 | NA | MPO/VSFF |
| | | 564' | 64 | MT/MT | 4/4 | NA | VSFF/VSFF |
| | | 520 | 8 | MT/LC | 1/4 | NA | VSFF/VSFF |
| Breakout Unit | In-connector | 72 | 8 | MT/LC | 1/4 | NA | VSFF/VSFF |
| | | 78 | 16 | MT/LC | 1/8 | NA | VSFF/VSFF |
| | | 78' | 16 | MT/MT | 1/2 | NA | VSFF/MPO |
| | Mid-span | 82 | 8 | MT/LC | 1/4 | NA | VSFF/VSFF |
| | | 88 | 16 | MT/LC | 1/8 | NA | VSFF/VSFF |
| | | 88' | 16 | MT/MT | 1/2 | NA | VSFF/MPO | interconnect components are now available to the industry, including the CS, SN®, and SN-MT interconnect components available from the assignee of the present disclosure, Senko Advanced Components, Inc., and the MDC and MMC interconnect components available from US Conec. This disclosure predominantly depicts SN® and SN-MT interconnect components, but it will be understood that any VSFF interconnect components can be used without departing from the scope of the disclosure. In certain embodiments, VSFF connectors in the scope of the disclosure are sized and shaped to fit four side-by-side in an industry standard QSFP footprint. Likewise, certain VSFF adapters and transceiver interfaces in accordance with the present disclosure are sized and shaped to define four receptacles within an industry standard QSFP footprint. Quad VSFF uniboot connectors in accordance with certain exemplary Before describing the VSFF fiber optic network systems of this disclosure in detail, certain exemplary embodiments of VSFF components are briefly introduced by reference to FIGS. 1-17. Referring specifically to FIG. 1, an exemplary embodiment of a VSFF duplex connector is indicated at reference number 12. Those skilled in the art will recognize that the illustrated duplex VSFF connector is an SN connector from Senko Advanced Components, Inc. The duplex VSFF connector 12 broadly comprises a plug body 121 that holds first and second spring loaded single-fiber ferrules 123 (e.g., LC ferrules). In the illustrated embodiment, the duplex VSFF connector 12 comprises a push-pull boot 124 configured to actuate a remote release mechanism of the connector. The VSFF connector 12 is configured to terminate a two fiber cable. Additional details about exemplary embodiments of VSFF duplex connectors of the type depicted in FIG. 1 are available in U.S. Pat. Nos. 10,281,668, 10,838, 152, 10,718,911, and 11,187,857, each of which is hereby incorporated by reference in its entirety.

Figure 2:
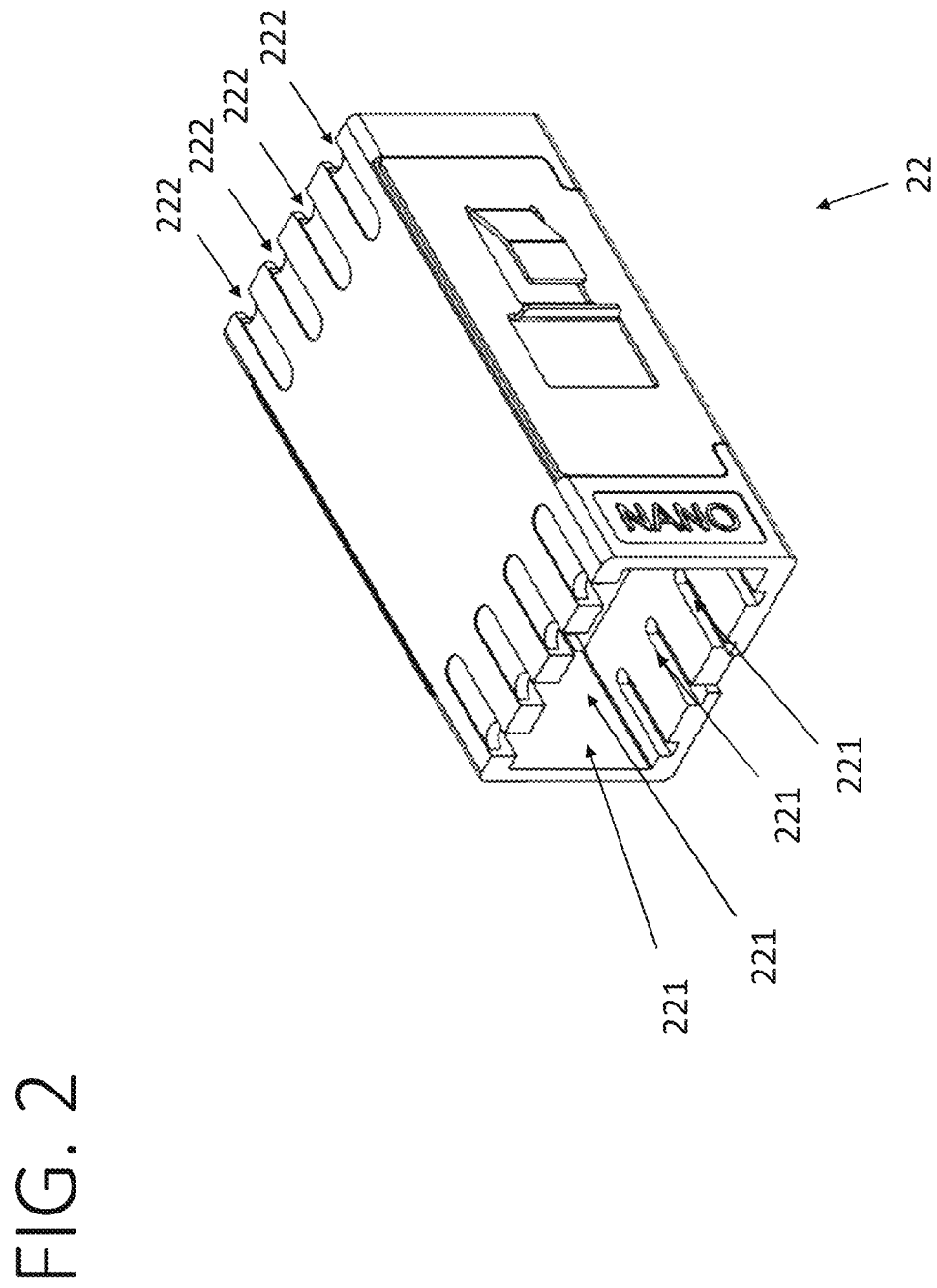
FIG. 2 is a perspective of VSFF duplex adapter.

Referring to FIG. 2, an exemplary embodiment of a quad VSFF duplex adapter for mating with the VSFF duplex connector 12 is generally indicated at reference number 22. The quad adapter 22 comprises a first end portion defining first receptacles 221 and an opposite second end portion defining second receptacles 222. For example, each end portion of the quad adapter 22 defines four receptacles 221, 222 for, e.g., receiving four of the individual VSFF duplex connectors 12 therein. Other VSFF adapters in the scope of this disclosure can be configured to define other numbers of receptacles on one or both end portions of the adapter without departing from the scope of the disclosure. The VSFF duplex adapter 22 is generally configured to retain one or more duplex-type VSFF connectors in each end portion such that an optical connection is made between the opposing connectors. Additional details about exemplary embodiments of VSFF duplex adapters of the type depicted in FIG. 2 are provided in U.S. Pat. Nos. 10,281,668, 10,838, 152, 10,718,911, and 11,187,857, which have been incorporated by reference.

Figure 3:
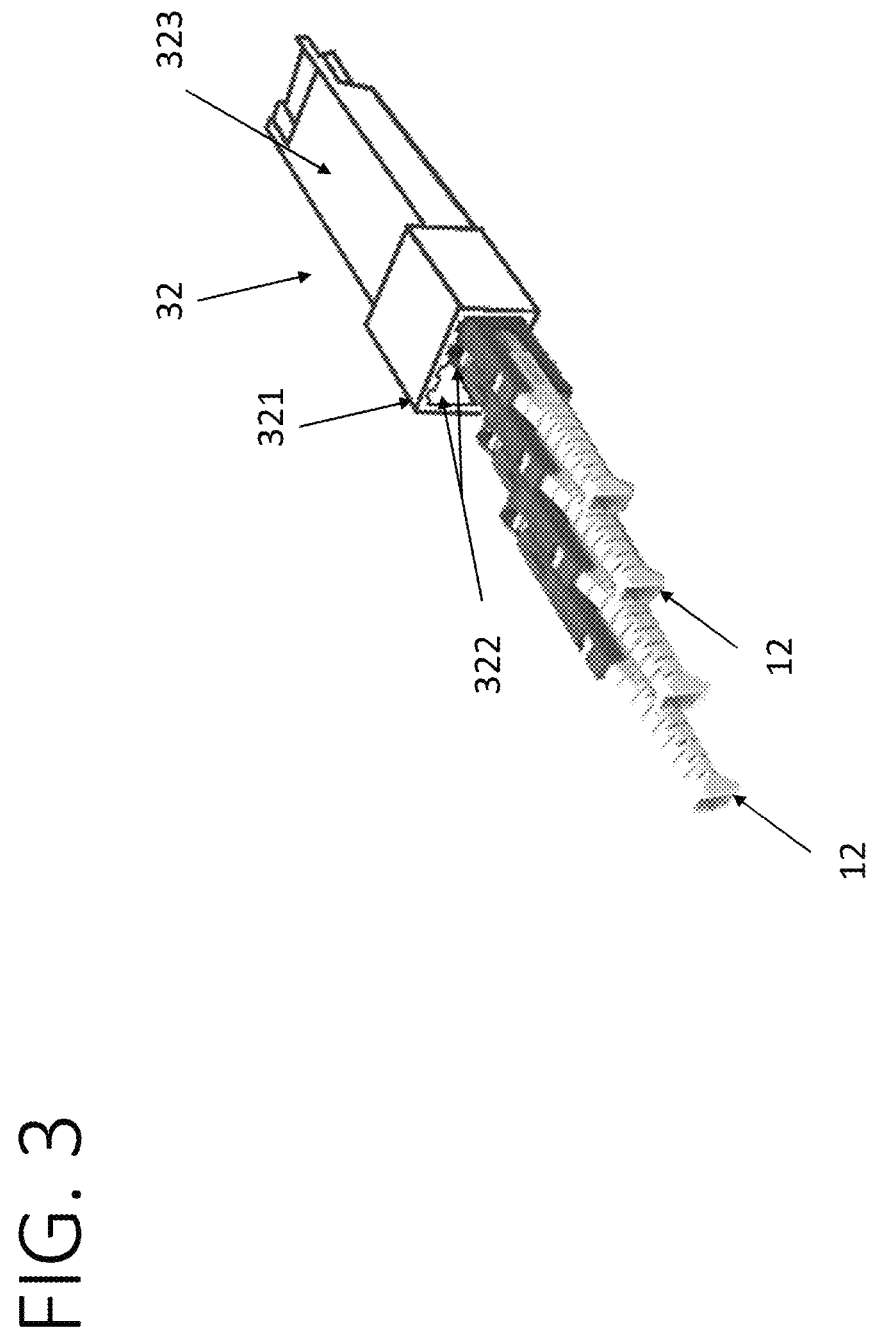
FIG. 3 is a perspective of a VSFF duplex transceiver with connectors being inserted.

Referring to FIG. 3, an exemplary embodiment of a quad VSFF duplex transceiver for mating with the VSFF duplex connectors 12 is generally indicated at reference number 32. The quad transceiver 32 comprises a transceiver optical interface 321 defining one or more receptacles 322. For example, the illustrated transceiver optical interface 321 defines four receptacles 322 for receiving four of the individual VSFF duplex connectors 12 therein. Other VSFF transceivers in the scope of this disclosure can be configured to define other numbers of receptacles at the transceiver optical interface. The VSFF duplex transceiver 32 is generally configured to retain one or more duplex-type VSFF connectors in the transceiver optical interface 321 such that an optical connection is made between the connector(s) and the transceiver. The transceiver 32 further comprises a casing 323 that encloses optoelectronic circuitry configured for configured for converting optical signals to electrical signals and vice versa.

Figure 4:
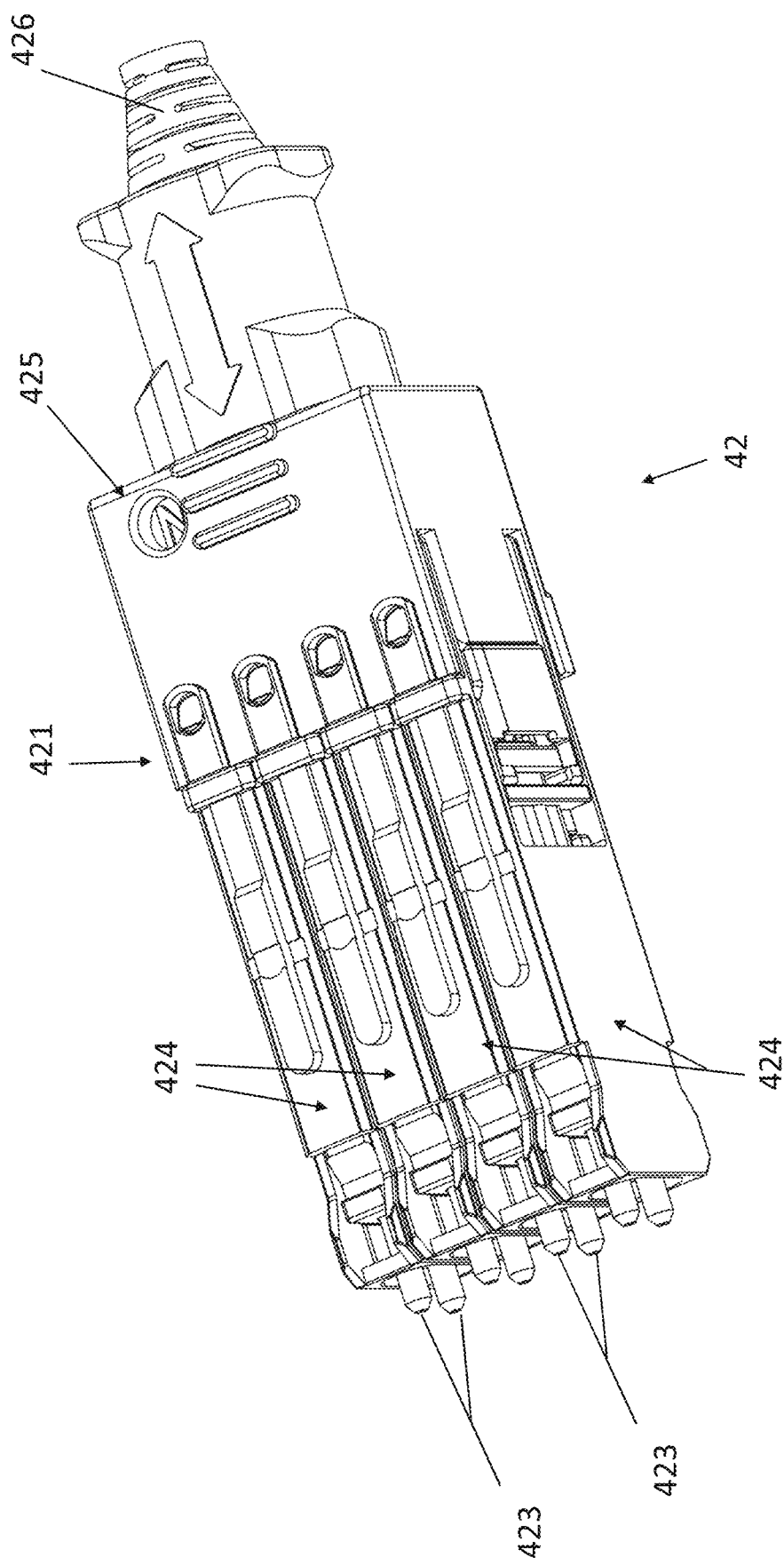
FIG. 4 is a perspective of VSFF duplex uniboot connector.

Referring to FIG. 4, an exemplary embodiment of a quad VSFF duplex uniboot connector is generally indicated at reference number 42. The uniboot connector broadly comprises a connector housing assembly 421 that is configured to terminate a multifiber cable (not shown). The connector housing assembly 421 is configured to hold a plurality of pairs of single-fiber ferrules 423 at the same pitch as the VSFF duplex connector 12. In the illustrated embodiment, the connector housing assembly 421 comprises a plurality of plug bodies 424, each having a size and shape substantially corresponding to the plug bodies 121 of the VSFF duplex connectors 12. The uniboot connector housing assembly 421 further comprises a single back body 425 that connects to the plug bodies 424 and defines a unitary cable boot 426. The illustrated uniboot connector 42 is configured to be plugged into one end portion of the VSFF duplex adapter 22 or the optical interface 321 of the VSFF duplex transceiver 32. Additional information about exemplary embodiments of a uniboot connector of the type depicted in FIG. 4 is available in U.S. Provisional Patent Application No. 63/317,040, which is hereby incorporated by reference in its entirety.

Figure 5:
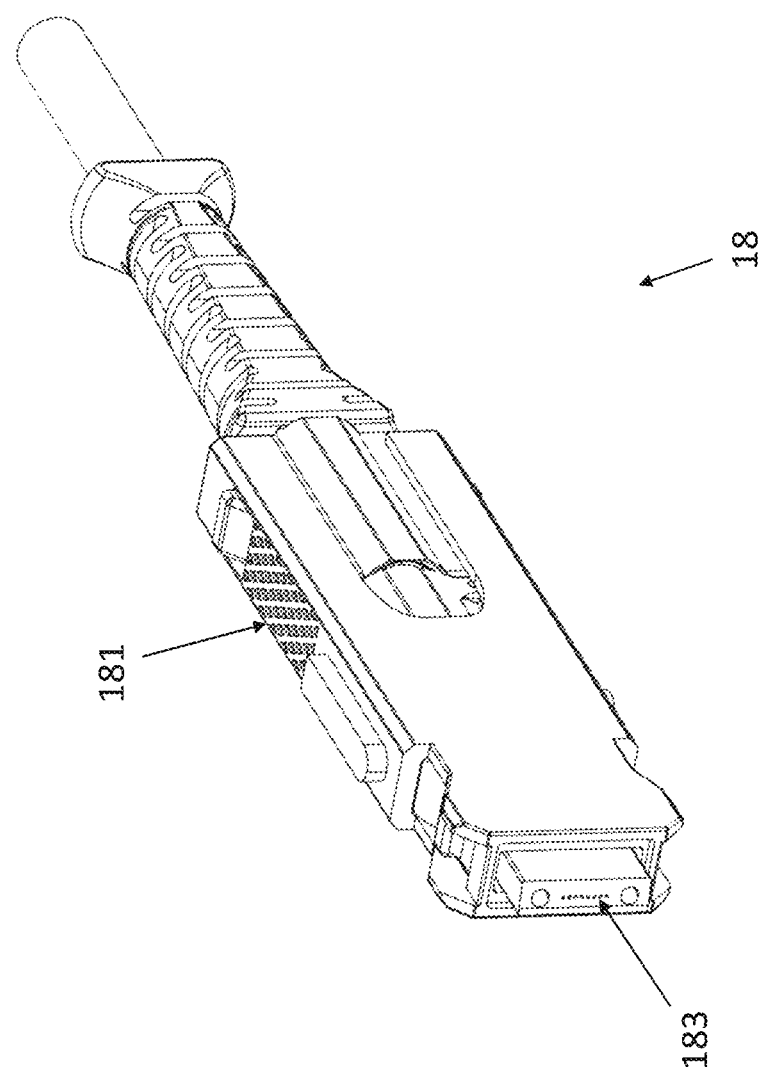
FIG. 5 is a perspective of an eight-fiber VSFF MT connector.
Figure 6:
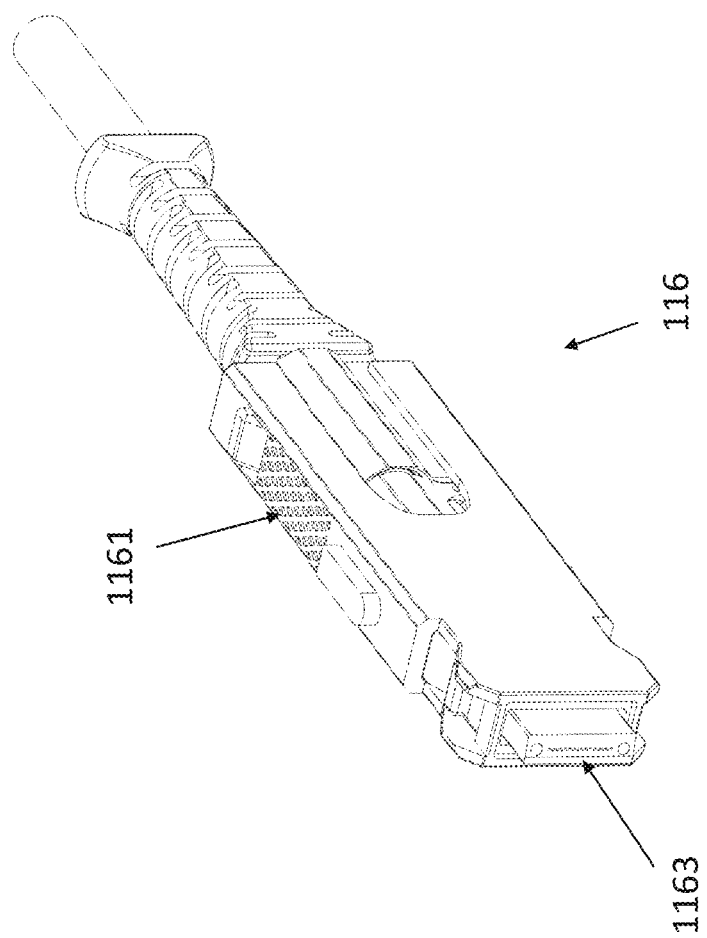
FIG. 6 is a perspective of a 16-fiber VSFF MT connector.

Referring to FIG. 5, an exemplary embodiment of a VSFF MT connector is shown at reference number 18. Those skilled in the art will recognize that the illustrated duplex VSFF connector is an SN-MT connector from Senko Advanced Components, Inc. The VSFF MT connector 18 is similar to the VSFF duplex connector 12 except that the plug body 181 holds a single eight-fiber MT ferrule 183. Other VSFF MT connectors can comprise a single MT ferrule that terminates twelve, 16, 24, or 32 optical fibers without departing from the scope of the disclosure. For example, FIG. 6 depicts another embodiment of a VSFF MT connector 116 comprising a plug body 1161 holding an MT ferrule 1163 that terminates 16 fibers.

Figure 7:
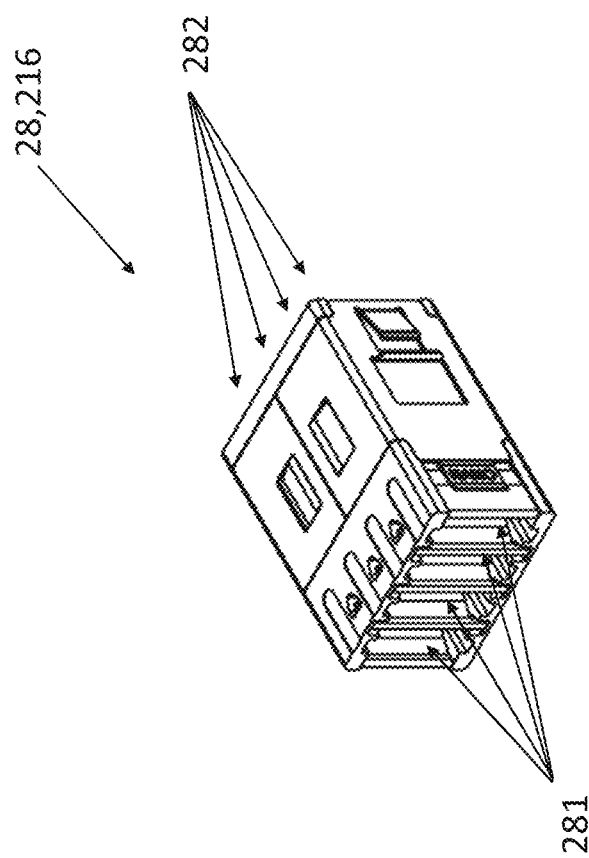
FIG. 7 is a perspective of a VSFF MT adapter.
Figure 8:
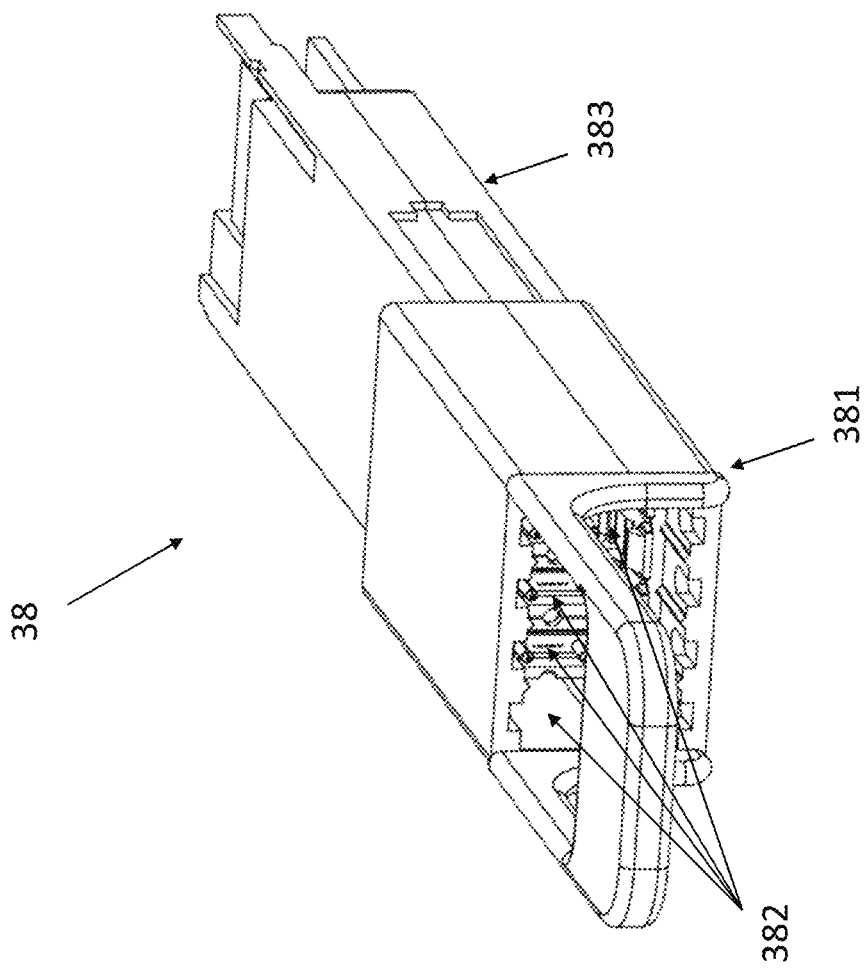
FIG. 8 is a perspective of a VSFF MT transceiver for the connectors of FIG. 5.
Figure 9:
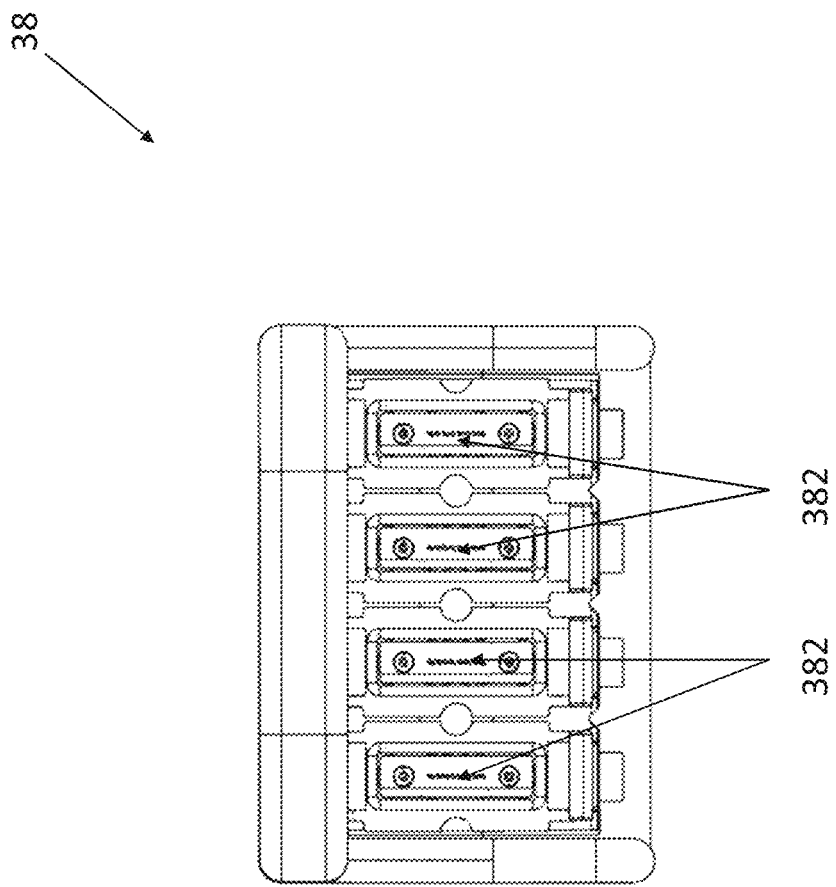
FIG. 9 is an elevation of the transceiver of FIG. 8.
Figure 10:
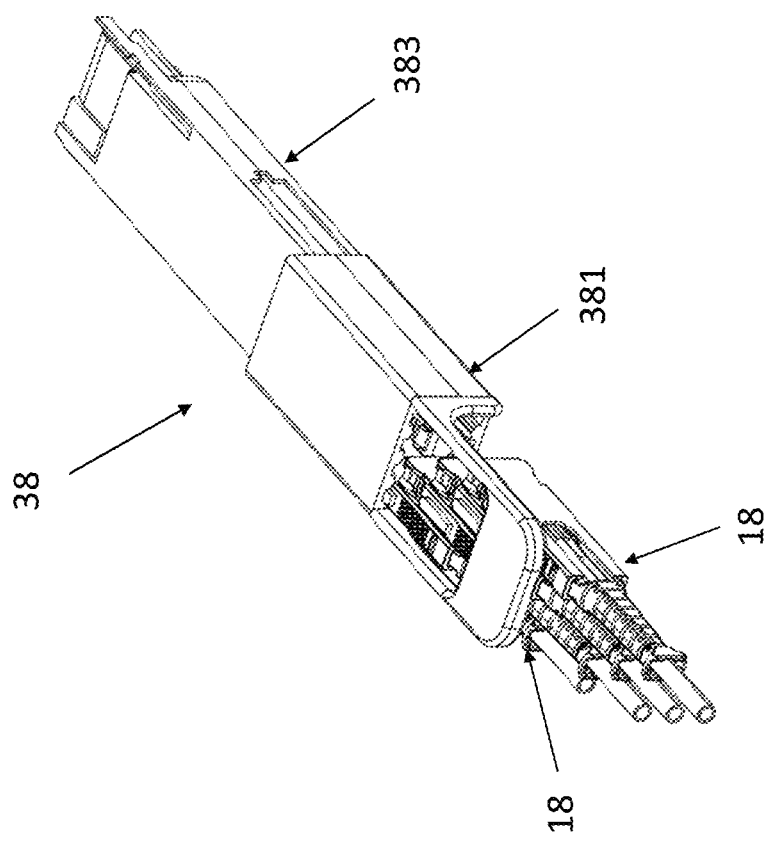
FIG. 10 is a perspective of connectors being inserted into the transceiver of FIG. 8.
Figure 11:
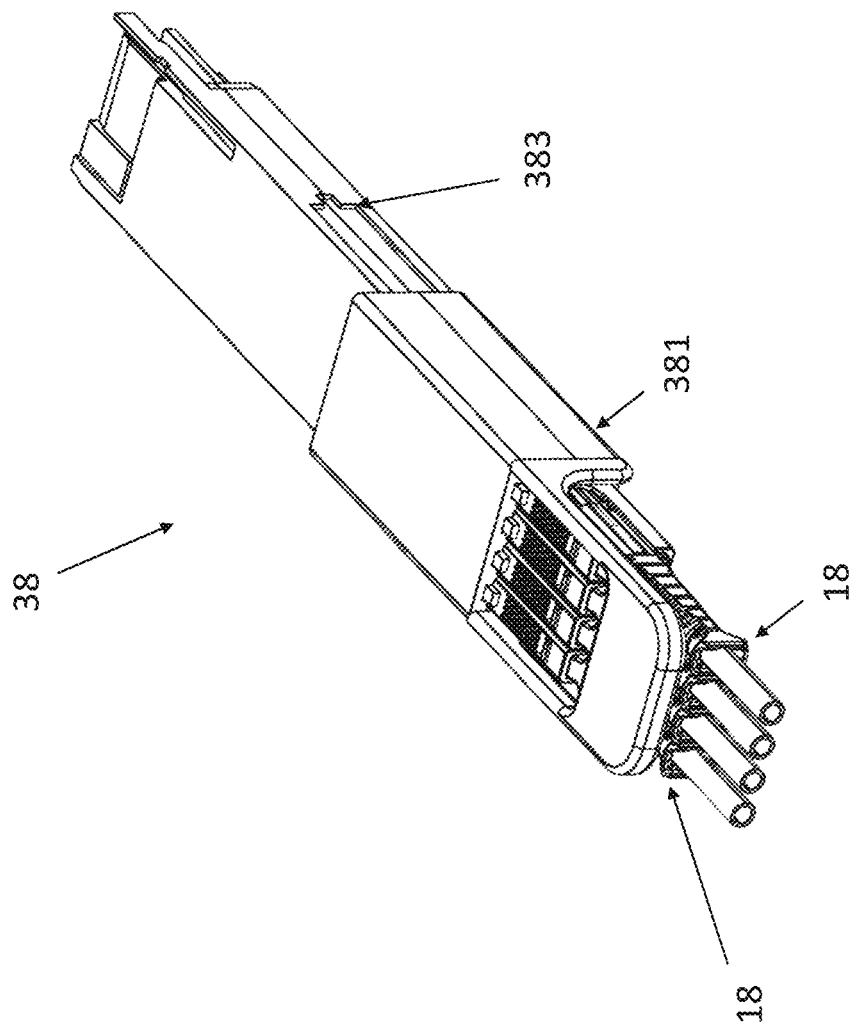
FIG. 11 is a perspective of connectors fully inserted in the transceiver of FIG. 8.
Figure 12:
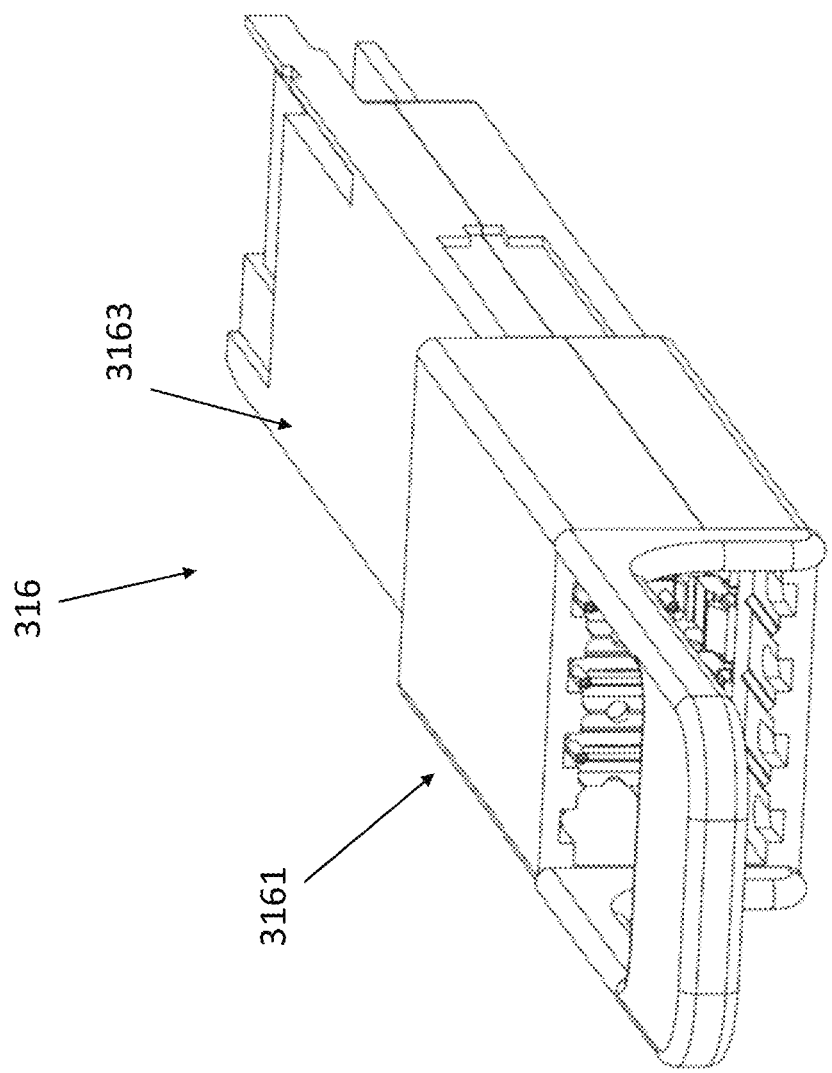
FIG. 12 is a perspective of a VSFF MT transceiver for the connectors of FIG. 6.
Figure 13:
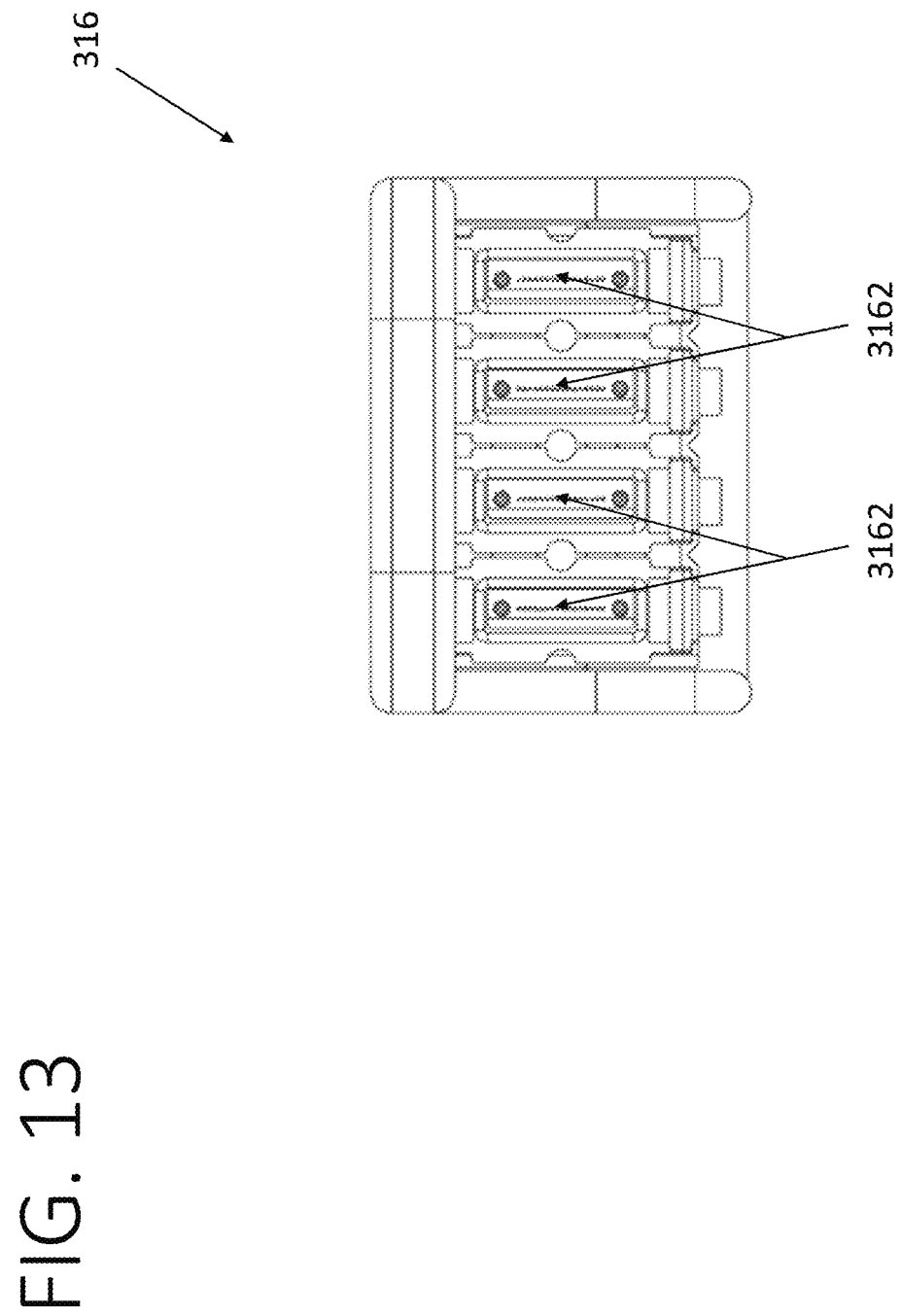
FIG. 13 is an elevation of the transceiver of FIG. 12.
Figure 14:
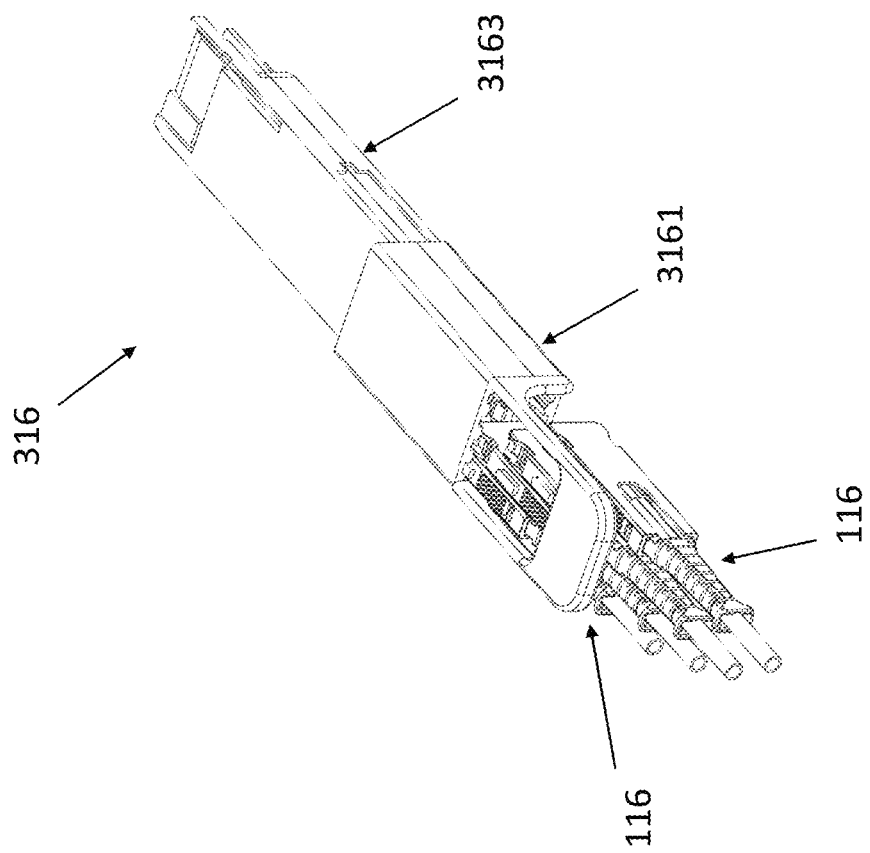
FIG. 14 is a perspective of connectors being inserted into the transceiver of FIG. 12.
Figure 15:
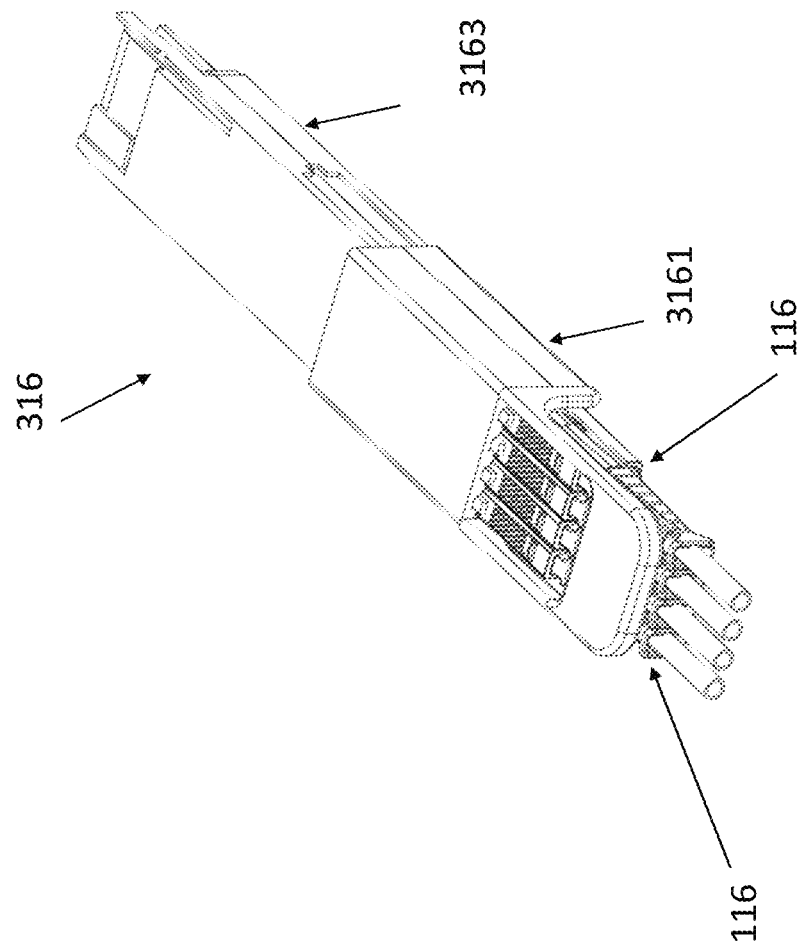
FIG. 15 is a perspective of connectors fully inserted in the transceiver of FIG. 12.

Referring to FIG. 7, an exemplary embodiment of a quad VSFF MT adapter of the type for mating with the eight-fiber VSFF MT connector 18 or the 16-fiber VSFF MT connector 116 is generally indicated at reference number 28, 216. Throughout this disclosure reference number 28 is used for an eight-fiber-per-port configuration of the adapter, and the reference number 216 is used for a 16-fiber-per-port configuration of the adapter. The adapter 28 is similar to the adapter 22 except that it is configured for MT ferrule connections instead of duplex single-fiber ferrule connections. In addition, the illustrated MT adapter 28, 216 is shuttered, and the duplex adapter 22 depicted in FIG. 2 is non-shuttered. But it will be understood that any type of adapter or optical interface contemplated by this disclosure can be shuttered or non-shuttered. The quad MT adapter 28, 216 comprises a first end portion defining first receptacles 281 and an opposite second end portion defining second receptacles 282. The VSFF MT adapter 28, 216 is generally configured to retain one or more MT-type VSFF connectors in each end portion such that an optical connection is made between the opposing connectors.

Referring to FIGS. 8-15, exemplary embodiments of quad VSFF MT transceivers for mating with the VSFF MT connectors 18, 116 are generally indicated at reference numbers 38 and 316. The transceiver 38 comprises a transceiver optical interface 381 defining receptacles 382 for mating with four eight-fiber VSFF MT connectors 18, and the transceiver 316 comprises a transceiver optical interface 3161 for mating with four 16-fiber VSFF MT connectors 116. Each transceiver 38, 316 further comprises a respective casing 383, 3163 that encloses optoelectronic circuitry configured for converting optical signals to electrical signals and vice versa.

Figure 16:
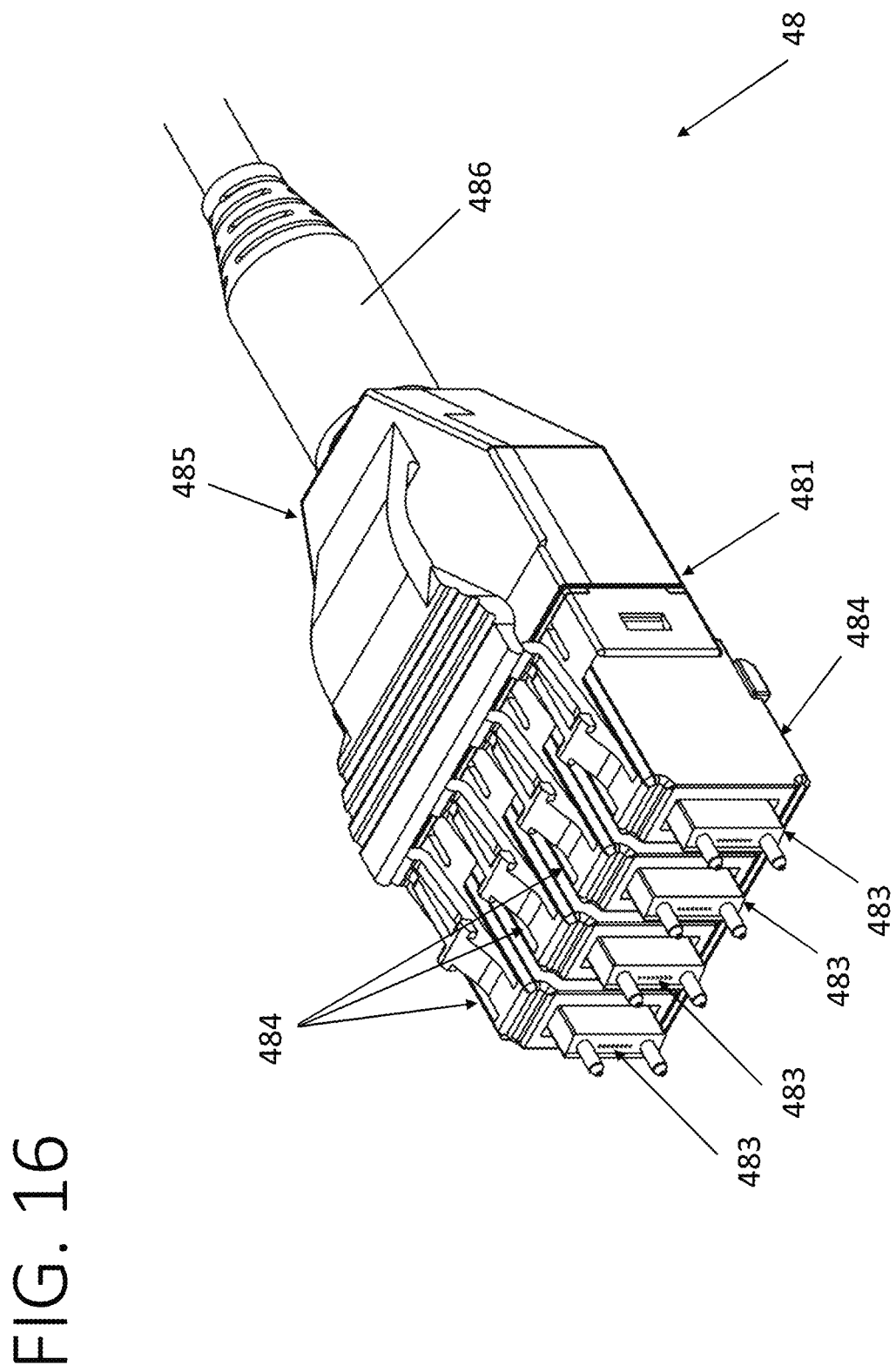
FIG. 16 is a perspective of VSFF MT uniboot connector with eight-fiber ferrules.
Figure 17:
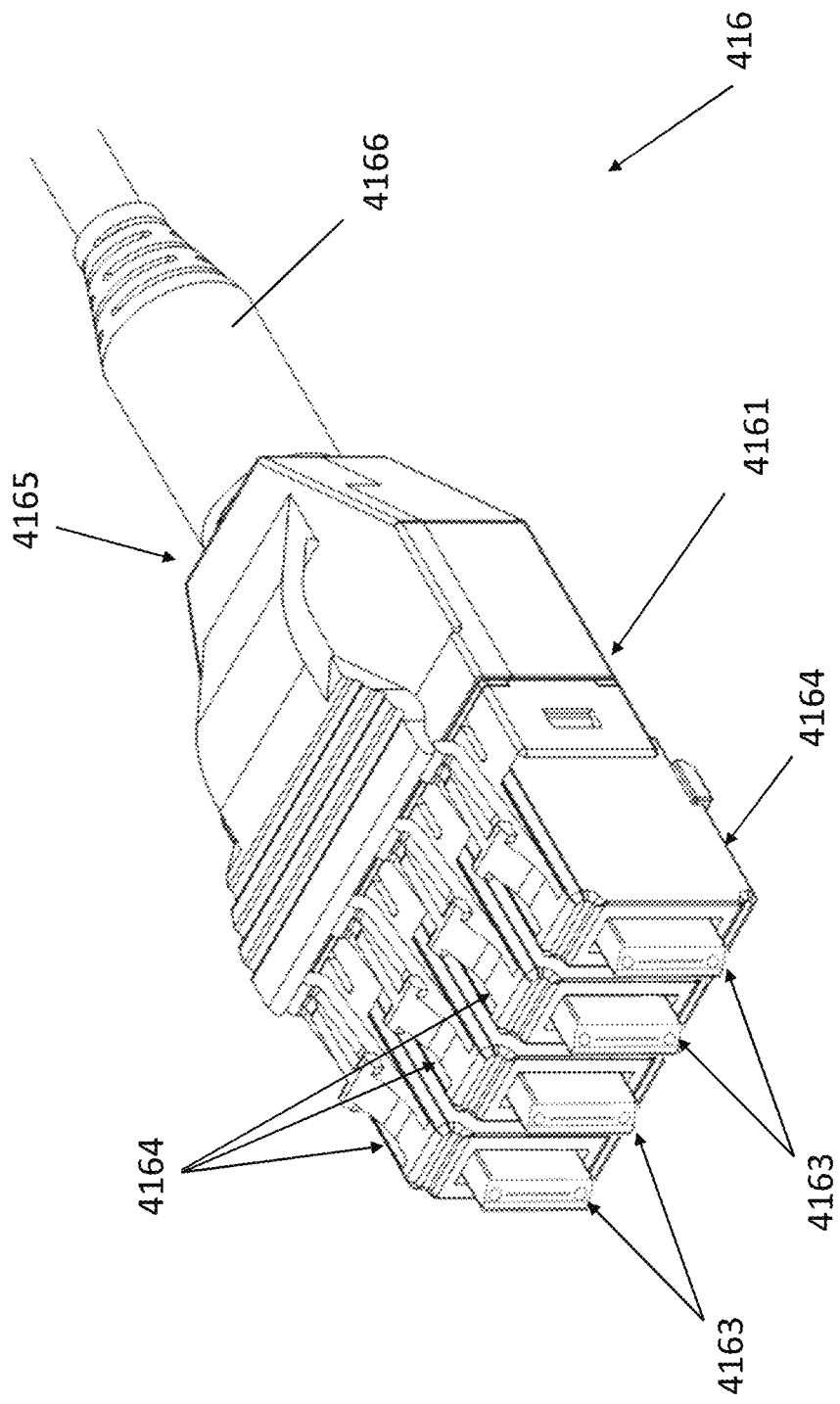
FIG. 17 is a perspective of a VSFF MT uniboot connector with 16-fiber ferrules.

Referring to FIGS. 16 and 17, exemplary embodiments of VSFF MT uniboot connectors are generally indicated at reference numbers 48 and 416. Each uniboot connector 48, 416 is similar to the VSFF duplex uniboot connector 42 except that the VSFF MT uniboot connector 48 comprises a connector housing assembly 481 for holding four eight-fiber MT ferrules 483 (e.g., four plug bodies 484 for holding the eight-fiber ferrules) and the VSFF MT uniboot connector 416 comprises a connector housing assembly 4161 for holding four 16-fiber MT ferrules 4163 (e.g., four plug bodies 4164 for holding the 16-fiber ferrules). Like the VSFF duplex uniboot connector 42, each VSFF MT uniboot connector 48, 416 comprises a single back body 485, 4165 that connects to the plug bodies 484, 4164 and defines a unitary cable boot 486, 4166 for the respective multifiber cable 482, 4162. Each MT uniboot connector is configured to plug into the optical interface 381, 3161 of a respective transceiver 38, 316 and to plug into an end portion of the respective VSFF MT adapter 28, 216.

Figure 18:
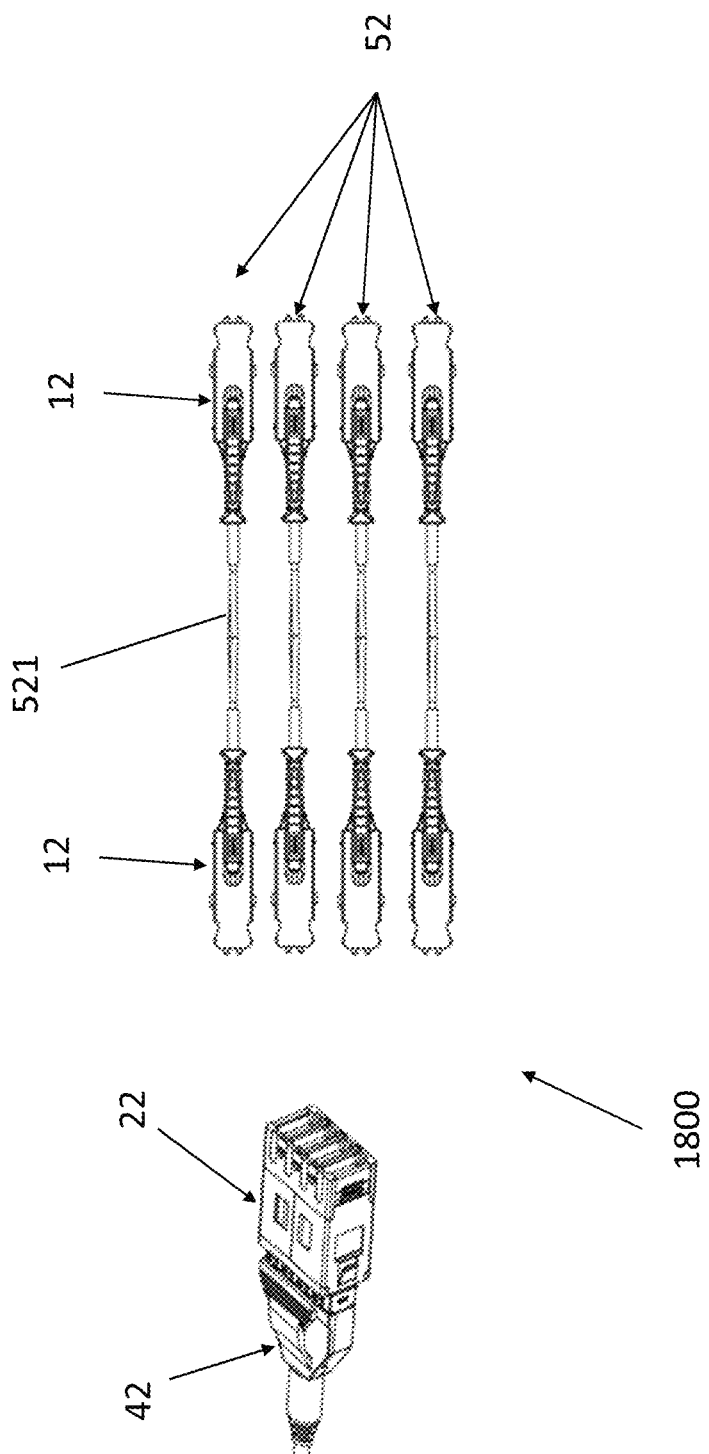
FIG. 18 is a perspective of a VSFF network system in a disconnected configuration.
Figure 19B:
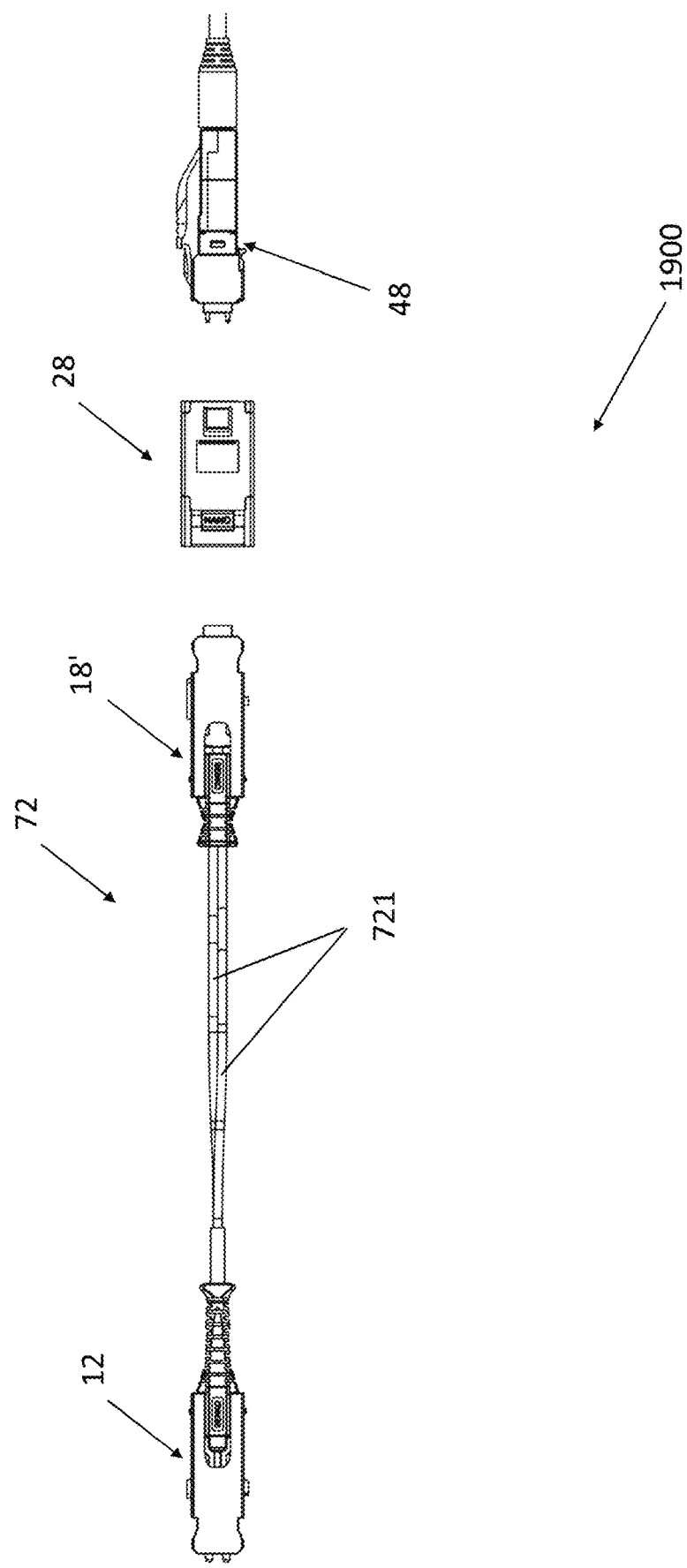
FIG. 19B is an elevation of the VSFF network system of FIG. 19A.
Figure 19C:
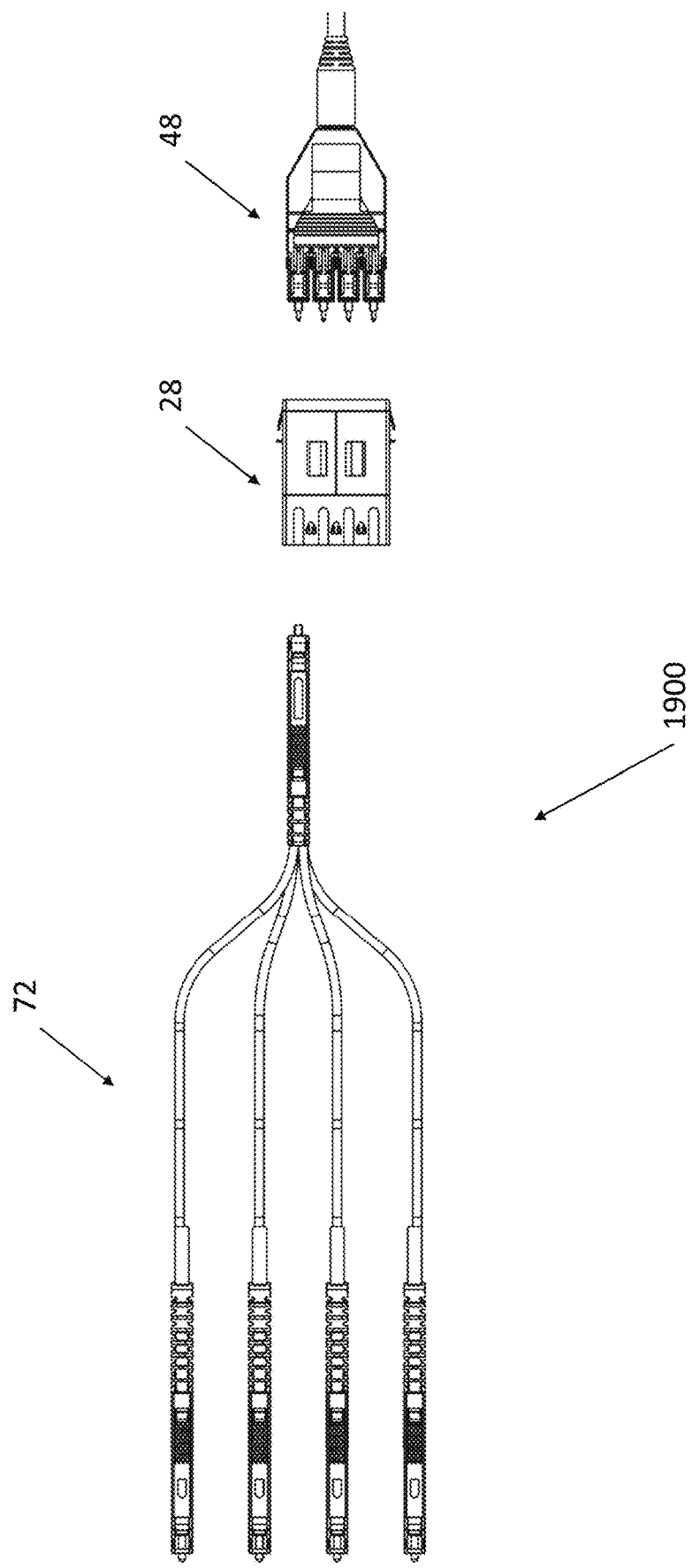
FIG. 19C is a plan view of the VSFF network system of FIG. 19A.
Figure 19D:
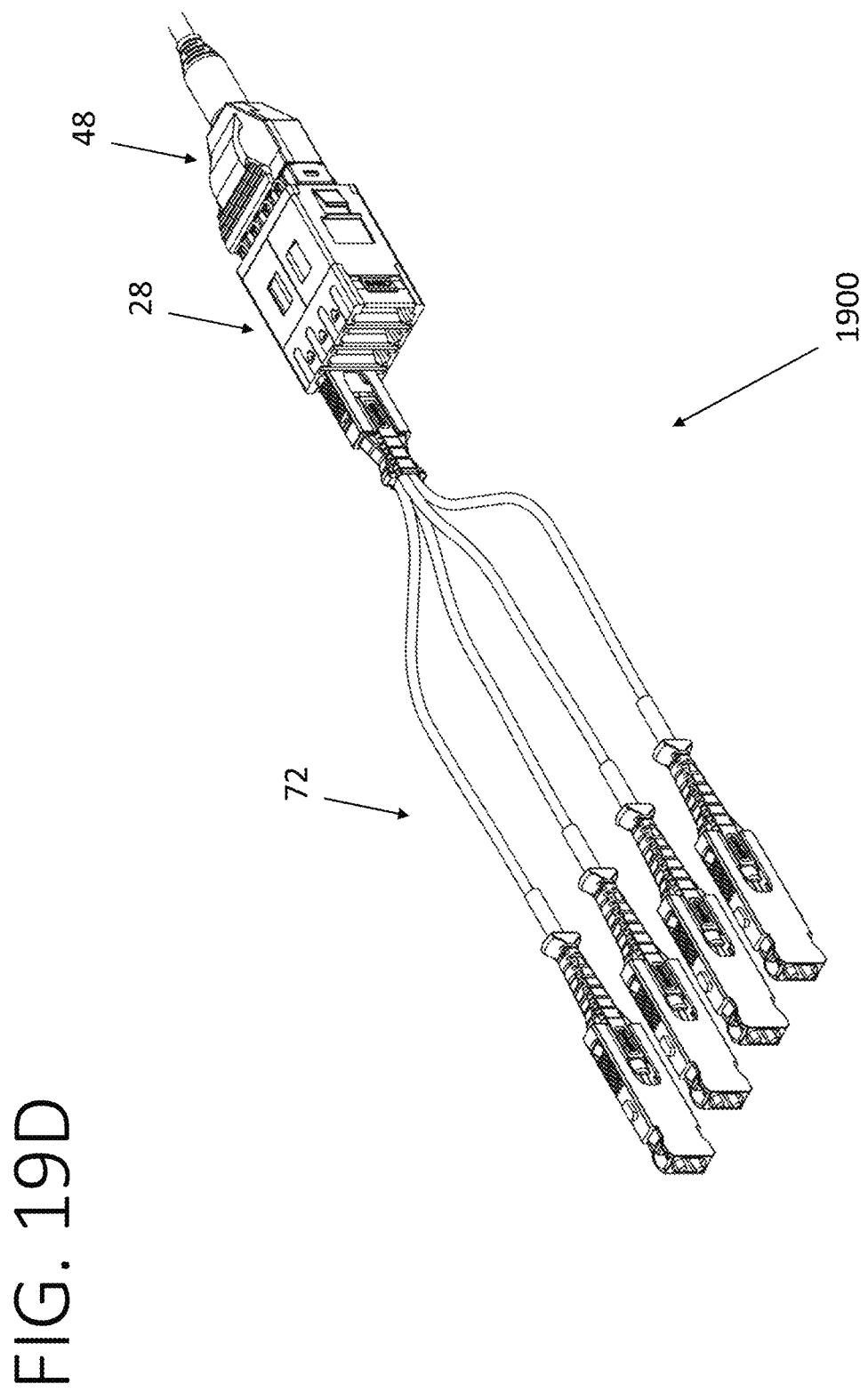
FIG. 19D is a perspective of the VSFF network system of FIG. 19A in a connected configuration.
Figure 20A:
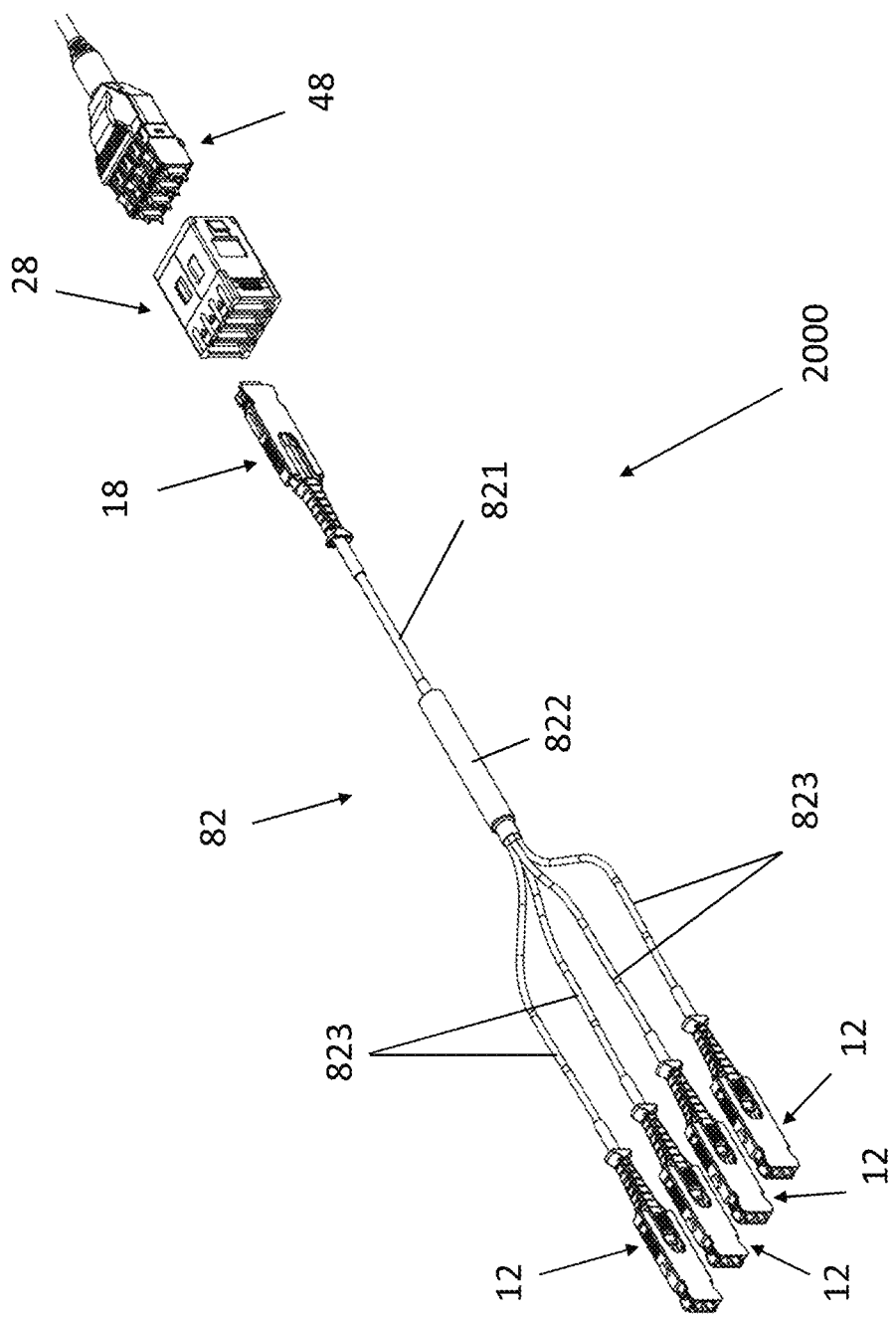
FIG. 20A is a perspective of another VSFF network system in a disconnected configuration.
Figure 20B:
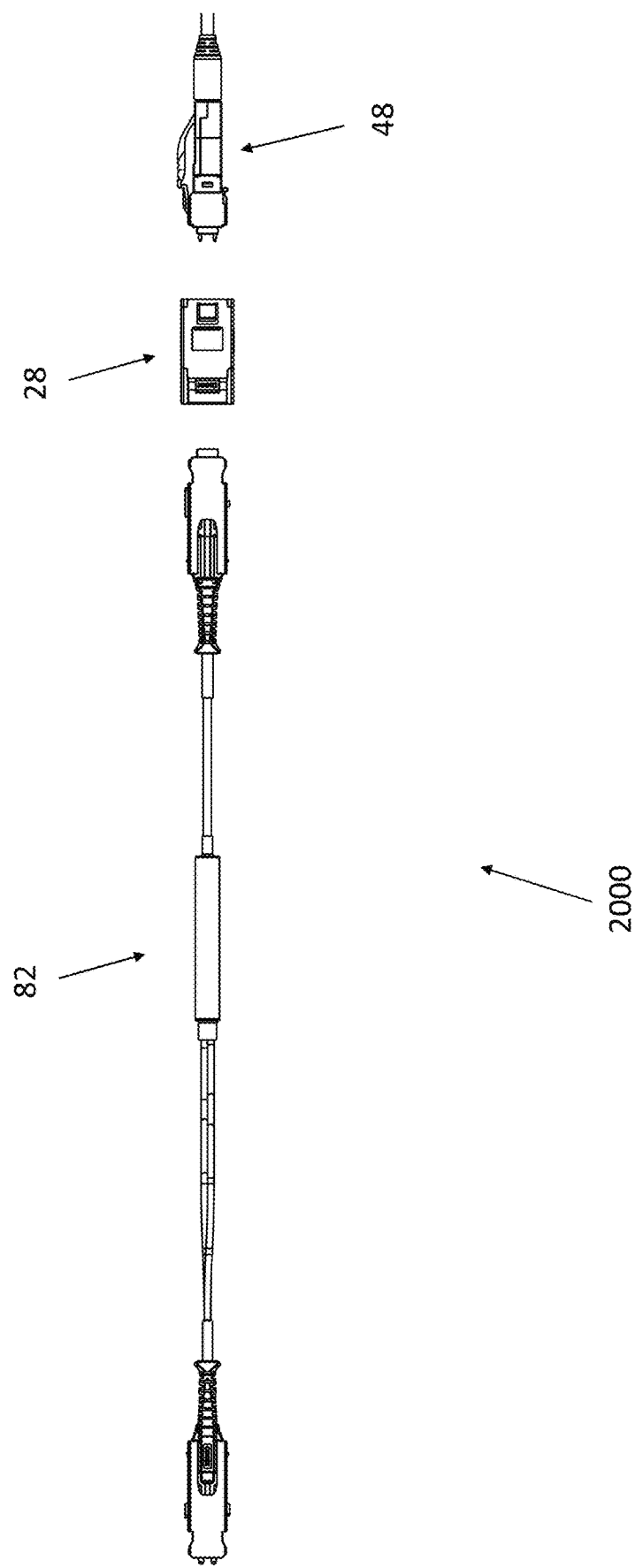
FIG. 20B is an elevation of the VSFF network system of FIG. 20A.
Figure 20C:
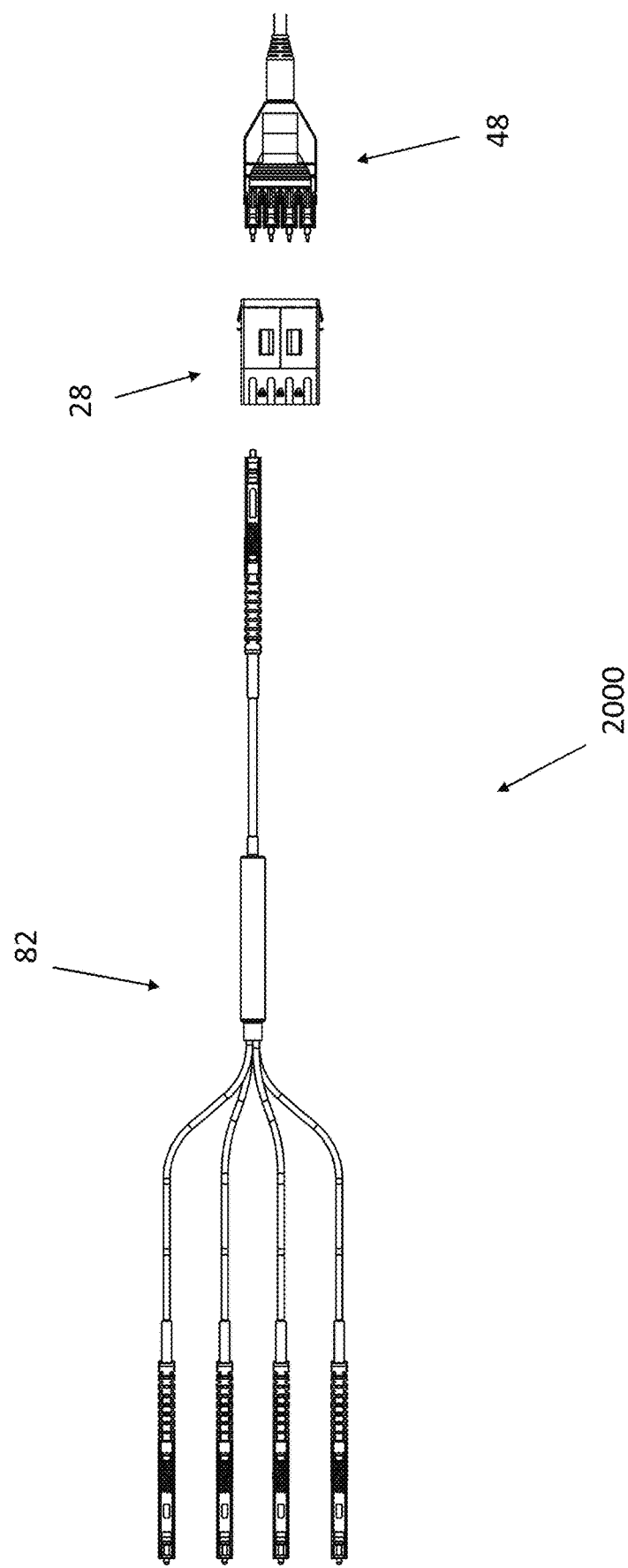
FIG. 20C is a plan view of the VSFF network system of FIG. 20A.
Figure 20D:
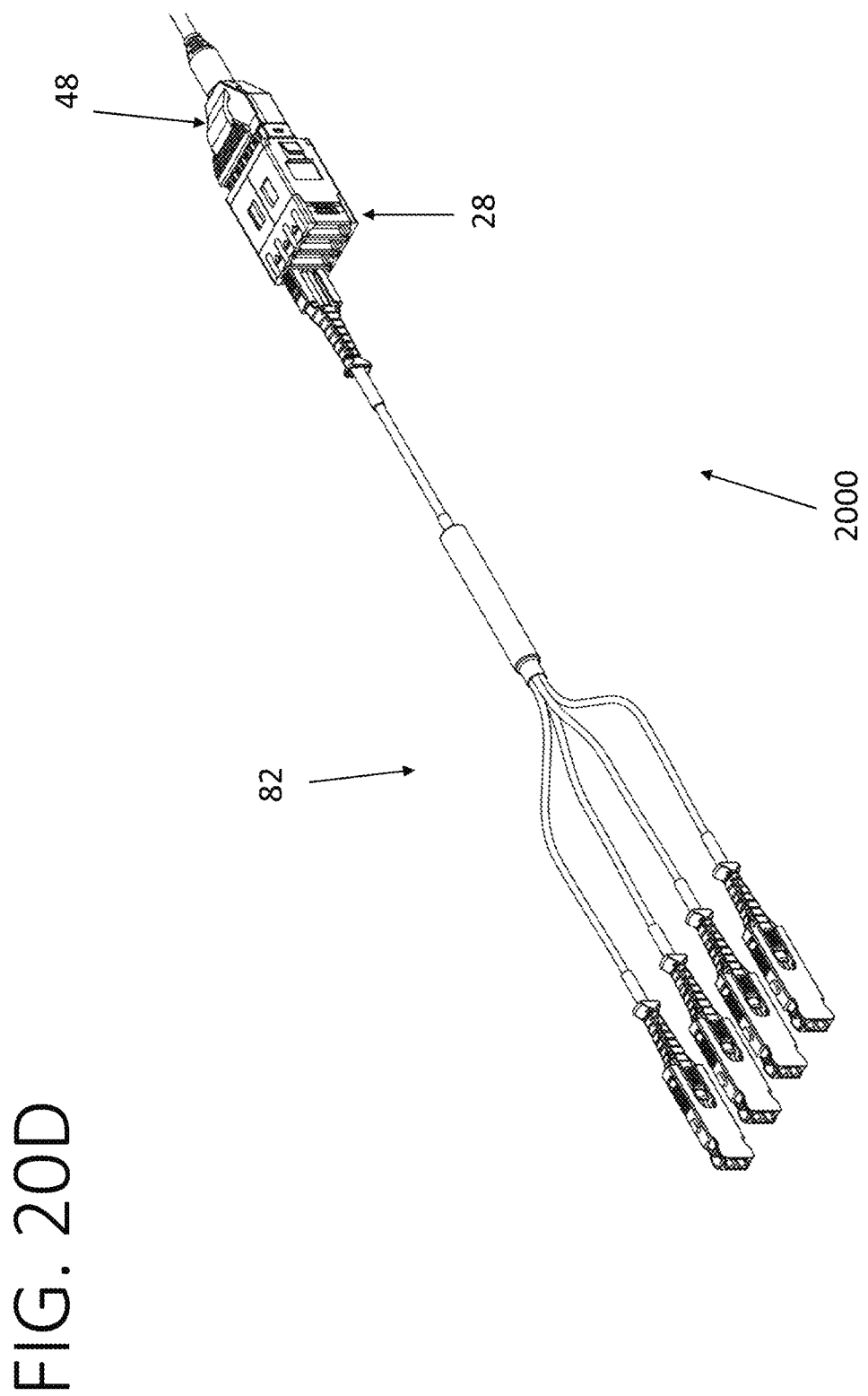
FIG. 20D is a perspective of the VSFF network system of FIG. 20A in a connected configuration.

Referring to FIG. 18, an exemplary embodiment of a fiber optic network system is generally indicated at reference number 1800. The fiber optic network system 1800 uses VSFF duplex interconnect components. The fiber optic network system 1800 comprises four VSFF duplex patch cable assembly assemblies 52. Each VSFF duplex patch cable assembly 52 comprises a two-fiber cable 521 having a first end portion terminated by a first VSFF duplex connector 12 and a second end portion terminated by a second VSFF duplex connector 12. The network system 1800 further comprises a VSFF duplex uniboot connector 42 terminating a single eight-fiber cable and a VSFF duplex adapter 22. As can be seen in FIG. 18, the network system 1800 is an eight-fiber, one-to-four breakout system in which a single cable with eight fibers defining for four two-fiber transmit-receive communication channels is broken out in the adapter 22 into four two-fiber, single-channel patch cable assemblies 52 without any prefabricated shuffle component or mid-span breakout component at any point along the fiber optic network system.

Referring to FIGS. 19A-19D, another exemplary embodiment of a fiber optic network system is generally indicated at reference number 1900. The fiber optic network system 1900 uses a combination of VSFF duplex and VSFF MT interconnect components. The fiber optic network system 1900 comprises an eight-fiber breakout connector unit 72. The illustrated breakout connector unit 72 comprises a single eight-fiber VSFF MT breakout connector 18' at one end and four two-fiber cables 721 that extend out of the rear end of the VSFF MT breakout connector. The VSFF MT breakout connector 18' differs from the standard eight-fiber VSFF MT connector 18 in that it accommodates four discrete two-fiber cables 721 instead of one eight-fiber cable. Each of the four cables 721 extends out of the strain relief boot 184' of the breakout connector 18', and each of the cables 721 is terminated at its second end by a VSFF duplex connector 12. Note that within a larger fiber optic network, the one-to-four connectorized breakout unit 72 can alone replace the function of the network system 1800 of FIG. 18.

Referring still to FIGS. 19A-19D, in addition to the breakout connector units 72, the fiber optic network system 1900 further comprises a VSFF MT uniboot connector 48 terminating a 32-fiber cable and a VSFF MT adapter 28. The uniboot connector 48 can be plugged into the first end portion of the adapter 28 and the MT connectors 18 of four breakout connector units 72 (only one breakout connector unit is shown for clarity) can be plugged into the second end portion of the adapter 28 to break out the signals from the uniboot connector 48 to sixteen individual two-fiber cables 721 and VSFF duplex connectors 12. The VSFF duplex connectors 12 can be individually plugged into desired peripheral locations in a fiber optic network (e.g., pluggable transceivers 32). It can be seen that the network system 1900 provides an easy way of breaking out many channels from a trunk cable or multifiber branch cable, without using cassettes or mid-span breakouts.

Referring to FIGS. 20A-20D, another exemplary embodiment of a fiber optic network system is generally indicated at reference number 2000. The fiber optic network system 2000 uses a combination of VSFF duplex and VSFF MT interconnect components. The fiber optic network system 2000 comprises an eight-fiber fan-out unit 82. The illustrated fan-out unit 82 comprises a single eight-fiber VSFF MT connector 18, an eight-fiber cable section 821 extending from the VSFF MT connector, a fan-out block 822 connected to the eight-fiber cable section, four two-fiber cables 823 extending from the fan-out block, and VSFF duplex connectors 12 terminating the duplex cables. The fan-out unit 82 has the same capabilities as the breakout breakout unit 72. The difference is the use of a fan-out block 822 at a mid-span location to break out one eight-fiber cable 821 into four two fiber cables 823, instead providing a breakout connector 18' that receives four two-fiber cables 721.

Referring still to FIGS. 20A-20D, in addition to the fan-out unit 82, the fiber optic network system 2000 further comprises a VSFF MT uniboot connector 48 terminating a 32-fiber cable and a VSFF MT adapter 28. The uniboot connector 48 can be plugged into the first end portion of the adapter 28 and the MT connectors 18 of four of the fan-out units 82 (only one fan-out unit is shown for clarity) can be plugged into the second end portion of the adapter 28 to break out the signals from the uniboot connector 48 into sixteen individual duplex cables 823 and VSFF duplex connectors 12. The VSFF duplex connectors 12 can be individually plugged into desired peripheral locations in a fiber optic network (e.g., pluggable transceivers 32). It can be seen that the network system 2000 provides an easy way of breaking out many individual channels from a trunk cable or multifiber branch cable.

Figure 21A:
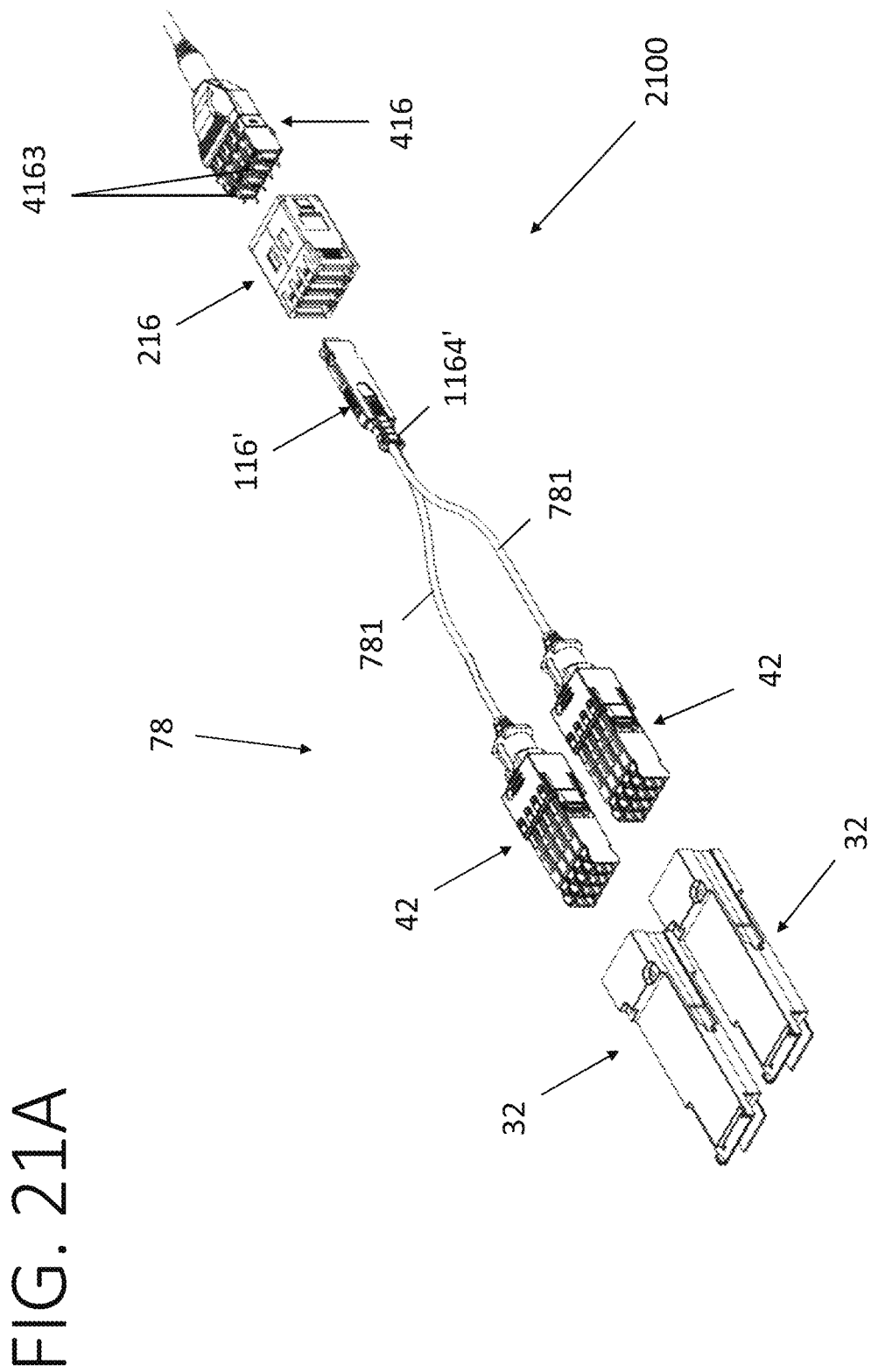
FIG. 21A is a perspective of another VSFF network system in a disconnected configuration.
Figure 21B:
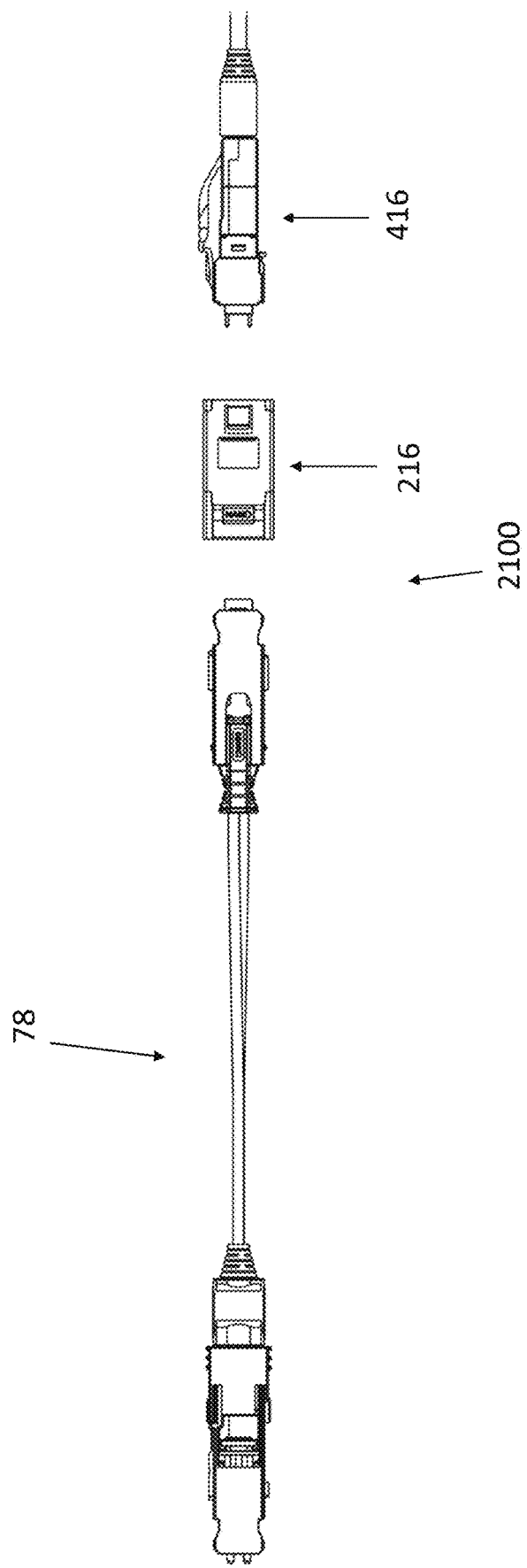
FIG. 21B is an elevation of the VSFF network system of FIG. 21A.
Figure 21C:
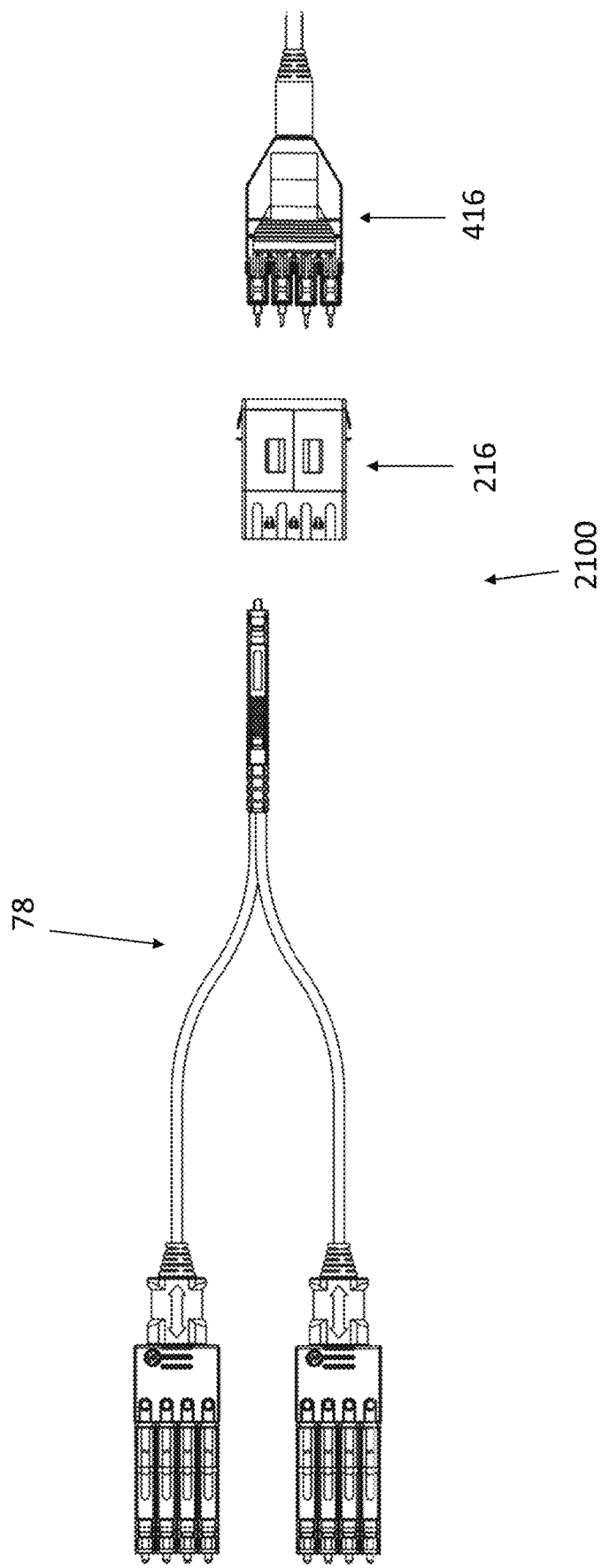
FIG. 21C is a plan view of the VSFF network system of FIG. 21A.

Referring to FIGS. 21A-21C, another exemplary embodiment of a fiber optic network system is generally indicated at reference number 2100. The fiber optic network system 2100 uses a combination of VSFF duplex and VSFF MT interconnect components. The fiber optic network system 2100 comprises a sixteen-fiber breakout connector unit 78. The illustrated breakout connector unit 78 comprises a single sixteen-fiber VSFF MT connector 116' at one end and two eight-fiber cables 781 that extend out of the rear end of the VSFF MT breakout connector. Each of the two cables 781 extends out of the strain relief boot 1164' of the breakout connector 116', and each of the cables 781 is terminated at its second end by an eight-fiber VSFF duplex uniboot connector 42.

Referring still to FIGS. 21A-21C, in addition to the breakout units 78, the fiber optic network system 2100 further comprises a VSFF MT uniboot connector 416 terminating a 64-fiber cable and a VSFF MT adapter 216. The uniboot connector 416 can be plugged into the first end portion of the adapter 216, and the VSFF MT breakout connectors 116' of four of the breakout units 78 (only one breakout unit is shown for clarity) can be plugged into the second end portion of the adapter 16 to break out the signals from each MT ferrule 4163 of the uniboot connector 416 to the two eight-fiber cables 781 terminated by the VSFF duplex uniboot connectors 42. The VSFF duplex connectors 42 can be plugged into desired peripheral locations in a fiber optic network such as the pluggable transceivers 32 shown in FIG. 21A. In another embodiment (not shown), the VSFF duplex connectors 42 are each plugged into a VSFF duplex adapter to make a further breakout via network system 1800.

Figure 22A:
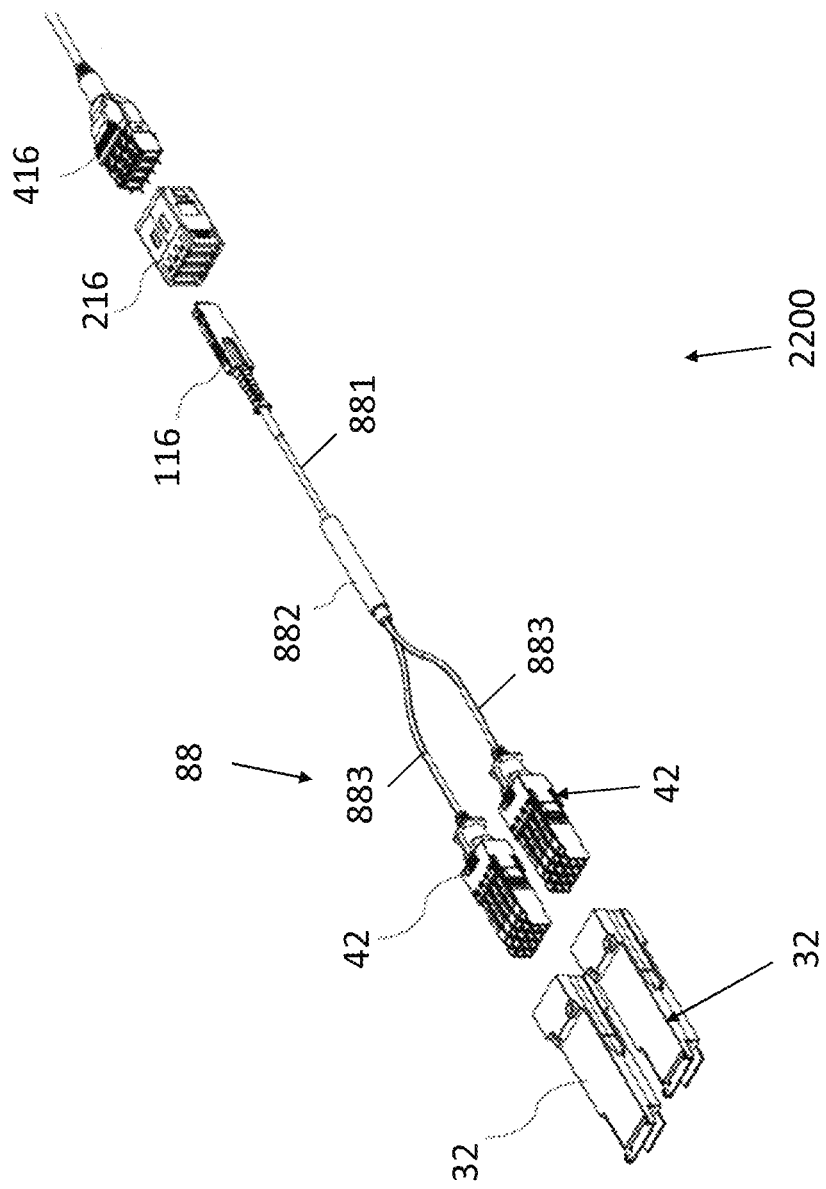
FIG. 22A is a perspective of another VSFF network system in a disconnected configuration.
Figure 22B:
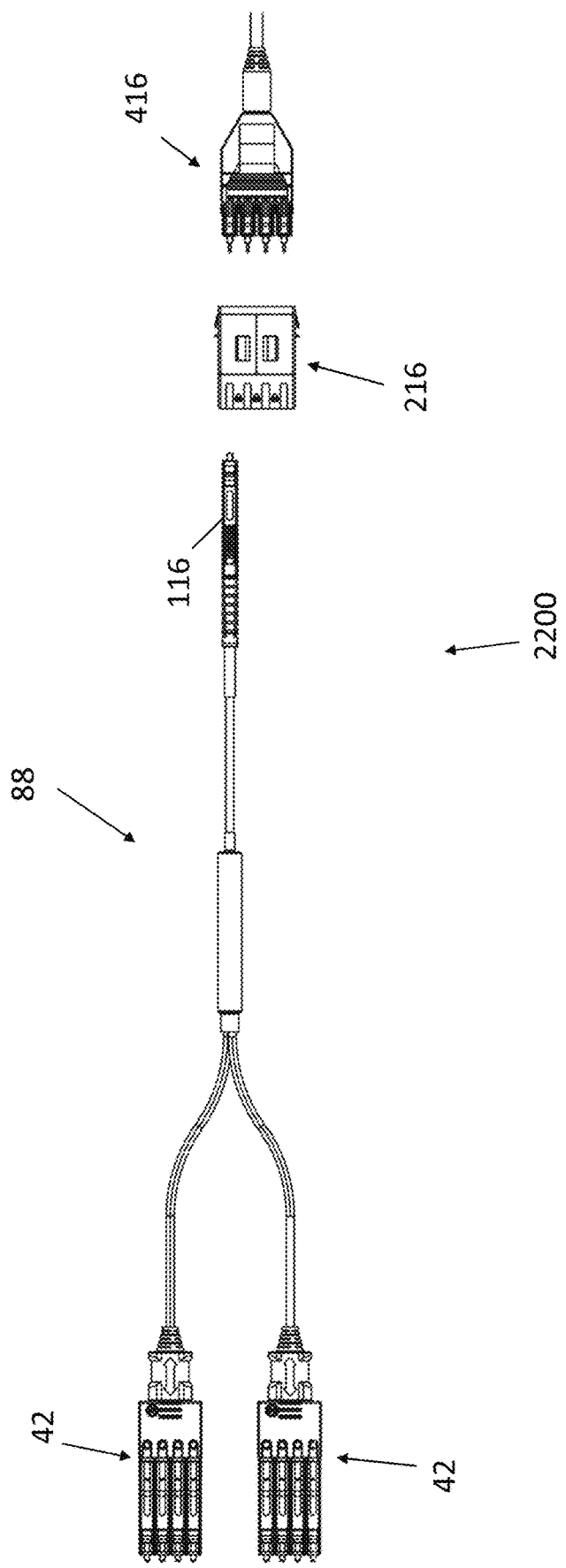
FIG. 22B is a plan view of the VSFF network system of FIG. 22A.

Referring to FIGS. 22A-22B, another exemplary embodiment of a fiber optic network system is generally indicated at reference number 2200. The fiber optic network system 2200 is similar to the fiber optic network system 2100, except that the breakout connector unit 78 is replaced with a fan-out unit 88 that performs the same function. The illustrated fan-out unit 88 comprises a single sixteen-fiber VSFF MT connector 116 at one end, a sixteen-fiber cable section 881 extending from the VSFF MT connector, a fan-out block 882 connected to the sixteen-fiber cable section, two eight-fiber cables 883 extending from the fan-out block, and VSFF duplex uniboot connectors 42 terminating the eight-fiber cables.

Figure 23B:
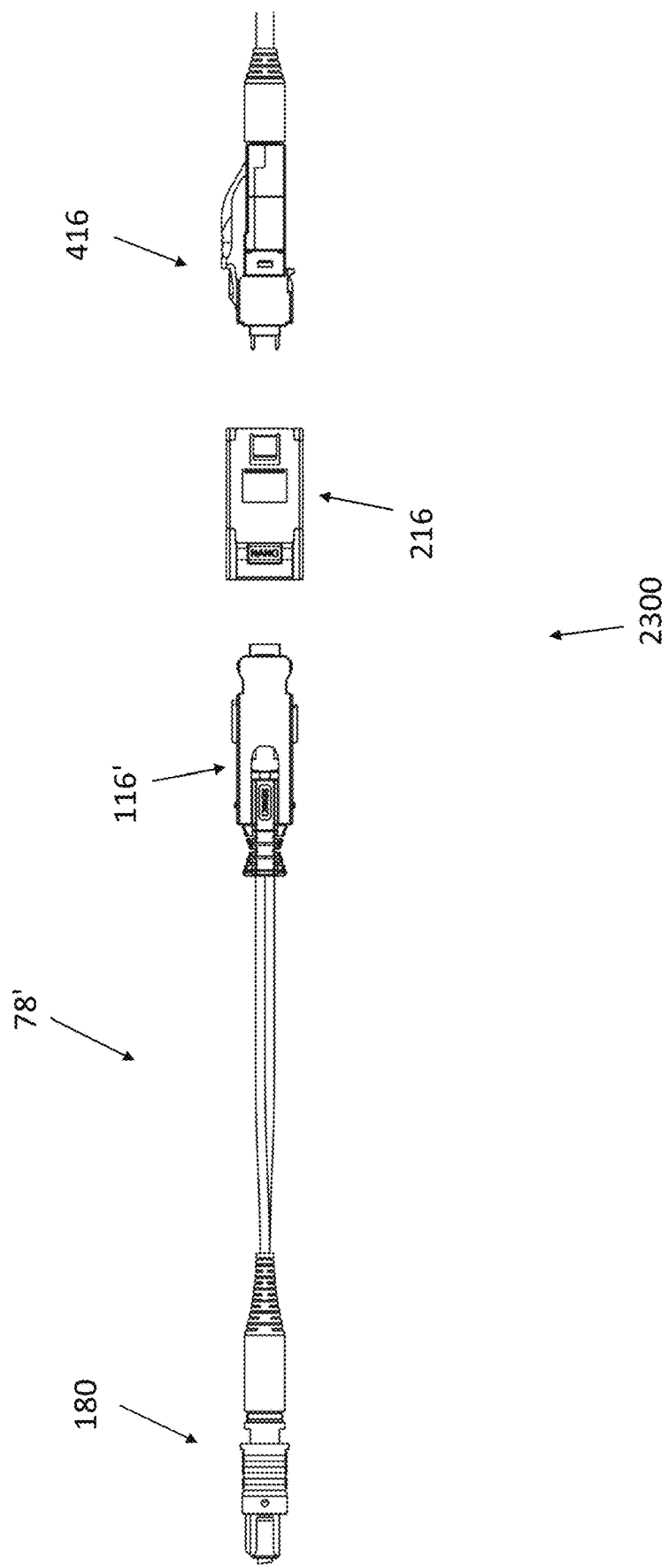
FIG. 23B is an elevation of the VSFF network system of FIG. 23A.
Figure 23C:
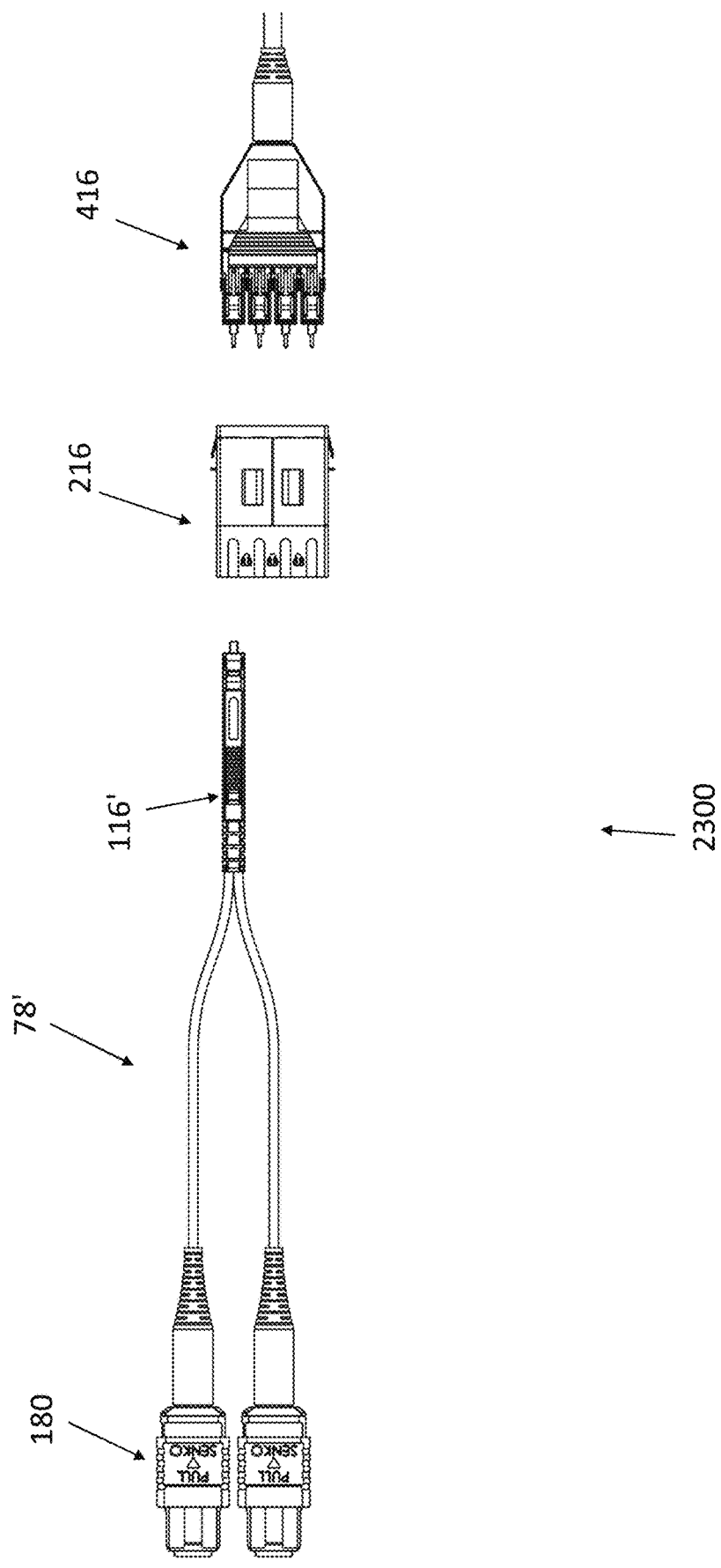
FIG. 23C is a plan view of the VSFF network system of FIG. 23A.

Referring to FIGS. 23A-23C, another exemplary embodiment of a fiber optic network system is generally indicated at reference number 2300. The fiber optic network system 2300 is similar to the fiber optic network system 2100, except that the breakout connector unit 78 is replaced with a breakout connector unit 78' that performs the same function using different connectors opposite the VSFF MT breakout connector 116'. Instead of using uniboot connectors 42, the breakout connector unit 78' uses eight-fiber MPO connectors 180. The MPO connectors 180 can be plugged into peripheral locations of a fiber optic network, e.g., MPO transceivers 380.

Figure 24B:
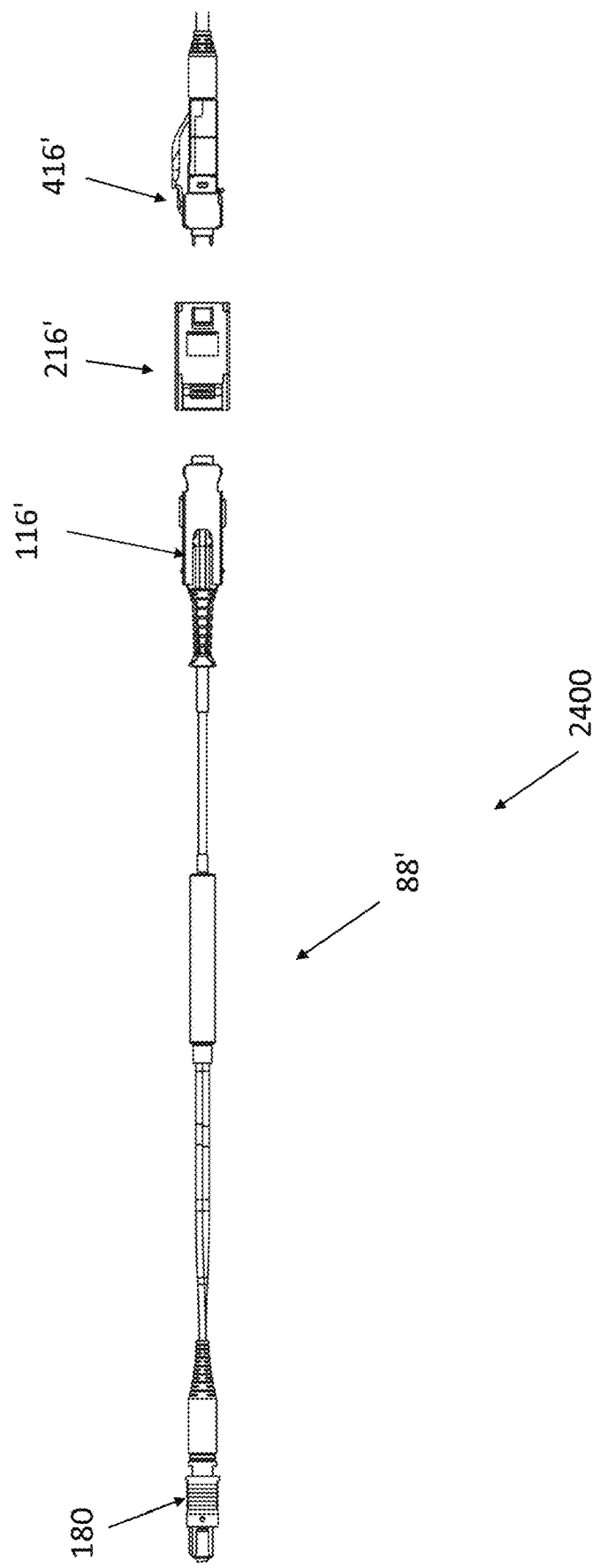
FIG. 24B is an elevation of the VSFF network system of FIG. 24A.
Figure 24C:
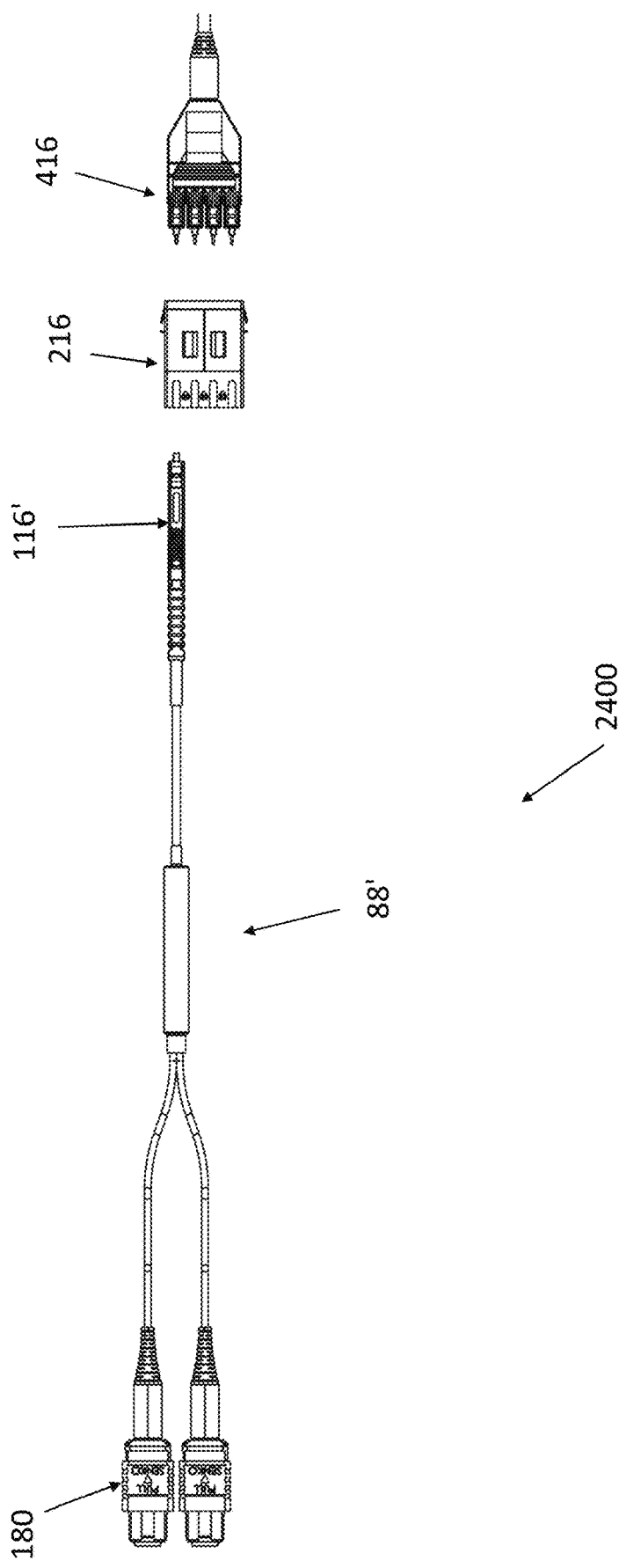
FIG. 24C is a plan view of the VSFF network system of FIG. 24A.

Referring to FIGS. 24A-24C, another exemplary embodiment of a fiber optic network system is generally indicated at reference number 2400. The fiber optic network system 2400 is similar to the fiber optic network system 2200, except that the fan-out unit 88 is replaced with a fan-out unit 88' that performs the same function using different connectors opposite the VSFF MT breakout connector 116'. Instead of using uniboot connectors 48, the fan out unit 88' uses eight-fiber MPO connectors 180.

Figure 25:
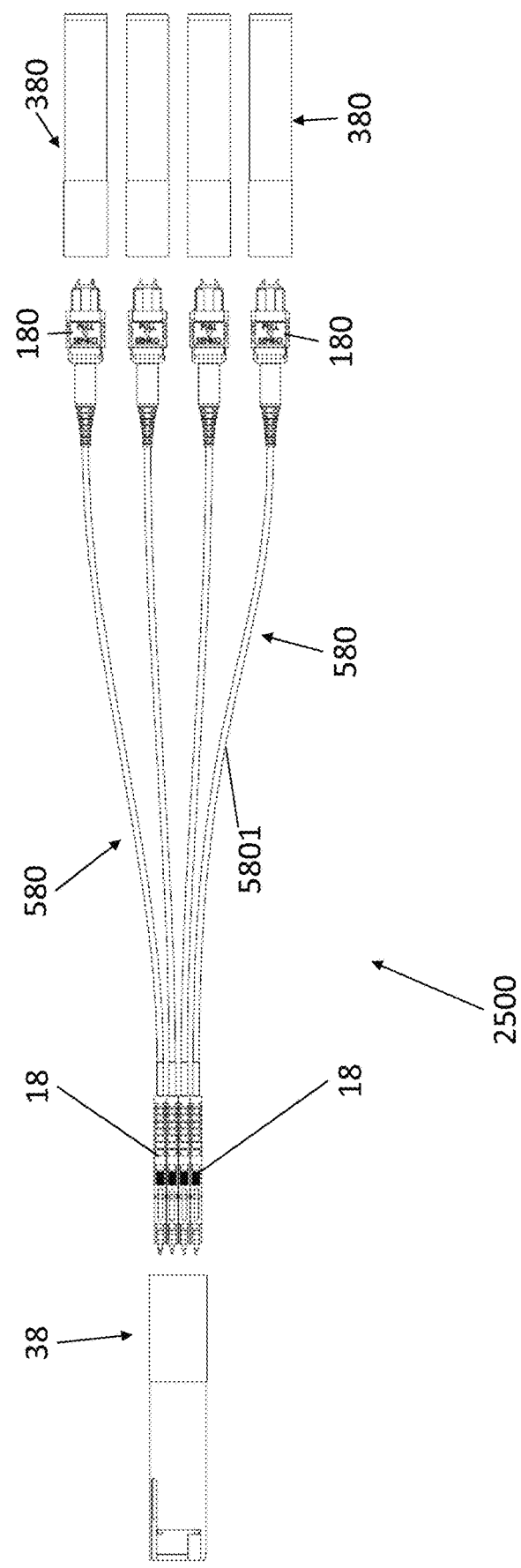
FIG. 25 is a plan view of another VSFF network system in a disconnected configuration.

Referring to FIG. 25, another exemplary embodiment of a fiber optic network system is generally indicated at reference number 2500. The fiber optic network system 2500 is configured to connect a 32-fiber VSFF pluggable transceiver 38 to four separate MPO pluggable transceivers 380. The fiber optic network system 2500 comprises four patch cable assemblies 580. Each patch cable assembly comprises an eight-fiber cable 5801 having a first end portion and a second end portion. The first end portion is terminated by an eight-fiber VSFF MT connector 18, and the second end portion is terminated by an MPO connector 180. As can be seen, the four VSFF MT connectors 18 are plugged into the 32-fiber transceiver 38, and the four MPO connectors 180 are plugged into four eight-fiber transceivers 380 (e.g., QSFP MPO transceivers).

Figure 26:
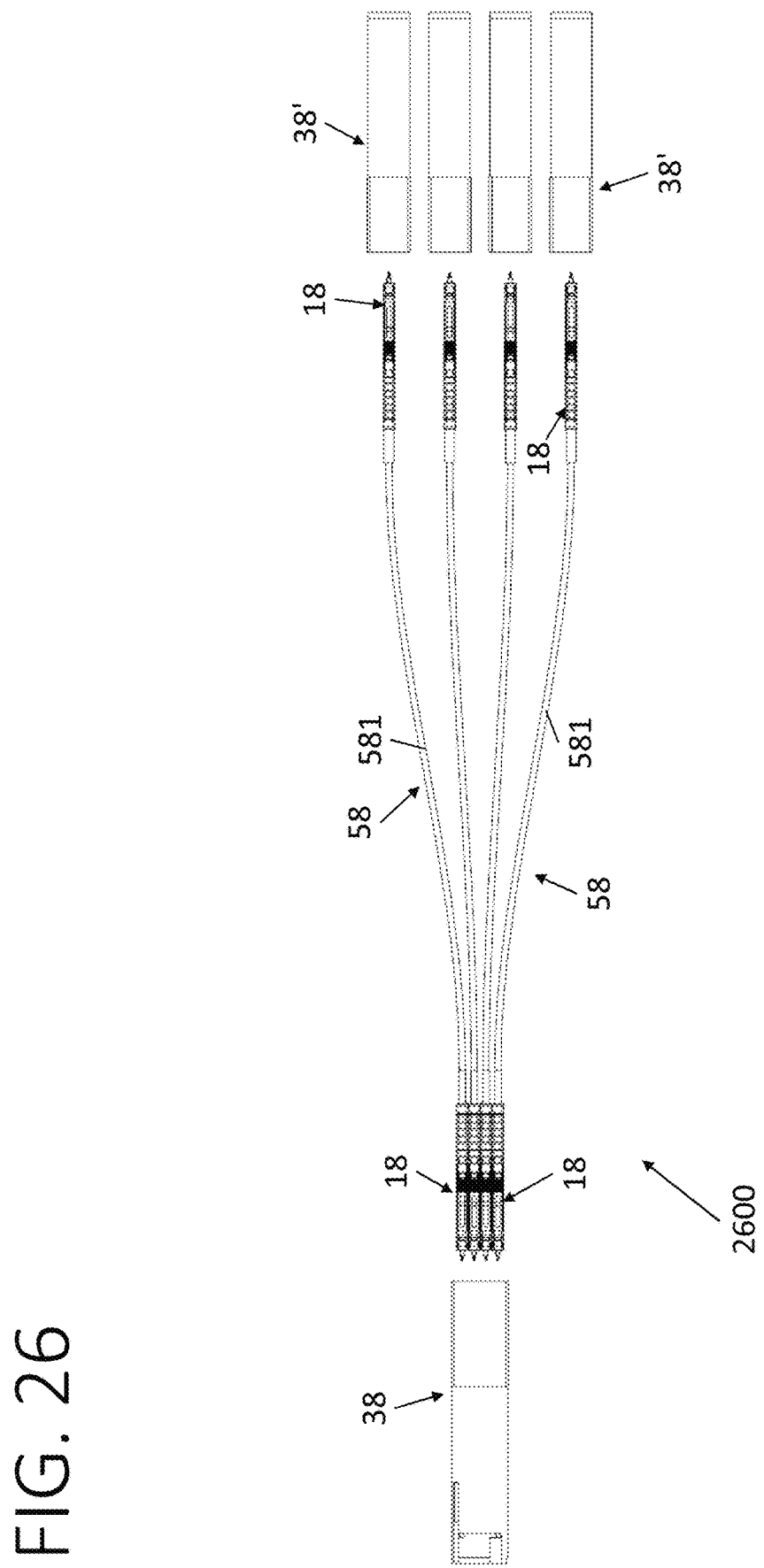
FIG. 26 is a plan view of another VSFF network system in a disconnected configuration.

Referring to FIG. 26, another exemplary embodiment of a fiber optic network system is generally indicated at reference number 2600. The fiber optic network system 2600 is similar to the network system 2500 except that the patch cable assemblies 580 are replaced by patch cable assemblies 58. Each patch cable assembly 58 comprises a cable 581 having a first end portion terminated by a VSFF MT connector 18 and an opposite second end portion terminated by a VSFF MT connector of the same type. Like the network system 2500, the network system 2600 comprises a transceiver 38 for mating with the four VSFF MT connectors 18 on the first end portions of the cables 581 and four single-connector transceivers 38' for mating with individual ones of the connectors 18 at the second end of the patch cable assemblies 58.

Figure 27:
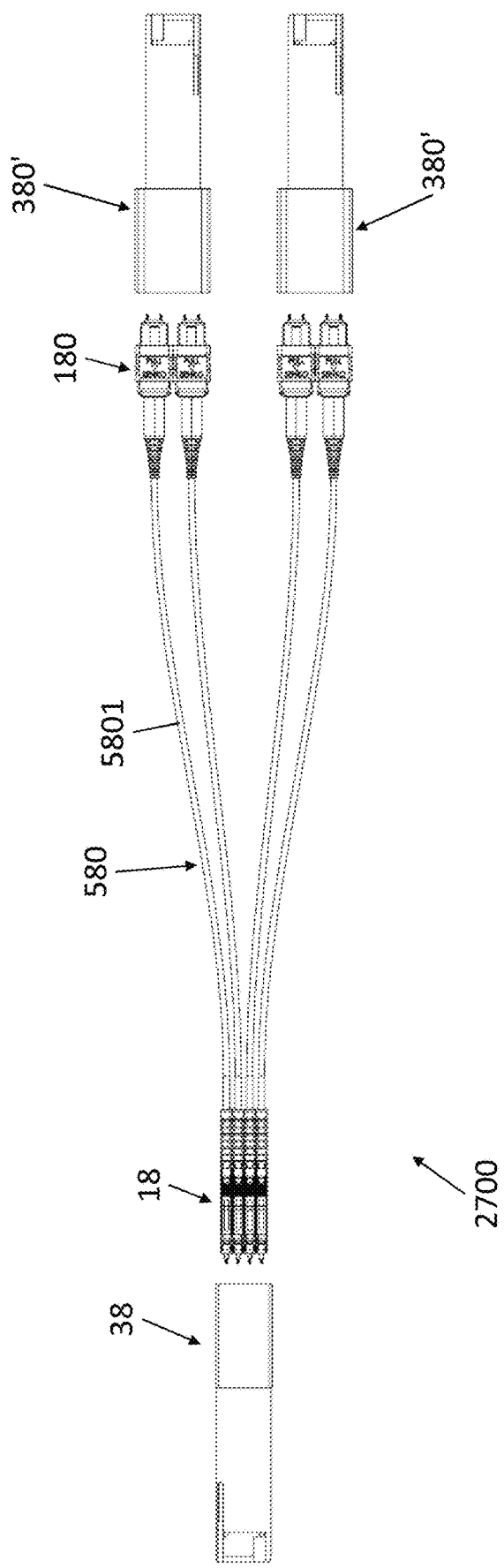
FIG. 27 is a plan view of another VSFF network system in a disconnected configuration.

Referring to FIG. 27, another exemplary embodiment of a fiber optic network system is generally indicated at reference number 2700. The fiber optic network system 2700 is similar to the network system 2500 except that the single-connector transceivers 380 are replaced with two-connector transceivers 380'. Hence, like the network system 2500, the network system 2700 comprises a first transceiver 38 for mating with the four VSFF MT connectors 18 on the first end portions of the cables 5801. Two of the four connectors 180 on the opposite end of the patch cable assemblies 580 are plugged into each two-connector transceiver 380'.

Figure 28:
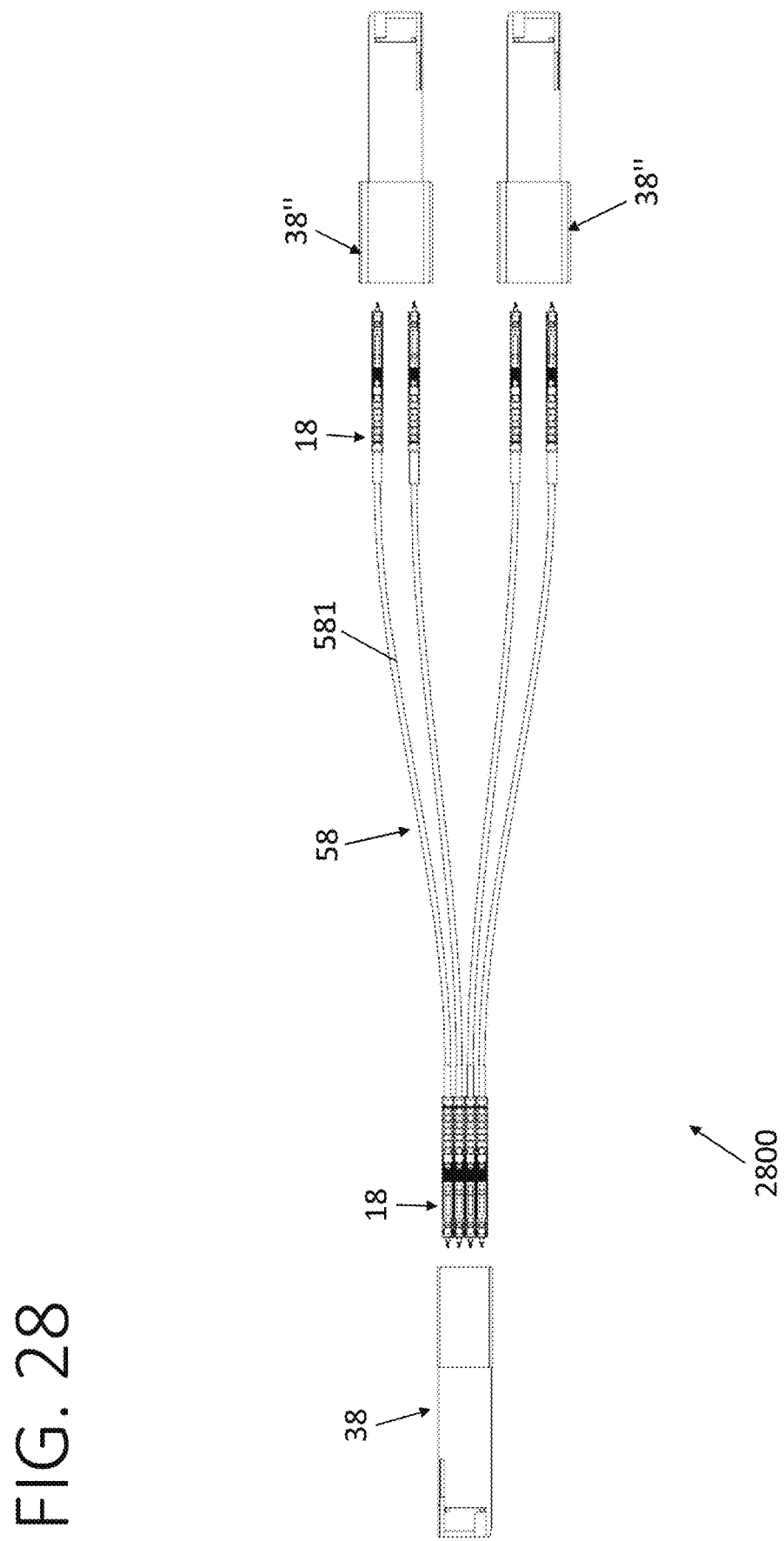
FIG. 28 is a plan view of another VSFF network system in a disconnected configuration.

Referring to FIG. 28, another exemplary embodiment of a fiber optic network system is generally indicated at reference number 2800. The fiber optic network system 2800 is similar to the network system 2600 except that the single connector transceivers 38' are replaced with two-connector transceivers 38". Hence, like the network system 2600, the network system 2800 comprises a first transceiver 38 for mating with the four VSFF MT connectors 18 on the first end portions of the cables 581. Two of the four connectors 18 on the opposite end of the patch cable assemblies 58' are plugged into each two-connector transceiver 38".

Figure 29:
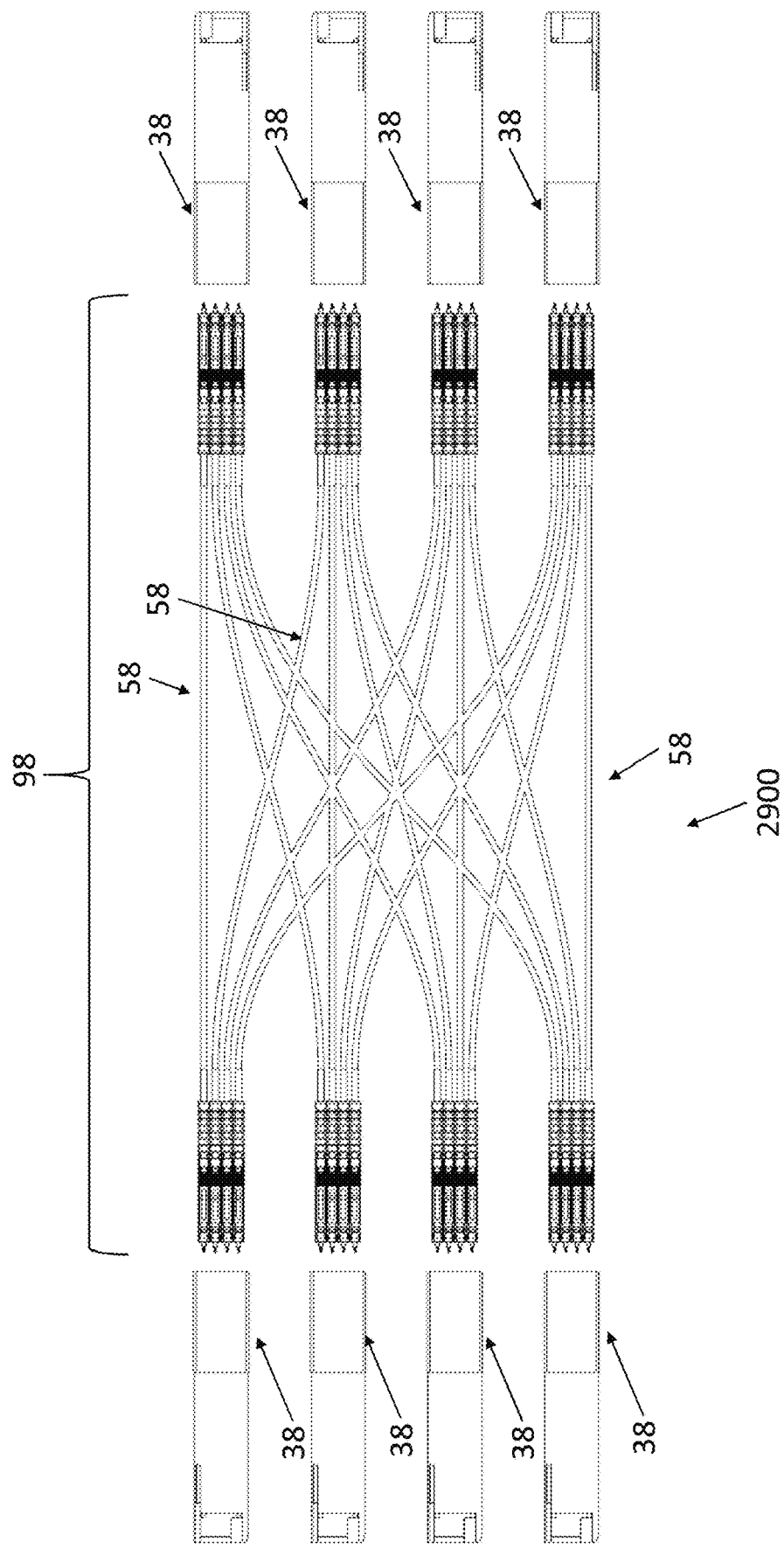
FIG. 29 is a plan view of another VSFF network system in a disconnected configuration.

Referring to FIG. 29, another exemplary embodiment of VSFF fiber optic network system is generally indicated at reference number 2900. The fiber optic network system 2900 is a 4×4 transceiver cross-connect network between eight 32-fiber pluggable transceivers 38. The network system 2900 comprises cross-connect cabling 98 including sixteen patch cable assemblies 58 arranged to cross-connect a first set of four transceivers 38 (e.g., the right set of transceivers) to a second set of four transceivers (e.g., the left set of four transceivers). The four patch cable assemblies 58 mated to each transceiver 38 in the first set of transceivers are mated to four different transceivers in the second set, and vice versa. Hence, the fiber optic network system 2900 forms a 4×4 cross-connect network for a very large number of fibers in a small rack footprint.

Figure 30:
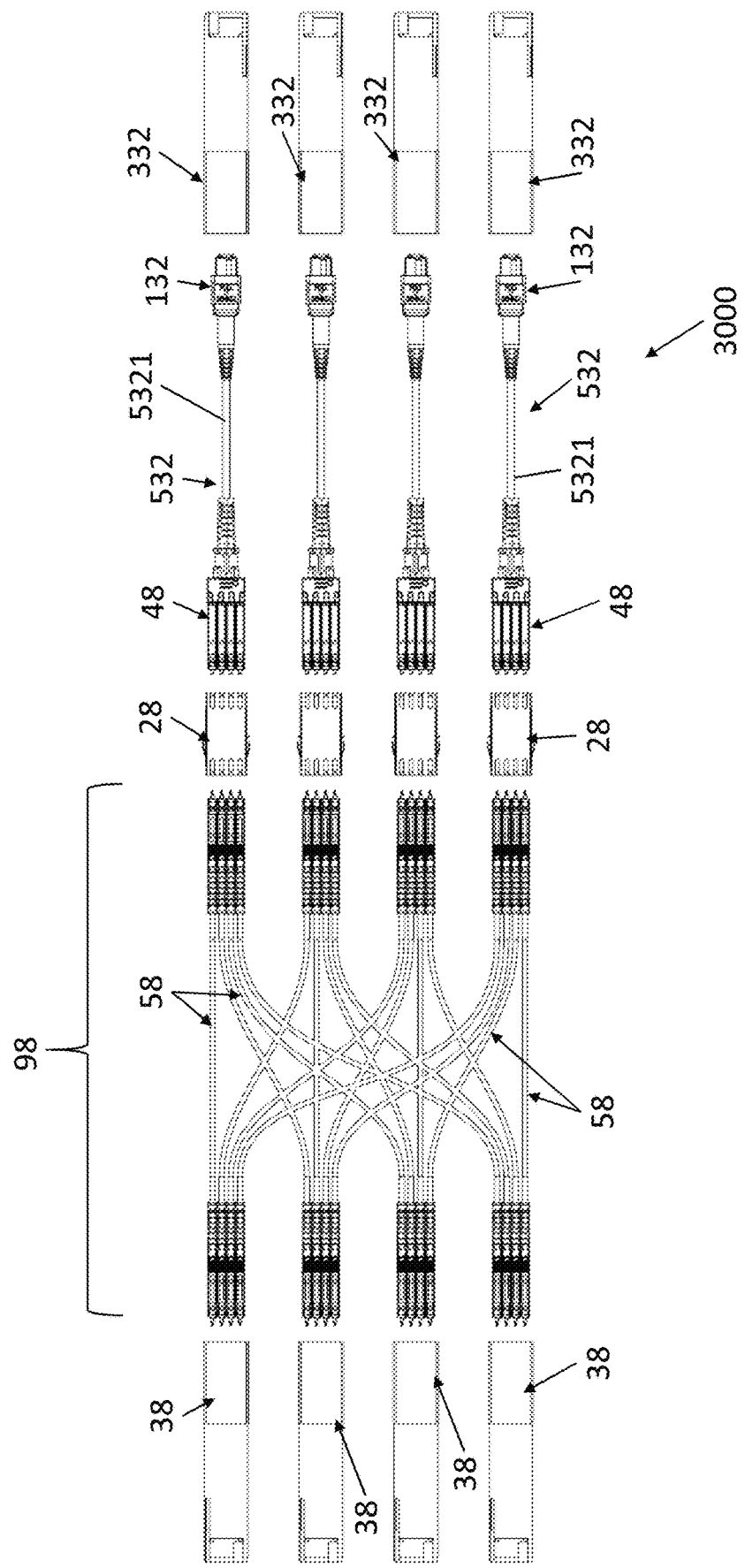
FIG. 30 is a plan view of another VSFF network system in a disconnected configuration.

Referring to FIG. 30, another exemplary embodiment of a VSFF fiber optic network system is generally indicated at reference number 3000. Like the network system 2900, the network system 3000 is configured to cross-connect a first set of 32-fiber pluggable transceivers 38 to a second set of 32-fiber pluggable transceivers 332, but in the illustrated embodiment, the transceivers in the second set have a different optical interface than the transceivers in the first set. For example, in one embodiment, each transceiver 332 is configured to mate with a 32-fiber MPO connector 132, although the second set of transceivers could also be configured for mating with 32-fiber VSFF uniboot MT connectors 38 in other embodiments. In the illustrated example, between the first set of transceivers 38 and the second set of transceivers 332 is cross-connect cabling 98, a set of four VSFF MT adapters 28, and a set of 32-fiber patch cable assemblies 532. Each patch cable assembly 532 comprises a cable 5321 with a first end portion terminated by the 32-fiber connector 132 and a second end portion terminated by a VSFF MT uniboot connector 48. As explained above, each connector 132 is plugged into a respective transceiver 332. Each uniboot connector 48 is plugged into the first end portion of one of the VSFF MT adapters 28. The cross-connect cabling 98 a makes cross-connection between the four transceivers 38 and the four adapters 28. The four patch cable assemblies 58 mated to each transceiver 38 are mated to four different adapters 28. Hence, the cross-connect cabling 98 and the patch cable assemblies 532 connect each of the four transceivers 38 to the transceivers 332.

Figure 31:
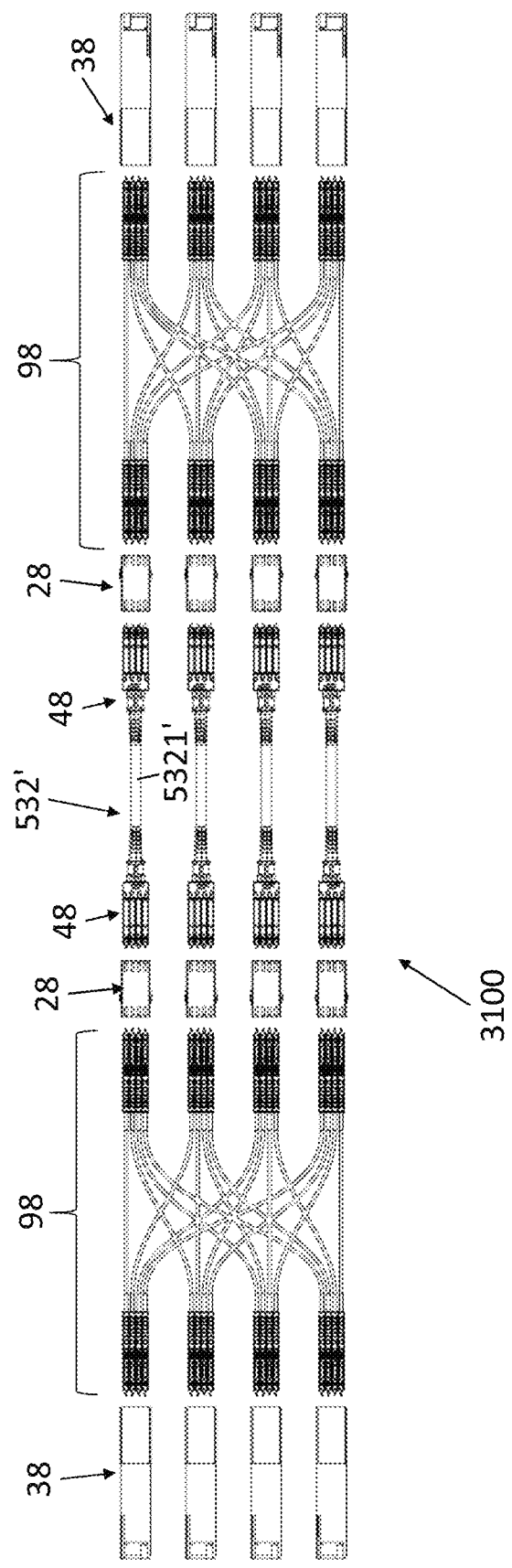
FIG. 31 is a plan view of another VSFF network system in a disconnected configuration.

Referring to FIG. 31, another exemplary embodiment of a VSFF fiber optic network system is generally indicated at reference number 3100. The network system 3100 connects a first set of four VSFF MT transceivers 38 (e.g., the right set of transceivers) to a second set of four transceivers (e.g., the left set of transceivers). The first set of four transceivers 38 is cross-connected to a first set of four VSFF MT adapters 28 by first cross-connect cabling 98 (e.g., on the right half of the drawing). A set of four 32-fiber patch cable assemblies 532' connects the first set of adapters 28 to a second set of VSFF MT adapters 28. In the illustrated embodiment, each patch cable assembly 532' comprises a 32-fiber cable 5321' terminated at opposite ends by a pair of VSFF MT uniboot connectors 48. The second set of four VSFF MT adapters 28 is cross-connected to the second set of transceivers 38 by second cross-connect cabling 98 (e.g., on the left half of the drawing).

Figure 32:
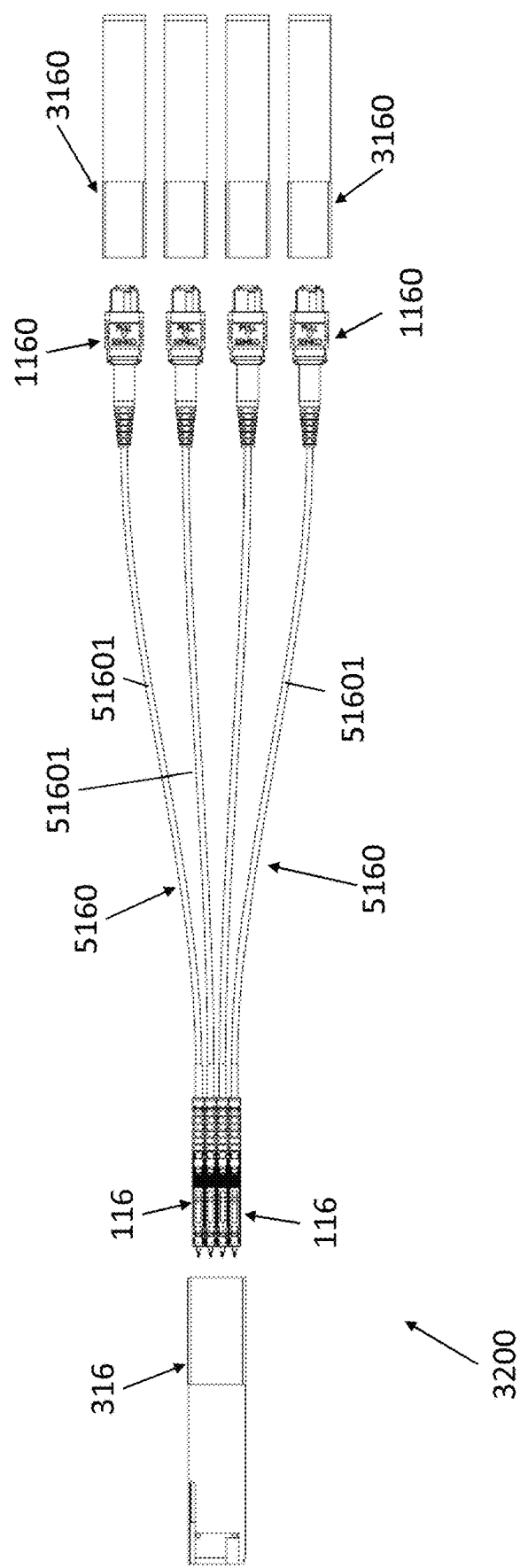
FIG. 32 is a plan view of another VSFF network system in a disconnected configuration.

Referring to FIG. 32, another exemplary embodiment of a fiber optic network system is generally indicated at reference number 3200. The fiber optic network system 3200 is similar to fiber optic network system 2500 of FIG. 25, except that, instead of using eight-fiber MT components to connect a 32-fiber pluggable transceiver 38 to four separate eight-fiber pluggable transceiver modules 380, the network system 3200 uses sixteen-fiber MT components to connect a 64-fiber pluggable transceiver 316 to four separate pluggable transceiver modules 3160. The fiber optic network system 3200 comprises four patch cable assemblies 5160. Each patch cable assembly 5160 comprises a 16-fiber cable 51601 having a first end portion and a second end portion. The first end portion is terminated by a 16-fiber VSFF MT connector 116, and the second end portion is terminated by a 16-fiber MPO connector 1160. As can be seen, the four VSFF MT connectors 116 are plugged into the 64-fiber transceiver 316, and the four MPO connectors 1160 are plugged into four sixteen-fiber transceivers 3160 (e.g., QSFP MPO transceivers).

Figure 33:
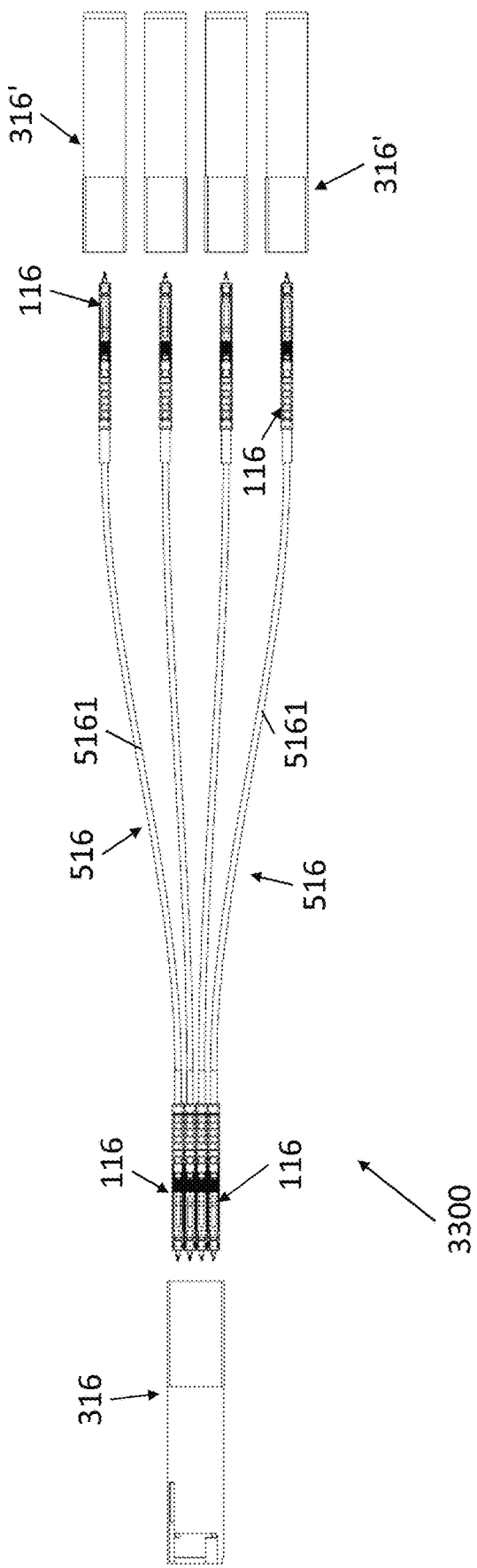
FIG. 33 is a plan view of another VSFF network system in a disconnected configuration.

Referring to FIG. 33, another exemplary embodiment of a fiber optic network system is generally indicated at reference number 3300. The fiber optic network system 3300 is similar to the network system 3200 except that the patch cable assemblies 5160 are replaced by patch cable assemblies 516. Each patch cable assembly 516 comprises a 16-fiber cable 5161 having a first end portion terminated by a VSFF MT connector 116 and an opposite second end portion terminated by a VSFF MT connector of the same type. Like the network system 3200, the network system 3300 comprises a transceiver 316 for mating with the four 16-fiber VSFF MT connectors 116 on the first end portions of the cables 5161 and four single-connector transceivers 316' for mating with individual ones of the connectors at the second end of the patch cable assemblies 516.

Figure 34:
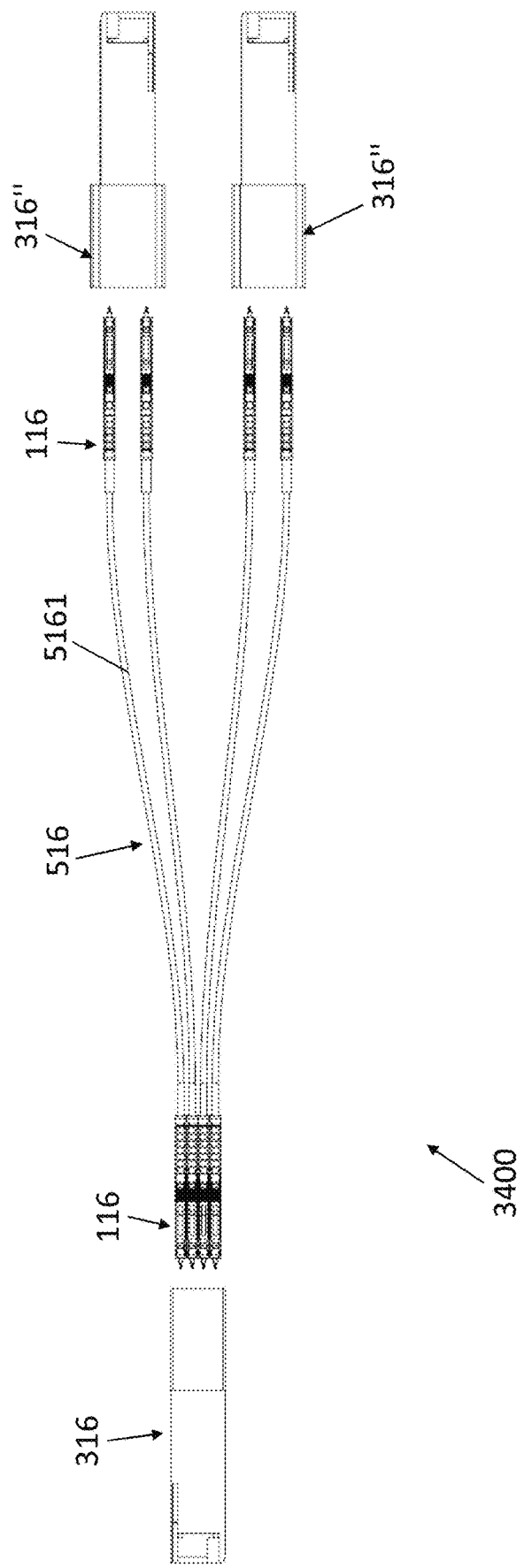
FIG. 34 is a plan view of another VSFF network system in a disconnected configuration.

Referring to FIG. 34, another exemplary embodiment of a fiber optic network system is generally indicated at reference number 3400. The fiber optic network system 3400 is similar to the network system 3300 except that the single connector transceivers 316' are replaced with two-connector transceivers 316". Like the network system 3300, the network system 3400 comprises a first transceiver 316 for mating with the four VSFF MT connectors 116 on the first end portions of the cables 5161. Two of the four connectors 116 on the opposite end of the patch cable assemblies 516 are plugged into each two-connector transceiver 316".

Figure 35:
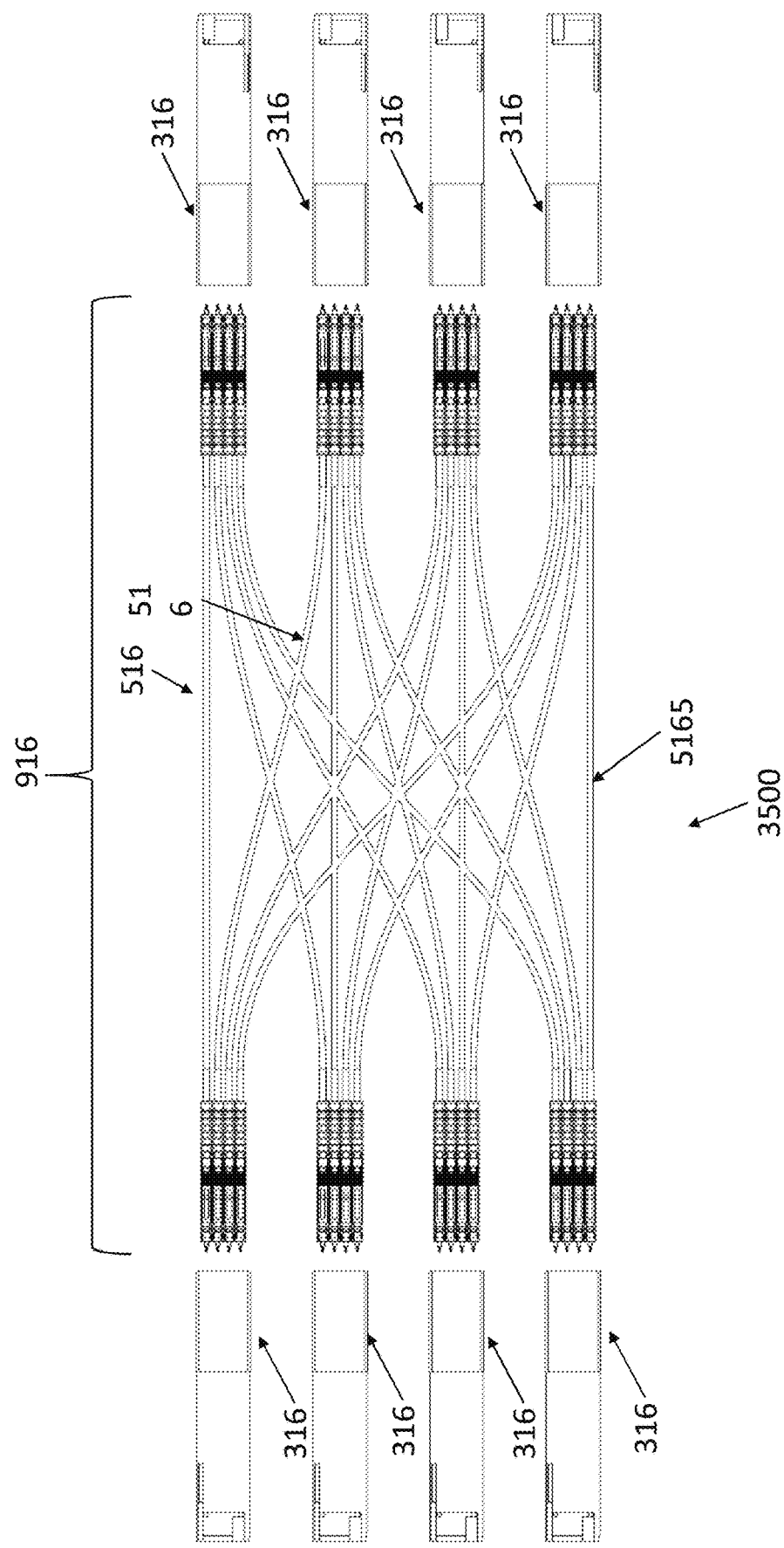
FIG. 35 is a plan view of another VSFF network system in a disconnected configuration.

Referring to FIG. 35, another exemplary embodiment of VSFF fiber optic network system is generally indicated at reference number 3500. The fiber optic network system 3500 is a 4×4 transceiver cross-connect network between eight 64-fiber pluggable transceivers 316. The network system 3500 comprises cross-connect cabling 916 including sixteen patch cable assemblies 516 arranged to cross-connect a first set of four transceivers 316 (e.g., the right set of transceivers) to a second set of four transceivers 316 (e.g., the left set of four transceivers). The four patch cable assemblies 516 connected to each transceiver 316 in the first set of transceivers are mated to four different transceivers in the second set, and vice versa. Hence, the fiber optic network system 3500 forms a 4×4 cross-connect network for a very large number of fibers in a small footprint.

Figure 36:
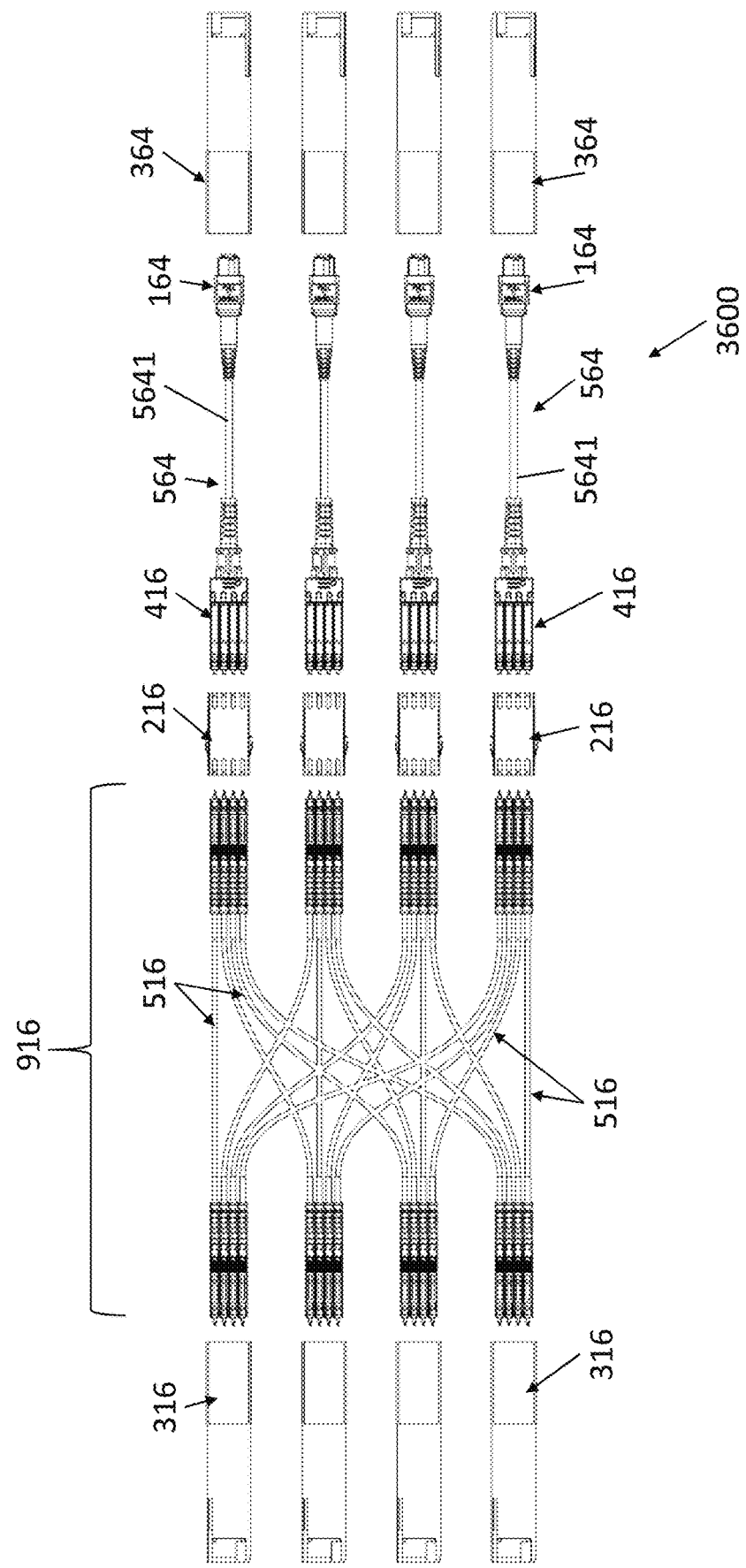
FIG. 36 is a plan view of another VSFF network system in a disconnected configuration.

Referring to FIG. 36, another exemplary embodiment of a VSFF fiber optic network system is generally indicated at reference number 3600. Like the network system 3500, the network system 3600 is configured to cross-connect a first set of 64-fiber pluggable transceivers 316 to a second set of 64-fiber pluggable transceivers 364, but in the illustrated embodiment, the transceivers in the second set have a different optical interface than the transceivers in the first set. For example, in one embodiment, each transceiver 364 is configured to mate with a 64-fiber MPO connector 164 (although the second set of transceivers could also be configured for mating with 64-fiber VSFF uniboot MT connectors 416 in other embodiments). In the illustrated example, between the first set of transceivers 316 and the second set of transceivers 364 is cross-connect cabling 916, a set of four VSFF MT adapters 216, and a set of four 64-fiber patch cable assembly assemblies 564. Each patch cable assembly 564 comprises a 64-fiber cable 5641 with a first end portion terminated by the 64-fiber connector 164 and a second end portion terminated by a VSFF MT uniboot connector 416. As explained above, each connector 164 is plugged into a respective transceiver 364. Each uniboot connector 416 is plugged into the first end portion of one of the VSFF MT adapters 216. The cross-connect cabling 916 makes a cross-connection between the four transceivers 316 and the four adapters 216. Each of the four patch cable assembly assemblies 564 mated to a transceiver 364 is mated to a different adapter 216.

Figure 37:
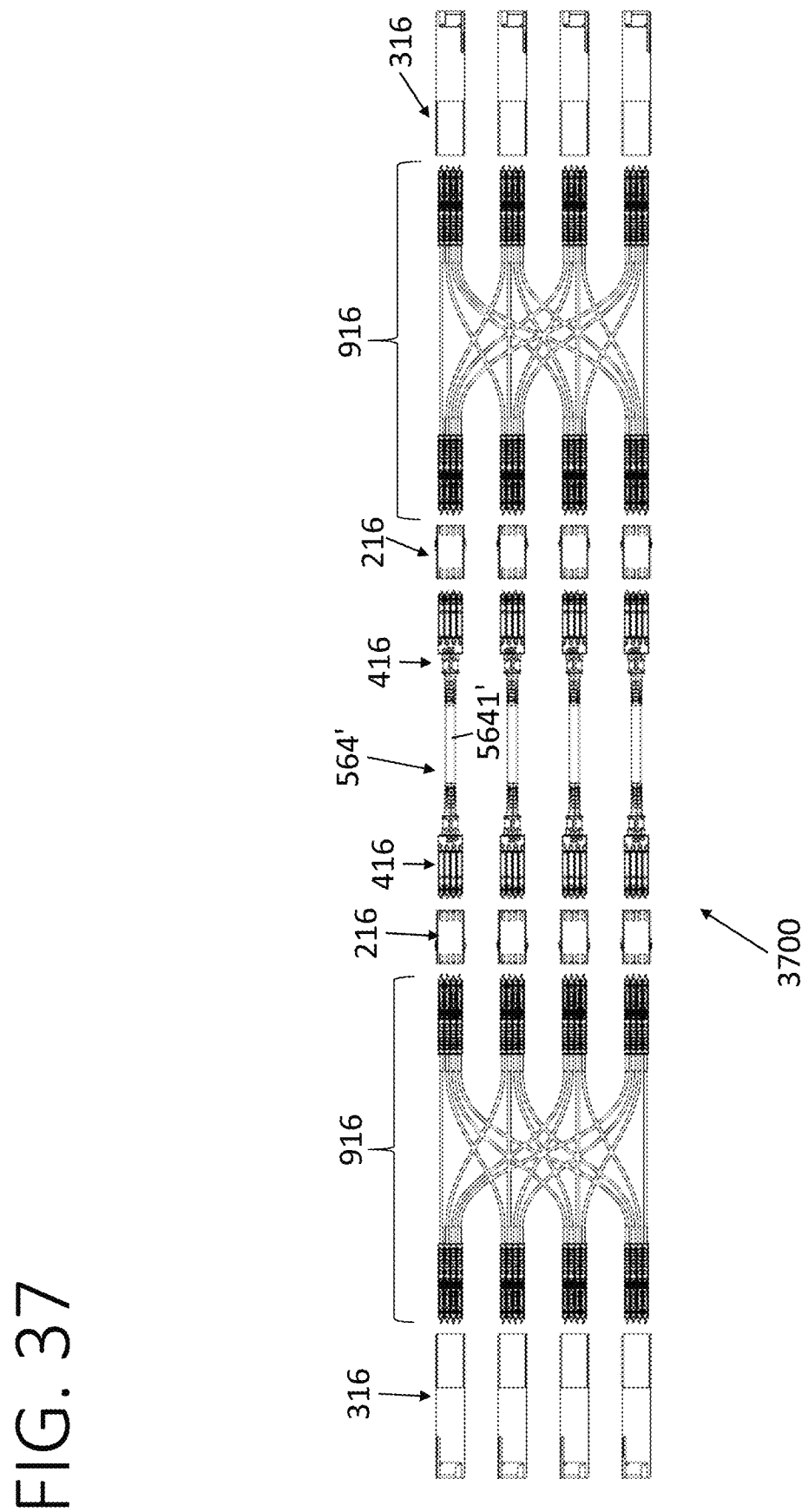
FIG. 37 is a plan view of another VSFF network system in a disconnected configuration.

Referring to FIG. 37, another exemplary embodiment of a VSFF fiber optic network system is generally indicated at reference number 3700. The network system 3700 connects a first set of four VSFF MT transceivers 316 (the right set of transceivers) to a second set of four transceivers 316. The first set of four transceivers 316 is cross-connected to a first set of four VSFF MT adapters 216 by first cross-connect cabling 916 (on the right half of the drawing). A set of four 64-fiber patch cable assemblies 564' connects the first set of adapters 216 to a second set of VSFF MT adapters. In the illustrated embodiment, each patch cable assembly 564' comprises a 64-fiber cable 5641' terminated by a pair of VSFF MT uniboot connectors 416. The second set of four VSFF MT adapters 216 is cross-connected to the second set of transceivers 316 by second cross-connect cabling 916 (on the left half of the drawing).

Figure 38:
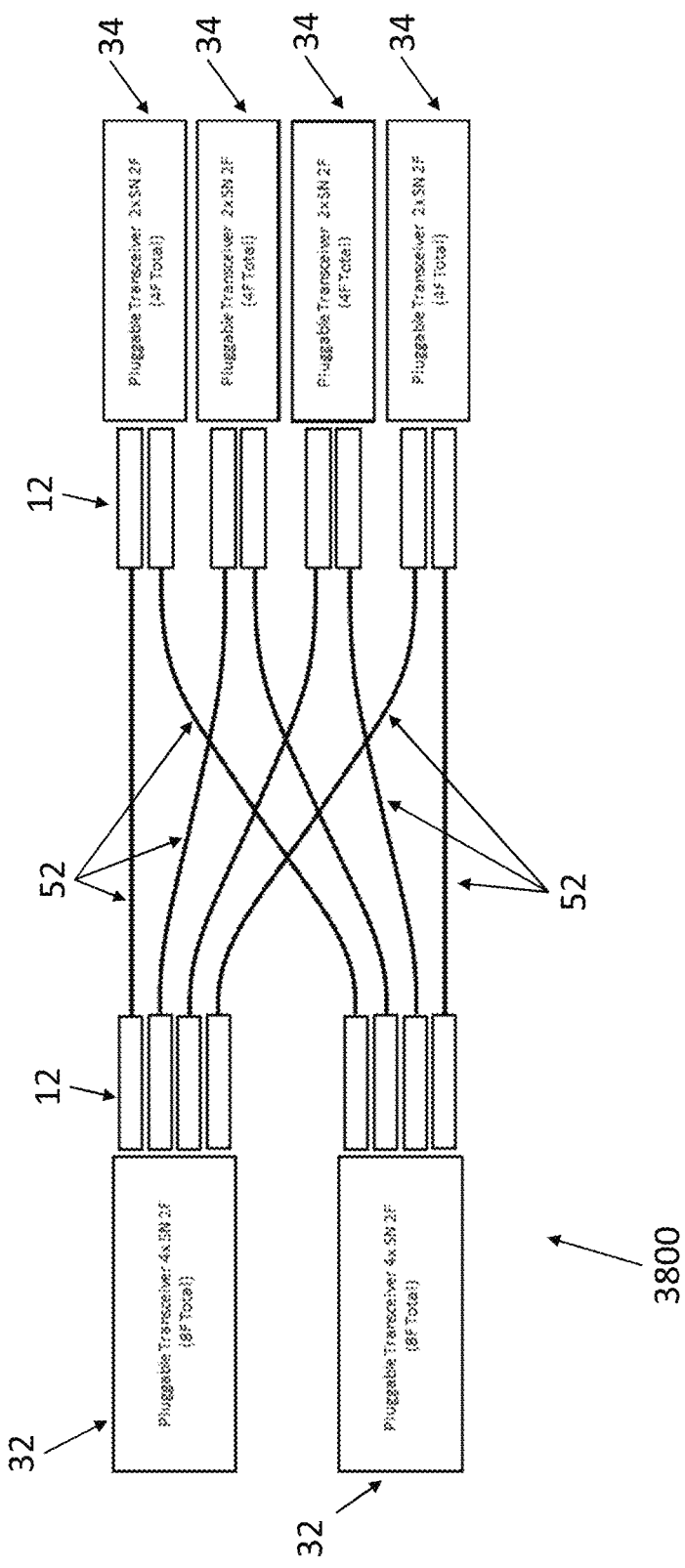
FIG. 38 is a schematic of another VSFF network system.

Referring to FIG. 38, another exemplary embodiment of a VSFF fiber optic network system is generally indicated at reference number 3800. The network system 3800 is configured to connect two eight-fiber VSFF duplex transceivers 32 to four four-fiber VSFF duplex transceivers 34. The network system 3800 comprises eight patch cable assemblies 52. The first VSFF duplex connector 12 of each patch cable assembly 52 is plugged into one of the transceivers 32, and the second duplex connector 12 of each patch cable assembly 52 is plugged into one of the four-fiber transceivers 34. As shown, each four-fiber transceiver 34 mates with two VSFF duplex connectors 12 (and optionally has an optical interface that fits in an SFP footprint). The four patch cable assemblies 52 connected to each transceiver 32 are mated to four different transceivers 34.

Figure 39:
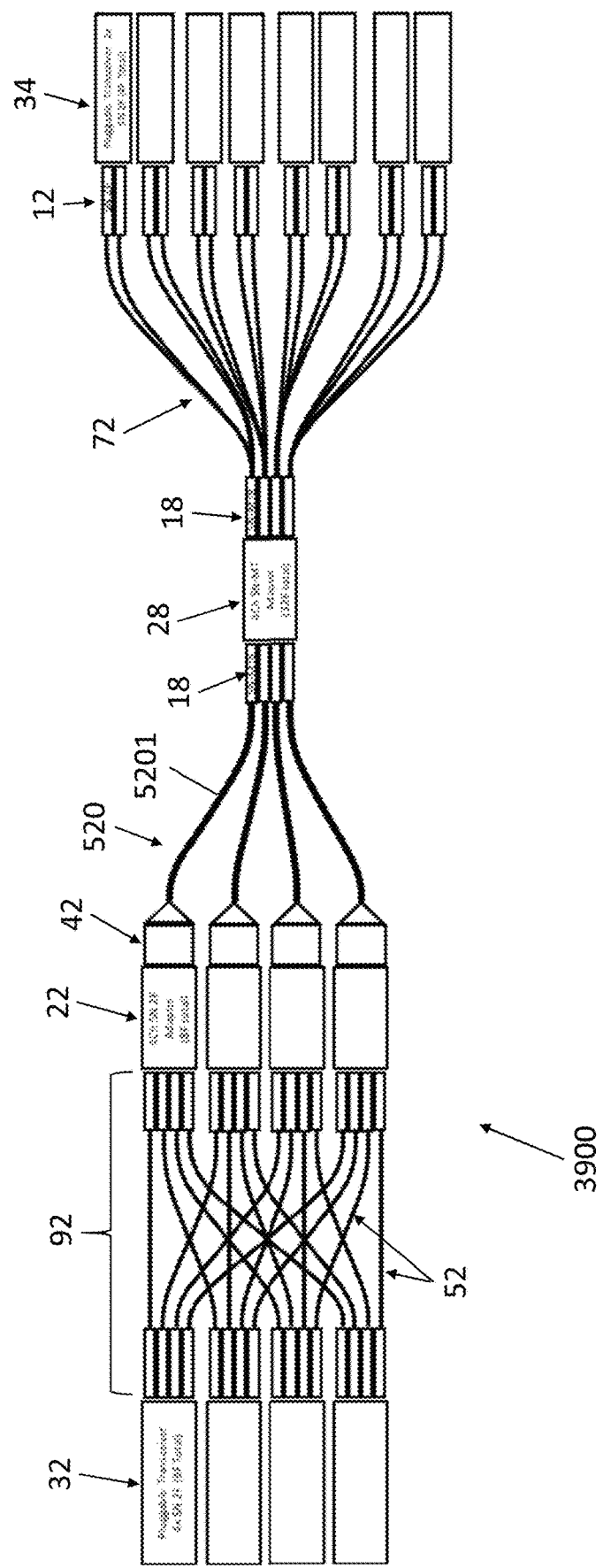
FIG. 39 is a schematic of another VSFF network system.

Referring to FIG. 39, another exemplary embodiment of a VSFF fiber optic network system is generally indicated at reference number 3900. The network system 3900 connects a first set of eight four-fiber transceivers 34 and a second set of four eight-fiber transceivers 32. Both the first set of transceivers 34 and the second set of transceivers 32 are configured to mate with VSFF duplex connectors. Between the first and second sets of transceivers 34, 32 is a VSFF MT adapter 28. The first end portion of the VSFF MT adapter is mated with the VSFF MT connector 18 of four breakout connector units 72. The 16 VSFF duplex connectors 12 of the four breakout units 72 are mated with the eight transceivers 34. Four eight-fiber patch cable assembly assemblies 520 are mated with the second end portion of the adapter 28. Each patch cable assembly 520 comprises an eight-fiber cable 5201 having a first end portion terminated by a VSFF MT connector 18 and a second end portion terminated by a VSFF duplex uniboot connector 42. The VSFF MT connector 18 of each patch cable assembly 52 is mated with the second end portion of the adapter 28, and each VSFF duplex uniboot connector 42 is mated with the first end portion of a respective VSFF duplex adapter 22. The VSFF duplex adapters 22 are connected to the transceivers 32 by cross-connect cabling 92. The cross connect cabling 92 is similar to the cross-connect cabling 98 except that the eight fiber patch cable assemblies 58 of cross-connect cabling 98 are replaced by two-fiber patch cable assemblies 52 in cross-connect cabling 92.

Figure 40:
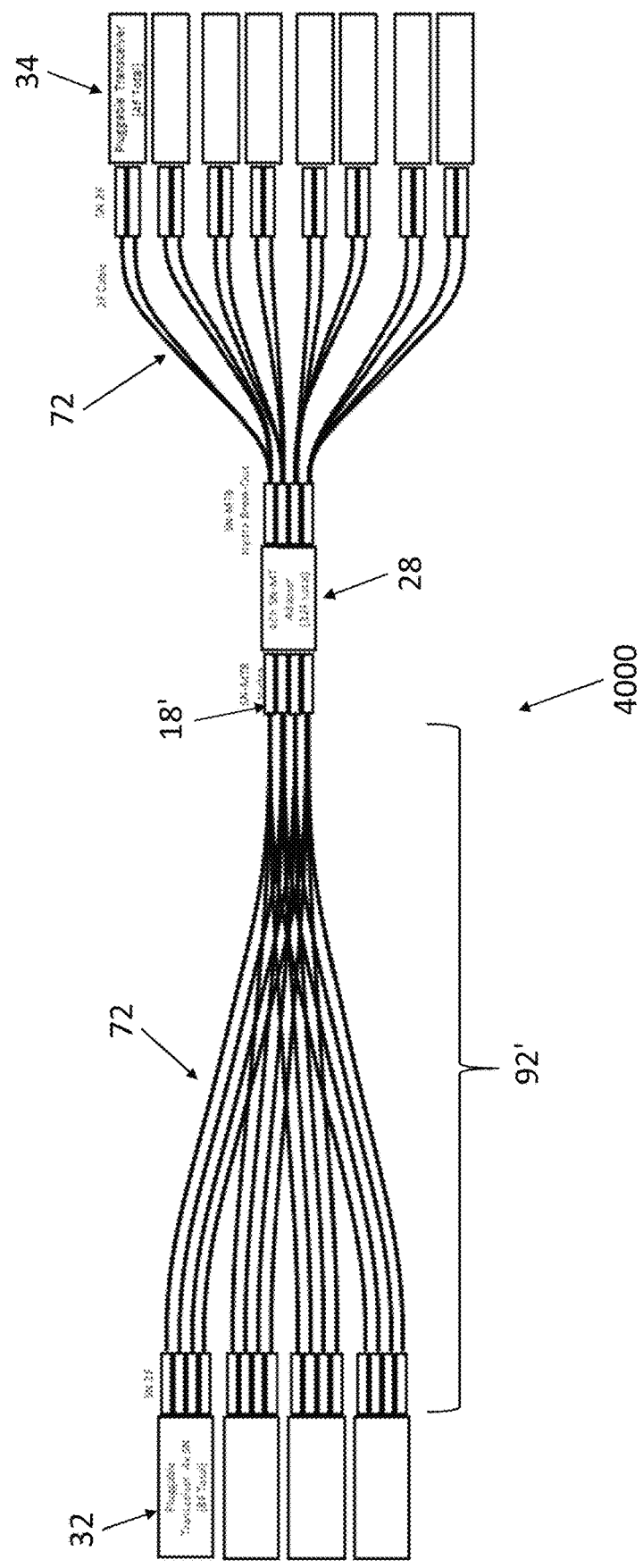
FIG. 40 is a schematic of another VSFF network system.

Referring to FIG. 40, another exemplary embodiment of VSFF fiber optic network system is generally indicated at reference number 4000. The network system 4000 is similar to the network system 3900 in that it connects eight four-fiber transceivers 34 to four eight-fiber transceivers 32. Just as in the network system 3900, in the network system 4000, four breakout connector units 72 are used to connect the eight transceivers 34 to the first end portion of an adapter 28. But unlike the network system 3900, four breakout connector units 72 are also used to connect the second end portion of the adapter 28 to the four transceivers 32. In the illustrated embodiment the four breakout units 72 on the left side of the drawing are configured to form cross-connect cabling 92'. In the cross-connect cabling 92', the four individual cables extending from each breakout connector 18' are routed to four different transceivers 32.

Figure 41:
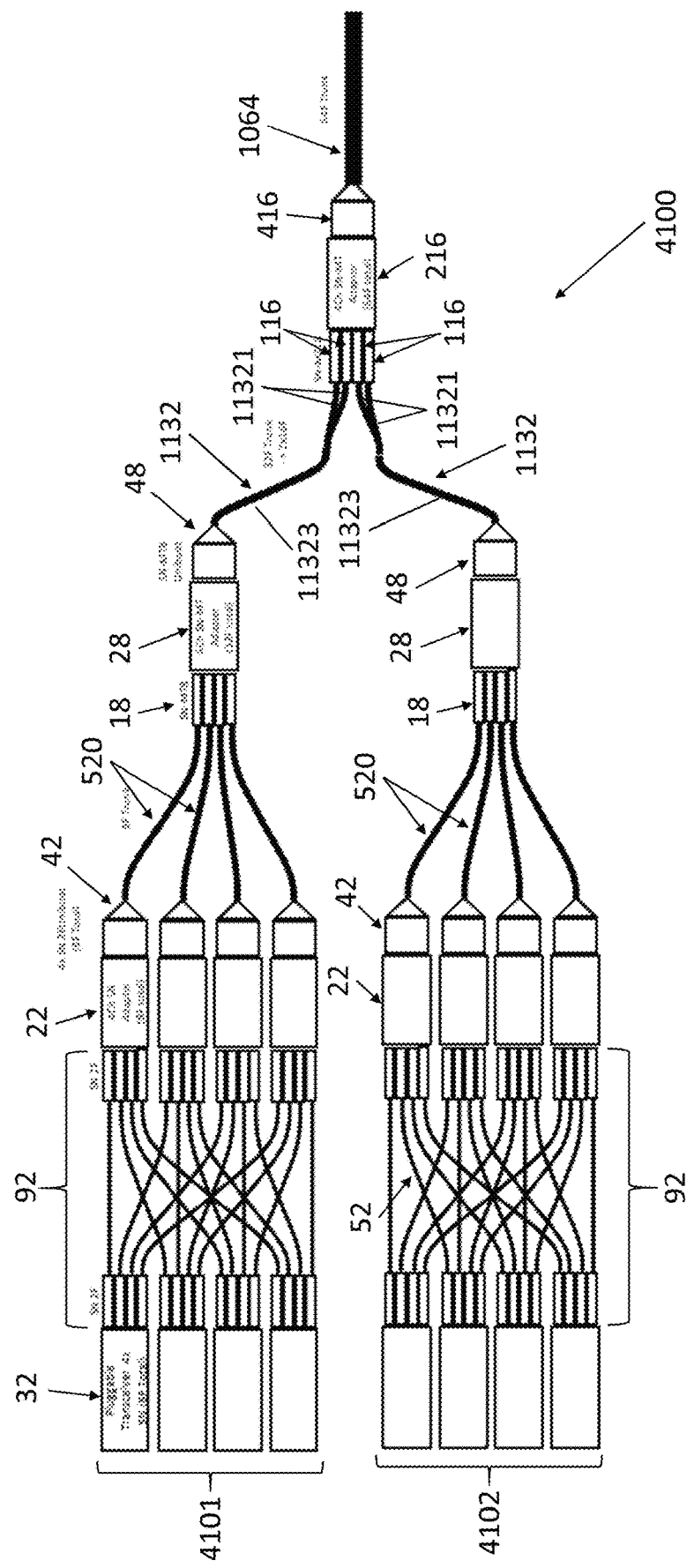
FIG. 41 is a schematic of another VSFF network system.

Referring to FIG. 41, another exemplary embodiment of a VSFF fiber optic network system is generally indicated at reference number 4100. The network system 4100 is generally configured to connect a 64-fiber trunk cable 1064 to a plurality of peripheral subnetworks 4101, 4102. The trunk cable 1064 is terminated by a 64-fiber VSFF uniboot MT connector 416 (broadly, a trunk VSFF uniboot connector) that is mated to the first end portion of a VSFF MT adapter 216 (broadly, a trunk VSFF adapter). The second end portion of the VSFF MT adapter is mated with two 32-fiber branch cable assemblies 1132. Each branch cable assembly comprises at least one first VSFF MT connector (broadly, a first subnetwork VSFF connector) configured to hold two MT ferrules collectively terminating 32 fibers. In the illustrated embodiment two separate 16-fiber MT connectors 116 are used for this purpose; but other embodiments can use a 32-fiber, two-ferrule VSFF MT uniboot connector (not shown) for the same purpose. The two connectors 116 terminate respective 16-fiber cable segments 11321 that are connected to a single 32 fiber cable segment 11323 (e.g., by a fan-out box, not shown). The first branch connectors 116 are mated with two receptacles of the second end portion of the VSFF MT adapter 216. The third cable segment 11323 is terminated by a 32-fiber VSFF MT uniboot connector 48 (broadly, a branch VSFF uniboot connector) plugged into the first end portion of a respective branch VSFF MT adapter 28 (broadly, a branch VSFF adapter).

Each subnetwork 4101, 4102 is connected to the trunk cable 1064 through the second end portion of a respective branch VSFF MT adapter 28. Each subnetwork broadly comprises peripheral cabling including a plurality of peripheral cables terminated by peripheral VSFF connectors. In the illustrated embodiment, the peripheral cabling includes patch cable assemblies 520 and cross-connection cabling 92. The VSFF MT connectors 18 of four sub-branch patch cable assemblies 520 are mated with the second end portion of each branch adapter 28. The VSFF duplex uniboot connector 42 of each patch cable assembly 520 is plugged into the first end portion of an adapter 22 of the respective subnetwork 4101, 4102. Cross-connect cabling 92 is used to make a cross-connection between the second end portion of each of the four adapters 22 and the four peripheral transceivers 32 of the respective subnetwork 4101, 4102. Accordingly, it can be seen that the network 4100 enables a trunk cable 1064 having at least 64 fibers to connect to a plurality fiber optic sub-networks 4101, 4102.

Each fiber optic network subsystem 4101, 4102 utilizes fiber optic breakout cabling (e.g., patch cable assemblies 520 and cross-connect cabling 92) and a VSFF adapter 28 to connect the 32-fiber cable 1132 to a plurality of peripheral transceivers 32 without any prefabricated shuffle component or mid span breakout component along any of the plurality of fiber optic cables. It will be appreciated that other types of breakout cabling employing the same general principles can be used to connect various multifiber cables (terminated by uniboot connectors) to peripheral transceivers. In certain exemplary embodiments of breakout cabling systems in the scope of this disclosure, the uniboot connector of the multifiber cable (e.g., connector 48) is mated with the first end portion of a VSFF adapter (e.g., adapter 216). The breakout cabling suitably will include a plurality of first connectors (e.g., VSFF MT connectors 18) mated with the second end portion the same adapter (e.g., adapter 28) and a plurality of peripheral connectors plugged into the peripheral transceivers 32.

Note that the network system 4100 broadly functions as a trunk-to-transceiver cabling assembly for connecting a trunk cable 1064 to at least 32 transceiver ports (e.g., each of the four ports/receptacles of the eight peripheral transceivers 32) and consists of only the trunk uniboot connector 416, one or more VSFF adapters 22, 28, 216, one or more branch cable assemblies 1132, and peripheral cable assemblies 520, 52 consisting of fiber optic cables and VSFF connectors.

Figure 42:
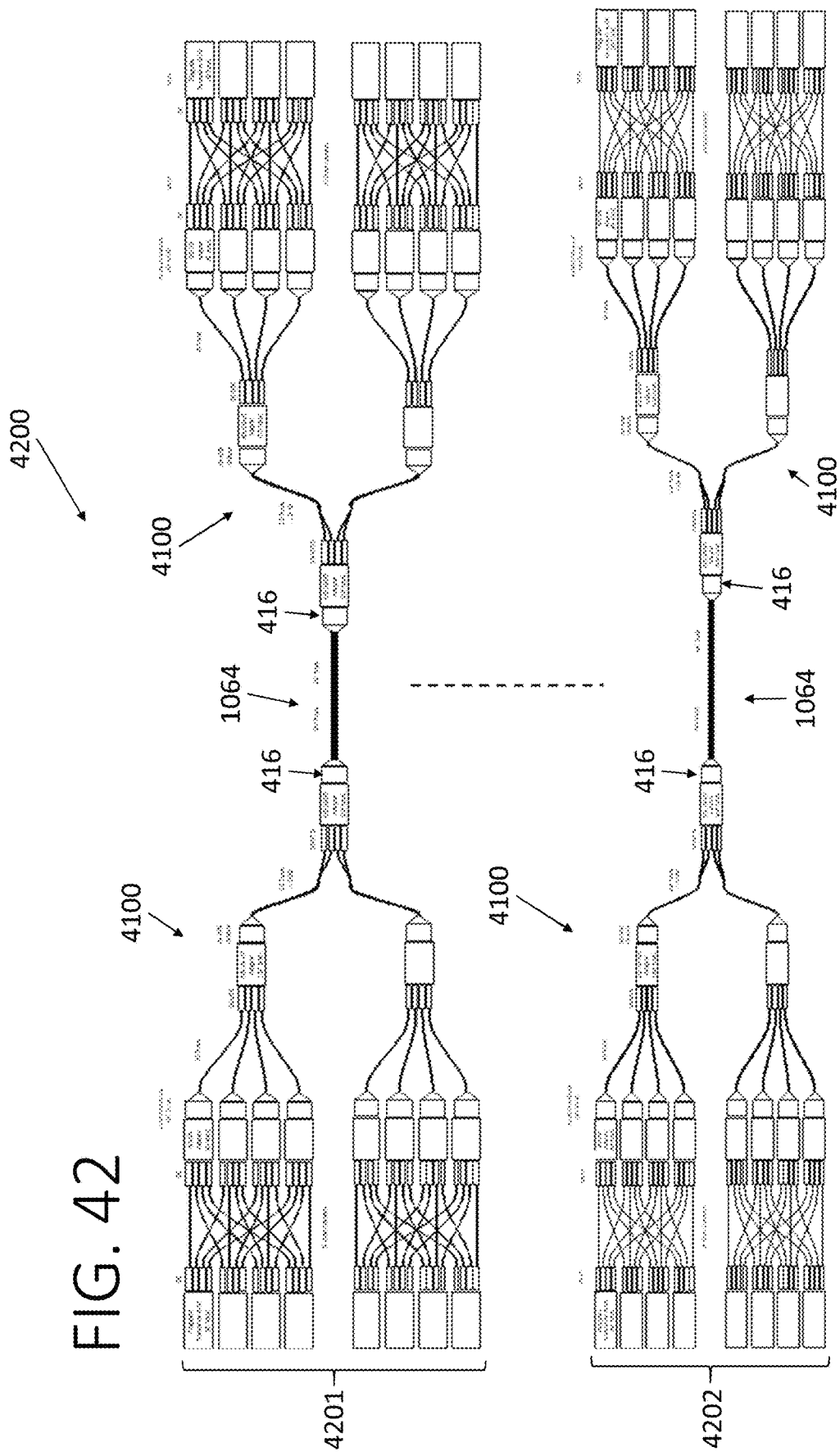
FIG. 42 is a schematic of another VSFF network system.
Figure 43:
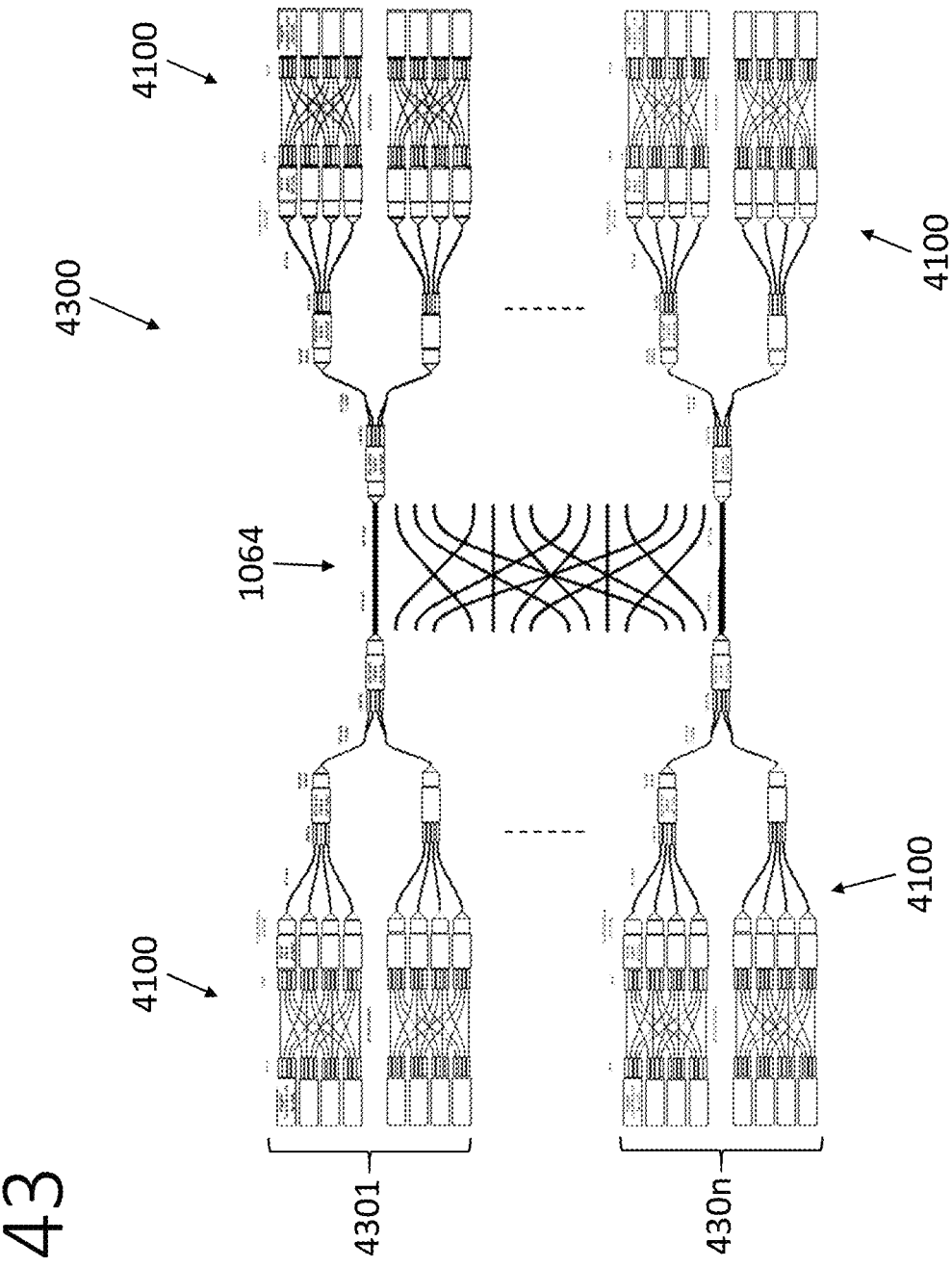
FIG. 43 is a schematic of another VSFF network system.

Referring to FIG. 42, another exemplary embodiment of a VSFF fiber optic network system is generally indicated at reference number 4200. The network system 4200 shows how the network system 4100 can be combined with other network systems by a 64-fiber trunk cable 1064 for enhanced connectivity. Each end of each 64-fiber trunk cable 1064 is terminated by a uniboot connector 416 that connects the trunk cable to a respective network system 4100. Thus, in the illustrated embodiment, each trunk cable 1064 is used to connect two 64-fiber network systems 4100 together, making a respective combined network system 4201, 4202. The network system 4200 comprises two 64-fiber combined network systems 4201, 4202. But as shown in FIG. 43, a VSFF fiber optic network system 4300 can include any desired number n of combined 64-fiber network systems 4301-430n, and the networks can be combined or cross-combined in any suitable way for a given application.

Figure 44:
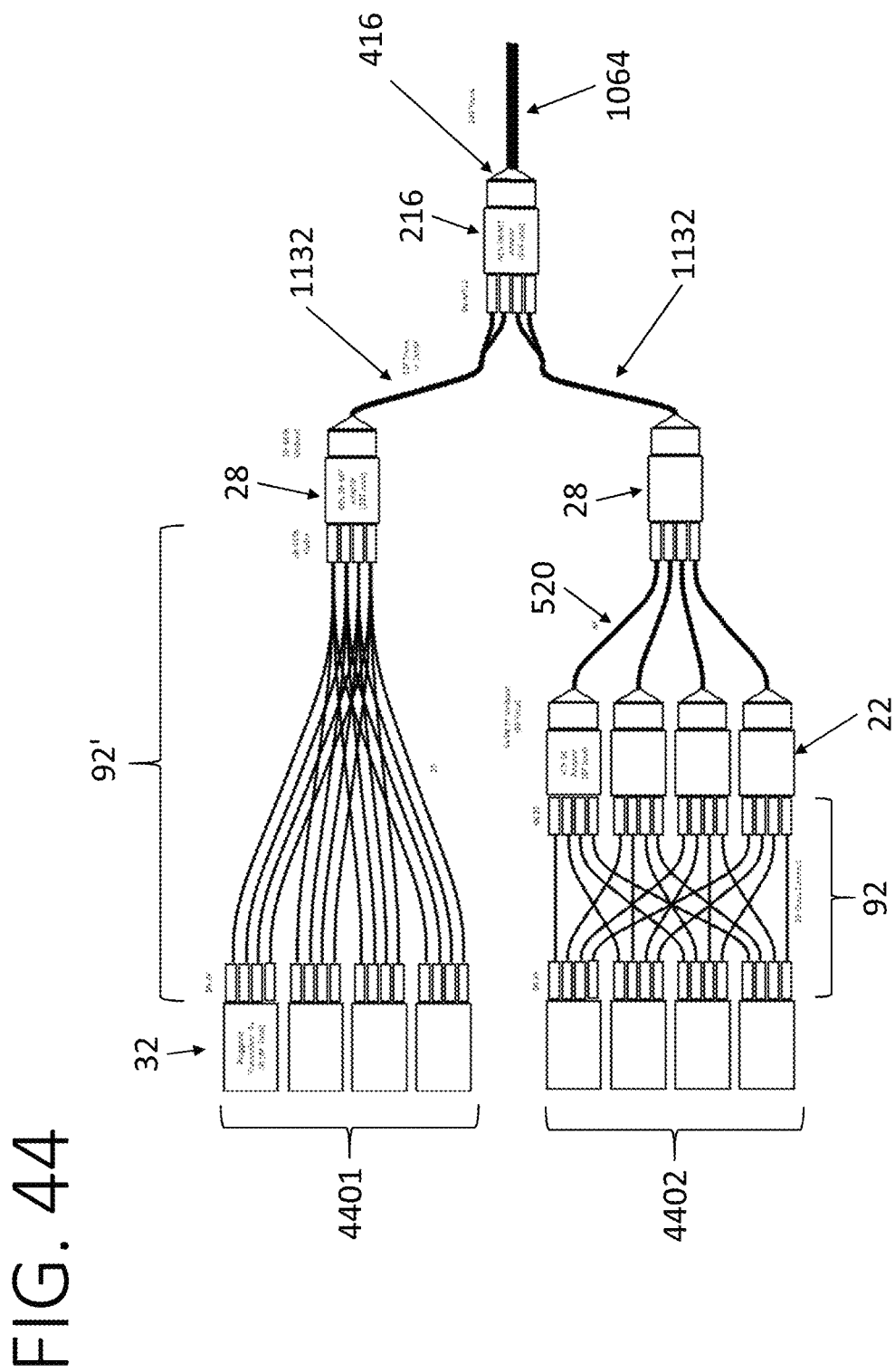
FIG. 44 is a schematic of another VSFF network system.

Referring to FIG. 44, another exemplary embodiment of a VSFF fiber optic network system is generally indicated at reference number 4400. Like the network system 4100, the network system 4400 is configured to connect a 64-fiber trunk cable 1064 to a plurality of peripheral subnetworks 4401, 4402. Like network system 4100, network system 4400 comprises two 32-fiber branch cable assemblies 1132 that each connect to (i) the trunk adapter 216 and (ii) a respective branch adapter 28. In the network system 4400, one branch adapter 28 connects to the same type of cross-connect subnetwork 4402 that is used in the network system 4100. The other branch connector 28 connects to different type of cross-connect subnetwork 4401. In particular, a breakout connector unit cross-connect network 92' of the type depicted in FIG. 40 is used to cross-connect the branch adapter 28 of subnetwork 4401 to four peripheral transceivers 32.

Note that fiber optic network subsystem 4402 utilizes only fiber optic breakout cabling 92' and a VSFF adapter 28 to connect the 32-fiber cable 1132 to a plurality of peripheral transceivers 32. Note also that the network system 4400 broadly functions as a trunk-to-transceiver cabling assembly for connecting a trunk cable 1064 to at least 32 transceiver ports (e.g., each of the four ports/receptacles of the eight peripheral transceivers 32) and consists of only the trunk uniboot connector 416, one or more VSFF adapters 22, 28, 216, one or more branch cable assemblies 1132, and peripheral cabling 92, 92' consisting of fiber optic cables an VSFF connectors.

Figure 45:
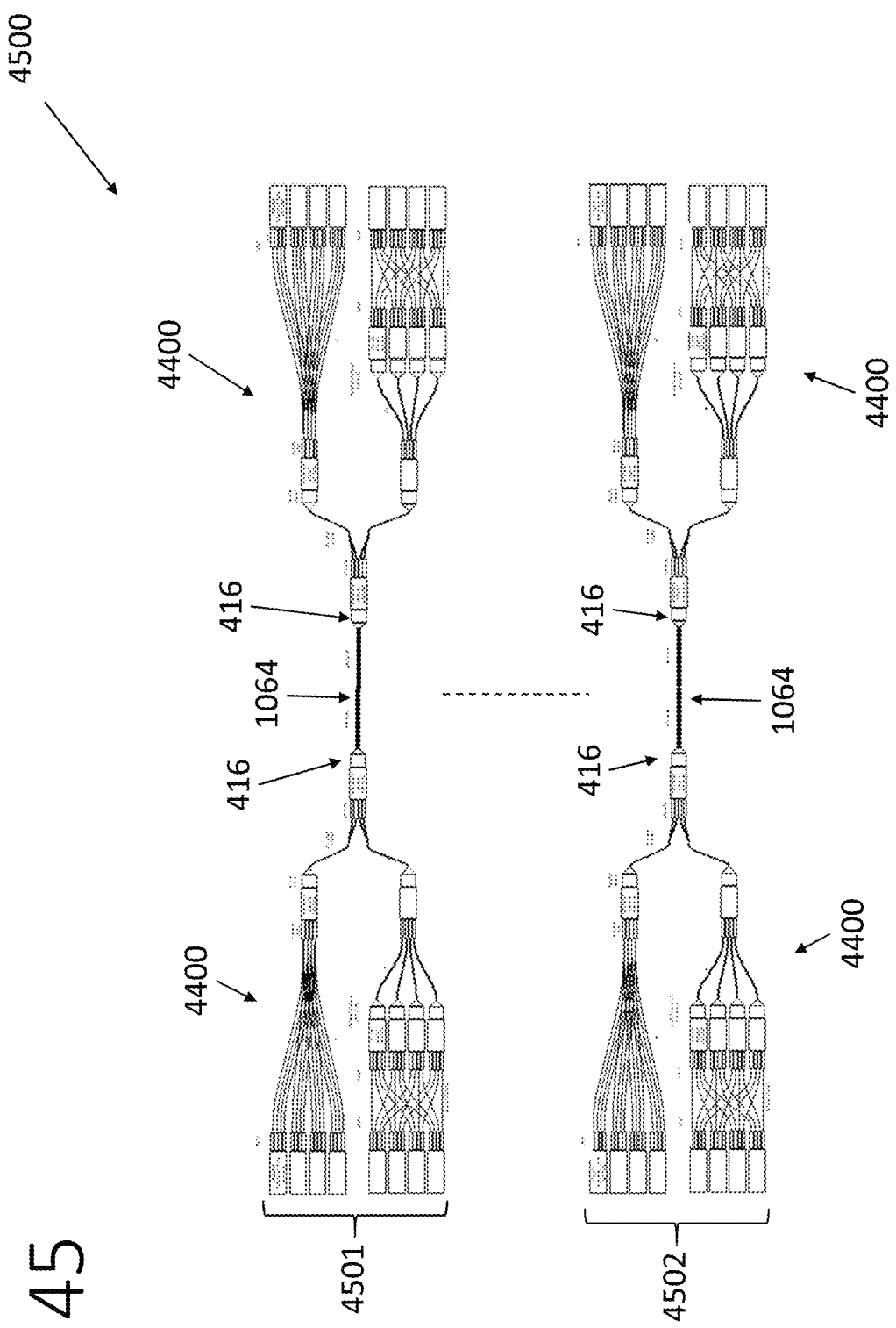
FIG. 45 is a schematic of another VSFF network system.
Figure 46:
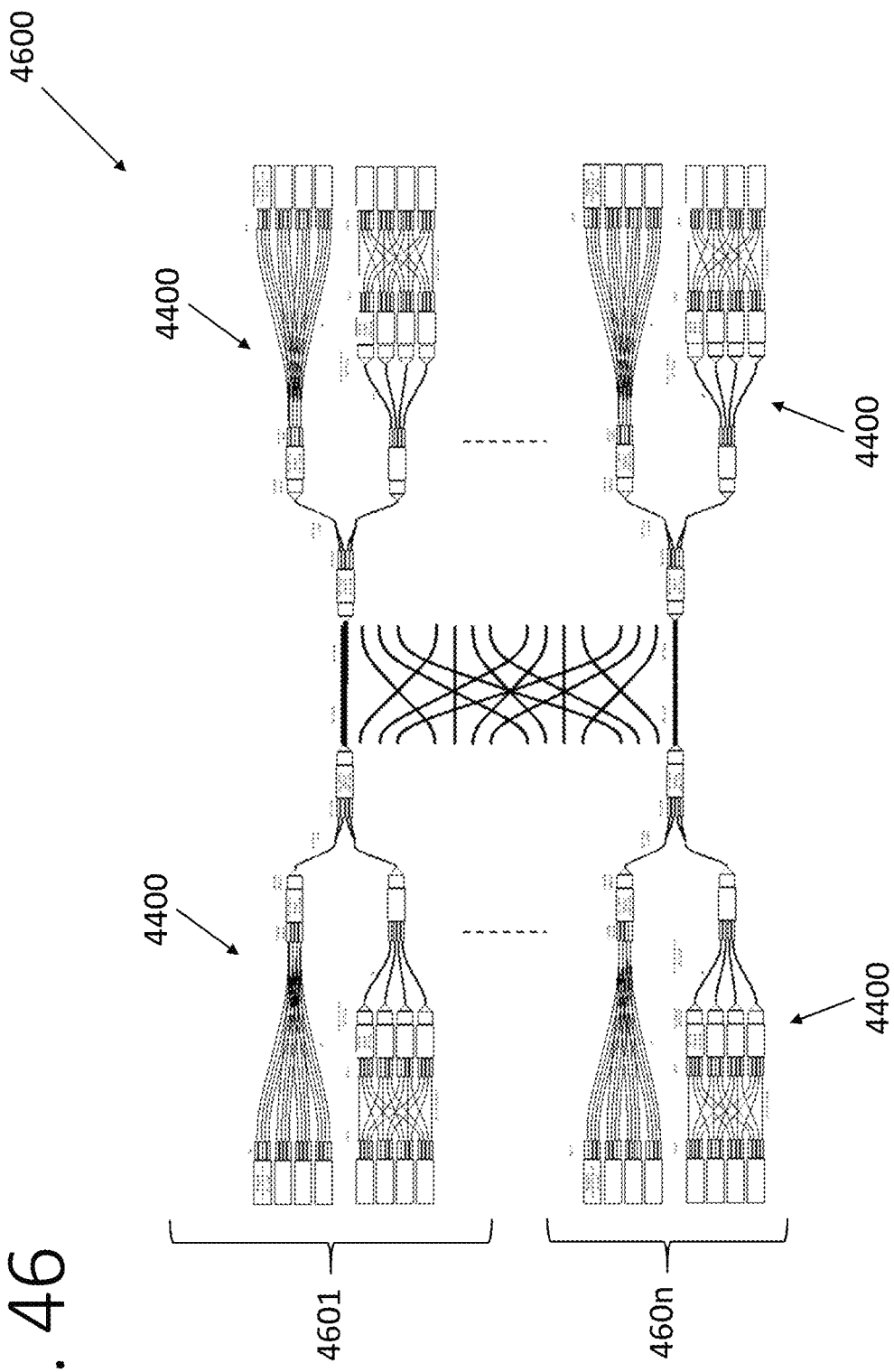
FIG. 46 is a schematic of another VSFF network system.

Referring to FIG. 45, another exemplary embodiment of a VSFF fiber optic network system is generally indicated at reference number 4500. The network system 4500 duplicates the network system 4400 on opposite ends of the 64-fiber trunk cable 1064 for enhanced connectivity. Each end of each 64-fiber trunk cable 1064 is terminated by a uniboot connector 416 that connects the trunk cable to a respective network system 4400. Thus, in the illustrated embodiment, each trunk cable 1064 is used to connect two 64-fiber network systems 4400 together, making combined network systems. The network system 4500 comprises two 64-fiber combined networks 4501, 4502. But as shown in FIG. 46, a VSFF fiber optic network system 4600 can include in desired number n of combined 64-fiber network systems 4601-460n, and the 64-fiber subnetworks can be combined and cross-combined in any suitable way for a given application.

It will be appreciated that other configurations of combined 64-fiber network systems are possible without departing from the scope of the disclosure. In one alternative example, a trunk cable 1064 can be used to directly connect network system 4100 to a network system 4400. In another alternative, using the principles of the present disclosure, a trunk cable 1064 could be connected to a network system (not shown) that branches into two 32-fiber cross-connect subnetworks of the same type as subnetwork 4401. Those skilled in the art will further recognize that the principles of the present disclosure can also be used to connect a trunk cable to non-cross-connected subnetworks. Further, it will be understood that trunk cables having other numbers of fibers (e.g., 32-fiber trunk cable, 128-fiber trunk cables, etc.) could be used to build combined networks and/or branched networks of different scale in accordance with the principles of the present disclosure.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A fiber optic network system comprising:
first fiber optic network equipment including a multifiber cable and a VSFF uniboot connector terminating the multifiber cable;
a plurality of transceivers; and
a VSFF adapter having a first end portion and a second end portion, the first end portion defining a first receptacle mated with the VSFF uniboot connector and the second end portion defining a plurality of second receptacles; and
fiber breakout cabling comprising a plurality of fiber optic cables and VSFF connectors terminating the plurality of fiber optic cables, said VSFF connectors of the fiber breakout cabling including a plurality of first VSFF connectors plugged into the plurality of second receptacles and a plurality of second VSFF connectors plugged into the plurality of transceivers, whereby the fiber breakout cabling connects the first fiber optic network equipment to the plurality of transceivers without any prefabricated shuffle component or mid span breakout component along any of the plurality of fiber optic cables.

2. The fiber optic network as set forth in claim 1, wherein each of the plurality of second VSFF connectors has exactly two single-fiber ferrules.

3. The fiber optic network as set forth in claim 1, wherein each of the plurality of second VSFF connectors has exactly one multifiber ferrule.

4. The fiber optic network as set forth in claim 3, wherein the multifiber ferrule has a fiber count selected from a group of fiber counts consisting of: eight fibers, twelve fibers, 16 fibers 24 fibers, and 32 fibers.

5. The fiber optic network as set forth in claim 1, wherein each of the first VSFF connectors comprises a plug body and wherein the VSFF uniboot connector comprises a plurality of plug bodies each having a size and shape substantially corresponding to the plug bodies of the first VSFF connectors.

6. The fiber optic network as set forth in claim 1, wherein the multifiber cable comprises at least 64 fibers and up to 128 fibers.

7. A fiber optic network system comprising:
a fiber optic trunk cable having at least 64 trunk optical fibers;
a trunk VSFF uniboot connector terminating the trunk cable;
a trunk VSFF adapter having a first end portion and a second end portion, the first end portion defining a first trunk adapter receptacle and the second end portion defining a plurality of second trunk adapter receptacles, the trunk VSFF uniboot connector being mated with the first trunk adapter receptacle; and
a plurality of fiber optic subnetworks connected to the trunk cable via the trunk VSFF adapter, each fiber optic subnetwork comprising:
a branch cable having a first end and a second end;
a plurality of peripheral cables;
a first subnetwork VSFF connector for terminating the first end of the branch cable,
a branch VSFF uniboot connector for terminating the second end of the respective branch cable,
a plurality of peripheral VSFF connectors for terminating the plurality of peripheral cables; and
a branch VSFF adapter having a first end portion and a second end portion, the first end portion of the branch VSFF adapter defining a first branch adapter receptacle and the second end portion defining a plurality of second branch adapter receptacles;
wherein the first subnetwork VSFF connector is plugged into one of the second trunk adapter receptacles, the branch VSFF uniboot connector is plugged into the first branch adapter receptacle, and a subset of the plurality of peripheral VSFF connectors are plugged into the second branch adapter receptacles whereby others of the plurality of peripheral VSFF connectors are connectable to individual network nodes such that the plurality of peripheral cables define sub-branches of the fiber optic subnetwork.

8. The fiber optic network as set forth in claim 7, wherein some of the plurality of peripheral VSFF connectors has exactly two single-fiber ferrules.

9. The fiber optic network as set forth in claim 8, wherein some of the plurality of peripheral VSFF connectors has exactly one multifiber ferrule.

10. The fiber optic network as set forth in claim 9, wherein the multifiber ferrule has a fiber count selected from a group of fiber counts consisting of: eight fibers, twelve fibers, 16 fibers 24 fibers, and 32 fibers.

11. The fiber optic network as set forth in claim 7, wherein the branch VSFF uniboot connector comprises a plurality of plug bodies and each of the subset of the plurality of peripheral VSFF connectors plugged into the second branch adapter receptacles has a plug body of a size and shape substantially corresponding to the plug bodies of the first VSFF connectors.

12. The fiber optic network as set forth in claim 7, wherein the trunk cable is 128 fibers or less.

13. A fiber optic network system comprising:
a fiber optic trunk cable; and
a plurality of fiber optic subnetworks connected to the fiber optic trunk cable, wherein at least one of the plurality of the subnetworks comprises a VSFF cross-connect subnetwork, each VSFF cross-connect subnetwork comprising:
  a plurality of cross-connect VSFF adapters, each cross-connect VSFF adapter having a first receptacle and a plurality of second receptacles in communication with the first receptacle;
  a plurality of cross-connect VSFF uniboot connectors mated with the first receptacles of the plurality of cross-connect VSFF adapters, each cross-connect VSFF uniboot connector being in optical communication with the fiber optic trunk cable;
  a plurality of cross-connect transceivers, each cross-connect transceiver comprising an optical interface having a plurality of transceiver receptacles; and
  a plurality of cross-connect cable assemblies, each cross-connect cable assembly comprising an optical fiber cable having a first end and a second end, a first VSFF connector terminating the first end of the optical fiber cable, and a second VSFF connector terminating the second end of the optical fiber cable, the first VSFF connector of each cross-connect cable assembly being mated with one of the second receptacles of one of the cross-connect VSFF adapters, the second VSFF connector being mated with one of the transceiver receptacles of one of the cross-connect transceivers,
  wherein for each cross-connect transceiver, each of the cross-connect cable assemblies connected to said cross-connect transceiver is connected to a different one of the cross-connect VSFF adapters.

14. The fiber optic network system of claim 13, wherein the optical interface of each cross-connect transceiver has four transceiver receptacles.

15. The fiber optic network system of claim 14, wherein each cross-connect VSFF adapter has four second receptacles.

16. The fiber optic network system of claim 15, wherein the plurality of VSFF cross-connect VSFF adapters consists of four cross-connect VSFF adapters, the plurality of cross-connect VSFF uniboot connectors consists of four cross-connect VSFF uniboot connectors, the plurality of cross-connect transceivers consists of four cross-connect transceivers, and the plurality of cross-connect cable assemblies consists of 16 cross-connect cable assemblies.

17. The fiber optic network system of claim 13, further comprising a branch cable assembly connecting the fiber optic trunk cable to the cross-connect subnetwork, the branch cable assembly comprising a VSFF uniboot connector mated with the first receptacle of the VSFF cross-connect subnetwork.

18. A fiber optic network system comprising:
a fiber optic trunk cable;
a trunk VSFF uniboot connector terminating the trunk cable, the trunk VSFF uniboot connector comprising a plurality of multifiber ferrules;
a trunk VSFF adapter having a first end portion and a second end portion, the first end portion defining a first trunk adapter receptacle and the second end portion defining a plurality of second trunk adapter receptacles, the trunk VSFF uniboot connector being mated with the first trunk adapter receptacle;
a branch cable assembly comprising a branch cable including at least eight optical fibers and having a first end and a second end, a branch VSFF connector comprising a single multifiber ferrule terminating the first end of the branch cable and a branch VSFF uniboot connector comprising a plurality of ferrules terminating the second end of the branch cable, the branch VSFF connector mated with one of the plurality of second trunk adapter receptacles;
a branch VSFF adapter having a first end portion and a second end portion, the first end portion defining a first branch adapter receptacle and the second end portion defining a plurality of second branch adapter receptacles, the branch VSFF uniboot connector being mated with the first branch adapter receptacle; and
a plurality of peripheral cable assemblies, each peripheral cable assembly comprising a first peripheral VSFF connector mated with a respective one of the second branch adapter receptacles and at least one second peripheral VSFF connector.

19. The fiber optic network system as set forth in claim 18, wherein at least one of the peripheral cable assemblies comprises a multi-cable cable assembly.

20. The fiber optic network system as set forth in claim 19, wherein the first peripheral VSFF connector of each multi-cable cable assembly comprises a multifiber ferrule and a connector housing assembly.

21. The fiber optic network system as set forth in claim 20, wherein each multi-cable cable assembly further comprises a plurality of optical fiber cables, each optical fiber cable having an end received in the connector housing assembly and terminated to the multifiber ferrule.

22. The fiber optic network system as set forth in claim 21, wherein each multi-cable cable assembly comprises a plurality of second peripheral VSFF connectors terminating ends of the plurality of optical fiber cables opposite the first peripheral VSFF connector.

23. The fiber optic network system as set forth in claim 22, wherein each second peripheral VSFF connector of the multi-cable cable assembly comprises two single-fiber ferrules.

24. A fiber optic network system comprising a trunk-to-transceiver cabling assembly for connecting a trunk cable to at least 32 transceiver ports, the trunk-to-transceiver cabling assembly consisting of only: a trunk VSFF uniboot connector for terminating the trunk cable, one or more VSFF adapters, one or more branch cable assemblies, and a plurality of peripheral cable assemblies comprising of fiber optic cables and VSFF connectors, each branch cable assembly comprising a multifiber optical cable having at least one first end section and exactly one second end section, a branch VSFF connector terminating each first end section of the multifiber optical cable, and a branch VSFF uniboot connector terminating the second end of the multifiber optical cable, and the VSFF connectors of the plurality of peripheral cable assemblies collectively including VSFF connectors for all of the at least 32 transceiver ports.

* * * * *